(12) United States Patent
Yu et al.

(10) Patent No.: US 12,511,789 B2
(45) Date of Patent: Dec. 30, 2025

(54) POINT CLOUD ATTRIBUTE ENCODING AND DECODING METHOD AND DEVICE

(71) Applicant: Zhejiang University, Hangzhou (CN)

(72) Inventors: Lu Yu, Hangzhou (CN); Jiafeng Chen, Hangzhou (CN); Wenyi Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 360 days.

(21) Appl. No.: 18/021,453

(22) PCT Filed: Aug. 13, 2021

(86) PCT No.: PCT/CN2021/112484
§ 371 (c)(1),
(2) Date: Feb. 15, 2023

(87) PCT Pub. No.: WO2022/037491
PCT Pub. Date: Feb. 24, 2022

(65) Prior Publication Data
US 2023/0351640 A1 Nov. 2, 2023

(30) Foreign Application Priority Data

Aug. 16, 2020 (CN) .......................... 202010822352.0
Sep. 30, 2020 (CN) .......................... 202011063672.9
Dec. 8, 2020 (CN) .......................... 202011452464.8

(51) Int. Cl.
*G06T 9/00* (2006.01)

(52) U.S. Cl.
CPC .................. *G06T 9/001* (2013.01)

(58) Field of Classification Search
None
See application file for complete search history.

(56) References Cited

U.S. PATENT DOCUMENTS 9,787,321 B1 10/2017 Hemmer et al.
10,645,367 B2 * 5/2020 Gupta .................. G01S 17/32
(Continued)

FOREIGN PATENT DOCUMENTS

CN 105957142 A 9/2016
CN 110572655 A 12/2019
(Continued)

*Primary Examiner* — Anand P Bhatnagar
(74) *Attorney, Agent, or Firm* — Muncy, Geissler, Olds & Lowe, P.C.

(57) ABSTRACT

In a point cloud attribute decoding method and device, Hilbert order is used as the coding order of point cloud attributes. The nearest neighbor points in the three-dimensional space of the current point are found in several points before the current point and are used as the prediction points of the current point. In the worst case, the distance in the three-dimensional space of the two points with a distance of n on the Hilbert order is less than or equal to $n^{1/2}$, while the distance in the three-dimensional space of the two points with a distance of n on the Morton order may be greater than the maximum dimension length of the point cloud. The average distance between K points in the preceding order and the current point in Hilbert sequence is smaller than that between K points in the preceding order and the current point in Morton sequence.

11 Claims, 4 Drawing Sheets

(56) References Cited

U.S. PATENT DOCUMENTS

| | | | |
|---|---|---|---|
| 10,739,447 B2* | 8/2020 | Gutierrez Barragan ..................... H04N 23/60 | |
| 2001/0046266 A1* | 11/2001 | Rakib ..................... H04N 7/10 | 375/259 |
| 2018/0081995 A1* | 3/2018 | Horhammer .......... G06F 16/283 | |
| 2018/0309970 A1* | 10/2018 | Gupta ................... G01S 17/894 | |
| 2019/0146073 A1* | 5/2019 | Gutierrez ................ G01S 7/484 | 356/5.01 |
| 2019/0341930 A1* | 11/2019 | Pavlovic ............. H03M 7/3088 | |
| 2022/0292730 A1* | 9/2022 | Gao ........................ G06T 9/001 | |
| 2023/0239501 A1* | 7/2023 | Oh ....................... H04N 19/136 | 375/240.08 |

FOREIGN PATENT DOCUMENTS

| | | |
|---|---|---|
| CN | 110892725 A | 3/2020 |
| CN | 111145090 A | 5/2020 |
| CN | 111405281 A | 7/2020 |
| CN | 111405284 A | 7/2020 |

* cited by examiner

POINT CLOUD ATTRIBUTE ENCODING AND DECODING METHOD AND DEVICE

TECHNICAL FIELD

The present disclosure belongs to the field of point cloud coding, and particularly relates to a point cloud attribute decoding method and device based on a new processing order.

BACKGROUND ART

Supporting the application of virtual reality (VR) AR, Augmented Reality (AR) is the next important challenge of media technology in the 21st century. These applications, together with 3D data acquisition, 3D rendering and computer vision, make it possible to realize the emerging immersive media experience in the near future. Point cloud is an ideal representation of three-dimensional scenes and objects. It consists of a group of points that are irregularly distributed and unconnected in three-dimensional space. Each point that constitutes a point cloud has geometric information and optional attribute information. Among them, geometric information is used to express the structure of three-dimensional objects, which is composed of three-dimensional position coordinates X, Y, and Z; Attribute information is used to express the surface attributes of three-dimensional scenes or objects. Common attribute information includes color, reflectivity, normal, and transparency. The data scale of point cloud is extremely huge. For example, a point cloud with high quality to express three-dimensional objects has hundreds of thousands to millions of points. In order to facilitate the storage and transmission of point cloud data, it is necessary to compress point cloud data.

Most point cloud compression algorithms are based on voxelized point cloud, which has the advantages of convenient processing and controllable accuracy. A voxelized point cloud is a point cloud whose pointing position coordinates are quantized into a cube grid, and the coordinates of the midpoint of each cube grid represent the coordinates of the midpoint of the cube grid, so only the index of the cube grid is needed to encode the position information of the point cloud, and the position accuracy can be controlled by the size of the cube grid.

At present, most point cloud attribute coding is based on Morton order to find several nearest neighbors, and then the attributes of these nearest neighbors are weighted to predict the attribute value of the current point. Among them, Morton order is the point order obtained by sorting the points in the point cloud according to their Morton codes, and the Morton codes of each point can be obtained from the position coordinates of the points. Specifically, it is obtained by alternately placing the coordinates of each dimension of the points according to each bit of the binary bit. In [1], the nearest neighbor points are to be found based on Morton order. If the number of LOD (level of detail) is 1, three points closest to the current point will be found from several coded points before the current point under Morton order, and then the weighted average of the attribute values of these points will be used to predict the attribute values of the current point. If the number of LOD (level of detail) is greater than 1, Then the first point whose Morton code is greater than the Morton code of the current point will be found from the points in the coded level of detail arranged in Morton order, and then three points closest to the current point will be found around this found point, and the weighted average of the attribute values of these points will be used to predict the attribute values of the current point. In [2], attribute prediction is also based on Morton code. For sparse point clouds, the weighted average of the attribute values of the first three points of the current point in Morton order is directly used to predict the attribute values of the current point. For dense point clouds, the points that are coplanar and collinear with the current point are first found from the first several points of the current point in Morton order. If they are found, the weighted average of the attribute values of these coplanar and collinear points is used to predict the attribute values of the current point, otherwise, the previous points of the current point in Morton order are directly used.

Theoretically, the closer the three-dimensional distance between the predicted point and the current point is, the stronger the correlation between the predicted point's attributes and the current point's attributes is, the more accurate the attribute prediction is, and the lower the required code rate under the condition of constant distortion is. Since the three-dimensional spatial distance between adjacent or similar points under the Morton order will periodically jump with different amplitudes, the three-dimensional spatial distance between adjacent points under the Morton order will periodically change from near to far. Therefore, the Morton code has poor spatial neighbor characteristics, so the nearest point found by the nearest neighbor search with the Morton order will not be ideal.

Hilbert curve is a continuous fractal space filling curve, also known as Hilbert space filling curve. It was first discovered by German mathematician David Hilbert in 1891, and it can map high-dimensional space to one dimension. Hilbert curve has good spatial neighborhood characteristics. Hilbert's spatial neighborhood characteristics mean that data points that are similar in one-dimensional space are also similar in high-dimensional space. Because of its spatial neighborhood, Hilbert curve and its discrete approximation are widely used. For example, it is widely used in database indexing, memory management, image processing, and dynamic load balancing. This disclosure uses the discrete approximation of Hilbert curve in three-dimensional space.

SUMMARY

For the shortcoming that the three-dimensional space distance before adjacent points in Morton order will periodically jump, the present disclosure proposes a point cloud attribute decoding method and device based on a new processing order to further improve the coding efficiency of point cloud attributes. Hilbert order is used as the coding order of point cloud attribute. The nearest neighbors in the three-dimensional space of the current point are found from several points in the preceding of the current point in Hilbert order, and these nearest neighbors are used as the prediction points of the current point. Because the similar points in Hilbert order are also similar in three-dimensional space, in particular, in the worst case, the distance between two points in three-dimensional space with distance n on Hilbert order is less than or equal to and the distance between two points on Morton order with distance n in three-dimensional space may be greater than the maximum value of point cloud dimension, and when k is small, the average distance between the current point and the current point in Hilbert order is smaller than that of the current point in Morton order. Therefore, Hilbert order can be used to find the neighbor points that are more similar to the current point in three-dimensional space, so that the attribute values of the predicted points are more relevant to the attribute values of the current point, and then the coding efficiency of point cloud attributes can be improved.

The first purpose of the disclosure is to provide a point cloud attribute decoding method based on a new processing order, which includes the following contents:

The weighted average of the reconstructed attribute values of the preceding decoding points under Hilbert order is used as the attribute prediction value of the current point, wherein Hilbert order is the point order obtained by sorting the points in the point cloud from small to large or from large to small according to their corresponding Hilbert code values;

Decoding the attribute residual value of the current point from the bitstream;

According to the attribute prediction value of the current point and the decoded attribute residual value, the reconstructed attribute value of the current point is obtained.

Preferably, the point cloud attribute decoding method based on the new processing order is characterized in that the weighted average of the reconstructed attribute values of the preceding decoding points under Hilbert order comprises:

N decoding points in the first order under Hilbert order are used as the attribute prediction points of the current point, where n is a natural number;

The weighted average of the reconstructed attribute values of these n attribute prediction points is used as the attribute prediction value of the current point.

Preferably, the point cloud attribute decoding method based on the new processing order is characterized in the weighted average of the reconstructed attribute values of the preceding decoding points under Hilbert order comprises:

Use n points closest to the current point from L points in the preceding of Hilbert order as the attribute prediction points of the current point, where L is a natural number greater than 0 and n is a natural number;

The weighted average of the reconstructed attribute values of these n attribute prediction points is used as the attribute prediction value of the current point.

Preferably, the point cloud attribute decoding method based on the new processing order is characterized in that the weighted average of the reconstructed attribute values of the preceding decoding points under Hilbert order comprises:

Using coplanar points of the current point and collinear points of the current point among L numbered preceding points in the Hilbert order as prediction points of attribute of the current point, wherein each of the coplanar points is the point located in its cube that has a common surface with the cube where the current point is located, each of the collinear points is the point located in its cube that has a common edge with the cube where the current point located, and L is a natural number greater than 0;

Weight coplanar points and collinear points $\omega_{pl}$ and $\omega_{po}$, in which $\omega_{pl}$ and $\omega_{po}$ are real numbers greater than or equal to 0, $\omega_{pl}$ is greater than $\omega_{po}$;

The weighted average of reconstructed attribute values from coplanar points and collinear points is used as the attribute prediction value of the current point.

Preferably, the point cloud attribute decoding method based on the new processing order can also have another implementation form, which is characterized by comprising:

Constructing L-level level of detail $(LOD_i)_{i=0,1\ldots L-1}$, among which, $LOD_i$ is a subset of the reconstructed point cloud, $LOD_i \subset LOD_j (i<j)$, $LOD_{L-1}$ is the whole reconstructed point cloud, where L is a natural number greater than 0;

Obtain n attribute prediction points of the current point, and make $(R_i = LOD_i - LOD_{i-1})_{i=1\ldots L-1}$, $R_0 = LOD_0$, for a point P of Hilbert code H in $R_i$, Select n points closest to point P from $LOD_{i-1}$ Hilbert code in the range of $[H_1, H_2](H_1 \leq H \leq H_2)$. The nearest n points as the attribute prediction points of the current point, where n is a natural number;

The weighted average of the reconstructed attribute values using the n attribute prediction points is taken as the attribute prediction value of the current point;

Decoding the attribute residual value of the current point from the bitstream;

According to the attribute prediction value of the current point and the decoded attribute residual value, the reconstructed attribute value of the current point is obtained.

The expression method in the present disclosure is agreed as follows:

1. The 3D geometric coordinates of points in the point cloud are marked as $(X_1, X_2, X_3)_N$, where $X_1, X_2, X_3$ are respectively expressed by binary expansion as follows:

$$X_1 = (x_1^1 x_1^2 \ldots x_1^n \ldots x_1^{N-1} x_1^N), X_2 = (x_2^1 x_2^2 \ldots x_2^n \ldots x_2^{N-1} x_2^N), X_3 = (x_3^1 x_3^2 \ldots x_3^n \ldots x_3^{N-1} x_3^N)$$

The left side of binary expansion represents high-bit and the right side represents low-bit, where N is an integer greater than 0, indicating the coordinate bit width.

2. Hilbert code of point $HCode_N$ represented in binary as $C_{1,m_1} C_{2,m_2} \ldots C_{i,m_i} \ldots C_{p-1,m_{p-1}} C_{p,m_p}$, in which the Hilbert code subcode $C_{i,m_i}$ is binary number of $m_i$ bits.

Preferably, the point cloud attribute decoding method based on the new processing order includes the following steps:

The three-dimensional geometric coordinates of reconstructed points in the point cloud are processed sequentially from high-bit to low-bit. $(X_1, X_2, X_3)_N$ The binary bits of, where the firstiSecondary processing: according to the three-dimensional geometric coordinates of the reconstructed point $(3*m_i)$ Binary bits, generate the corresponding Hilbert code subcode $C_{i,m_i}$:

Process sequentially binary bits of the three-dimensional geometric coordinates $(X_1, X_2, X_3)_N$ of reconstructed points in the point cloud from high-bit to low-bit, where the $i^{th}$ time processing: generate the corresponding subcode $C_{i,m_i}$ of Hilbert code according to $(3*m_i)$ binary bits of the three-dimensional geometric coordinates of the reconstructed point:

$$C_{i,m_i} = \text{ConvertCode}^{m_i}(x_1^{m_1+m_2\ldots+m_{i-1}+1} x_1^{m_1+m_2\ldots+m_{i-1}+2} \ldots x_1^{m_1+m_2\ldots+m_i}, x_2^{m_1+m_2\ldots+m_{i-1}+1} x_2^{m_1+m_2\ldots+m_{i-1}+2} \ldots x_2^{m_1+m_2\ldots+m_i}, x_3^{m_1+m_2\ldots+m_{i-1}+1} x_3^{m_1+m_2\ldots+m_{i-1}+2} \ldots x_3^{m_1+m_2\ldots+m_i}, \text{state}_i),$$

$$\text{state}_{i+1} = \text{ConvertState}^{m_i}(x_1^{m_1+m_2\ldots+m_{i-1}+1} x_1^{m_1+m_2\ldots+m_{i-1}+2} \ldots x_1^{m_1+m_2\ldots+m_i}, x_2^{m_1+m_2\ldots+m_{i-1}+1} x_2^{m_1+m_2\ldots+m_{i-1}+2} \ldots x_2^{m_1+m_2\ldots+m_i}, x_3^{m_1+m_2\ldots+m_{i-1}+1} x_3^{m_1+m_2\ldots+m_{i-1}+2} \ldots x_3^{m_1+m_2\ldots+m_i}, \text{state}_i),$$

Among them, ConvertCode$^{m_i}$ function generates the corresponding Hilbert code subcode according to the status state of the binary bit and the binary bit in this processing. There are different ConvertCode$^{m_i}$ when $m_i$ is different. The mechanism of generating Hilbert code subcodes by ConvertCode$^{m_i}$ is based on the shape of the Hilbert sub-curve determined by state and the serial number on the Hilbert sub-curve determined by the binary bits in this processing ConvertState$^{m_i}$ function generates the state state$_{i+1}$ of the binary bit in the next processing according to the status state of the binary bit and the binary bit in this processing. ConvertCode$^{m_i}$ is different when $m_i$ is different. The mechanism that ConvertState$^{m_i}$ generates the state state$_{i+1}$ of binary bit in the next processing according to the shape of the Hilbert sub-curve determined by state and the serial number on the Hilbert sub-curve determined by the processed binary bit. The state corresponding to the binary bit corresponds to the shape of the Hilbert sub-curve corresponding to the binary bit, and a total of p treatments were performed, and the sum of $m_i$ of each treatment is n, that is $$\Sigma_{i=1}^{P} m_i = N;$$

According to the Hilbert order from small to large or from large to small, the reconstruction attribute information of point cloud is decoded from the bitstream in order.

A second object of the present disclosure is to provide a point cloud attribute decoding device based on a new processing order, which includes:

An attribute prediction value acquisition module, wherein the input of the module is the reconstructed point cloud, and the output is the attribute prediction value of the current point, and the module uses the weighted average of the reconstructed attribute values of the preceding decoding points in Hilbert order as the attribute prediction value of the current point, wherein the Hilbert order is the point order obtained by sorting the points in the point cloud from small to large or from small to small according to their corresponding Hilbert code values;

A module of decoding attribute residual: the input of this module is the bitstream and the output is the attribute residual, and this module decodes the attribute residual value of the current point from the bitstream;

A module of acquiring reconstructed attribute value: the input of this module is the attribute residual and the attribute prediction value, and the output is the reconstructed attribute value of the current point, and the module obtains the reconstructed attribute value of the current point according to the attribute prediction value of the current point and the decoded attribute residual value.

Preferably, the point cloud attribute decoding device based on the new processing order is characterized in that the weighted average of the reconstructed attribute values of the preceding decoding points under Hilbert order comprises:

A module of acquiring attribute prediction point: the input of the module is the reconstructed point cloud, and the output is the attribute prediction point of the current point, and the module uses N decoded points under Hilbert order as the attribute prediction points of the current point, where n is a natural number;

A module of calculating attribute prediction value: the input of this module is the attribute prediction point, and the output is the attribute prediction value of the current point, and the module uses the weighted average of the reconstructed attribute values of these n attribute prediction points as the attribute prediction value of the current point.

Preferably, the point cloud attribute decoding device based on the new processing order is characterized in the weighted average of the reconstructed attribute values of the preceding decoding points under Hilbert order comprises:

A module of acquiring attribute prediction point: the input of the module is the reconstructed point cloud, and the output is the attribute prediction point of the current point, and the module uses n points closest to the current point in the top L points of Hilbert order as the attribute prediction points of the current point, where L is a natural number greater than 0 and N is a natural number;

A module of calculating attribute prediction value: the input of this module is the attribute prediction point, and the output is the attribute prediction value of the current point, and the module uses the weighted average of the reconstructed attribute values of these n attribute prediction points as the attribute prediction value of the current point.

Preferably, the point cloud attribute decoding device based on the new processing order is characterized in that the weighted average of the reconstructed attribute values of the preceding decoding points in the Hilbert order comprises:

A module of acquiring attribute prediction point: the input of the module is the reconstructed point cloud, and the output is the attribute prediction point of the current point, and the module uses the coplanar points and collinear points of the current point among the preceding L points in the Hilbert order as the prediction points of attribute of the current point, wherein each of the coplanar points is the point located in its cube that has a common surface with the cube where the current point is located, and each of the collinear points is the point located in its cube that has a common edge with the cube where the current point is located, and L is a natural number greater than 0;

A module of weighting attribute prediction point: the input of this module is prediction point of attribute, and the output is prediction point of attribute with weight, and this module gives coplanar points and collinear points weights $\omega_{pl}$ and $\omega_{po}$, in which $\omega_{pl}$ and $\omega_{po}$ are real number greater than or equal to 0, $\omega_{pl}$ is bigger than $\omega_{po}$;

A module of calculating attribute prediction value: the input of this module is the weighted attribute prediction point, and the output is the attribute prediction value of the current point. This module uses the weighted average of the reconstructed attribute values of coplanar points and collinear points as the attribute prediction value of the current point.

Preferably, the device of decoding point cloud attribute based on the new processing order can also have another implementation form, whose characteristics include:

A module of constructing LOD: the input of this module is the reconstructed point cloud geometry, and the output of this module is the constructed LOD. This module builds $(LOD_i)_{i=0,1 \ldots L-1}$ as L-level detail level, among which, $LOD_i$ is a subset of the reconstructed point cloud, $LOD_i \subset LOD_j$ (i<j), $LOD_{L-1}$ is the whole reconstructed point cloud, where L is a natural number greater than 0;

A module of acquiring attribute prediction point: the input of the module is the constructed LOD, and the output is the attribute prediction point of the current point, and the module acquires n attribute prediction points of the current point, make $(R_i = LOD_i - LOD_{i-1})_{i=1 \ldots L-1}$, $R_0 = LOD_0$, for a point P of Hilbert code H in $R_i$, Select n points closest to point P from $LOD_{i-1}$ Hilbert code in the range of $[H_1, H_2](H_1 \leq H \leq H_2)$. The nearest n points as the attribute prediction points of the current point, where n is a natural number;

A module of calculating attribute prediction value: the input of this module is the attribute prediction point, and the output is the attribute prediction value of the current point, and the module uses the weighted average of the reconstructed attribute values of these n attribute prediction points as the attribute prediction value of the current point;

A module of decoding attribute residual: the input of this module is the bitstream and the output is the attribute residual, and this module decodes the attribute residual value of the current point from the bitstream;

A module of acquiring reconstructed attribute value: the input of this module is the attribute residual and the attribute prediction value, and the output is the reconstructed attribute value of the current point, and the module obtains the reconstructed attribute value of the current point according to the attribute prediction value of the current point and the decoded attribute residual value.

Preferably, the method of decoding point cloud attribute based on the new processing order includes the following steps:

A module of generating Hilbert code: the input of this module is the reconstructed geometric coordinates of the point cloud, and the output is the Hilbert code corresponding to the geometric coordinates of the point cloud. This module sequentially processes binary bits of the three-dimensional geometric coordinates $(X_1, X_2, X_3)_N$ of reconstructed points in the point cloud from high-bit to low-bit, where the ith time processing: generate the corresponding subcode $C_{i,m_i}$ of Hilbert code according to $(3*m_i)$ binary bits of the three-dimensional geometric coordinates of the reconstructed point:

$$C_{i,m_i} = \text{ConvertCode}^{m_i}(x_1^{m_1+m_2\cdots+m_{i-1}+1} \\ x_1^{m_1+m_2\cdots+m_{i-1}+2} \cdots x_1^{m_1+m_2\cdots+m_i}, \\ x_2^{m_1+m_2\cdots+m_{i-1}+1} x_2^{m_1+m_2\cdots+m_{i-1}+2} \cdots \\ x_2^{m_1+m_2\cdots+m_i} x_3^{m_1+m_2\cdots+m_{i-1}+1} \\ x_3^{m_1+m_2\cdots+m_{i-1}+2} \ldots x_3^{m_1+m_2\cdots+m_i}, \text{state}_i),$$

$$\text{state}_{i+1} = \text{ConvertState}^{m_i}(x_1^{m_1+m_2\cdots+m_{i-1}+1} \\ x_1^{m_1+m_2\cdots+m_{i-1}+2} \cdots x_1^{m_1+m_2\cdots+m_i}, \\ x_2^{m_1+m_2\cdots+m_{i-1}+1} x_2^{m_1+m_2\cdots+m_{i-1}+2} \cdots \\ x_2^{m_1+m_2\cdots+m_i} x_3^{m_1+m_2\cdots+m_{i-1}+1} \\ x_3^{m_1+m_2\cdots+m_{i-1}+2} \ldots x_3^{m_1+m_2\cdots+m_i}, \text{state}_i),$$

ConvertCode$^{m_i}$ function generates the corresponding subcode of Hilbert code according to the state $\text{state}_i$ of the binary bit and the binary bit in this processing. ConvertCode$^{m_i}$ is different when $m_i$ is different. The mechanism that ConvertCode$^{m_i}$ generates subcode of Hilbert code is: generate the corresponding subcode of Hilbert code according to the shape of the Hilbert sub-curve determined by state $\text{state}_i$ and the serial number on the Hilbert sub-curve determined by the binary bits in this processing. ConvertState$^{m_i}$ function generates the state $\text{state}_{i+1}$ of the binary bit in the next processing according to the state $\text{state}_i$ of the binary bit and the binary bit in this processing. ConvertCode$^{m_i}$ is different when $m_i$ is different. The mechanism that ConvertState$^{m_i}$ generates the state $\text{state}_{i+1}$ of binary bit in the next processing is: to determine the state $\text{state}_{i+1}$ of binary bit in the next processing according to the shape of the Hilbert sub-curve determined by state and the serial number on the Hilbert sub-curve determined by the binary bit in this processing. The state corresponding to the binary bit corresponds to the shape of the Hilbert sub-curve corresponding to the binary bit one by one, and a total of p processings are performed, and the sum of each processing $m_i$ is n, that is $$\Sigma_{i=1}^{p} m_i = N;$$

A module of decoding attribute: the input is the attribute bitstream, and the output is the reconstructed point cloud attribute in this module. The module sequentially decodes the bitstream to get the reconstructed point cloud attribute information according to the order of Hilbert from small to large or from large to small.

Because the used Hilbert order has the best spatial neighbor characteristics, neighbor points closer to the current point in three dimensions can be found with greater probability as the prediction points. Thus the attribute values of the prediction points are more relevant to the attribute values of the current point. Then we achieve the goal to improve the compression efficiency of point cloud attributes on the premise of maintaining the complexity.

BRIEF DESCRIPTION OF THE DRAWINGS

In order to explain the technical scheme in the embodiment of the application or the prior art more clearly, the following will briefly introduce the drawings needed in the description of the embodiment or the prior art Obviously, the drawings in the following description form a part of this application, and the illustrative embodiments of the disclosure and their descriptions are used to explain the disclosure, and do not constitute an improper limitation of the disclosure.

For ordinary technicians in this field, other drawings can be obtained according to these drawings without creative work.

DETAILED DESCRIPTION OF THE DISCLOSURE

Figure 1:
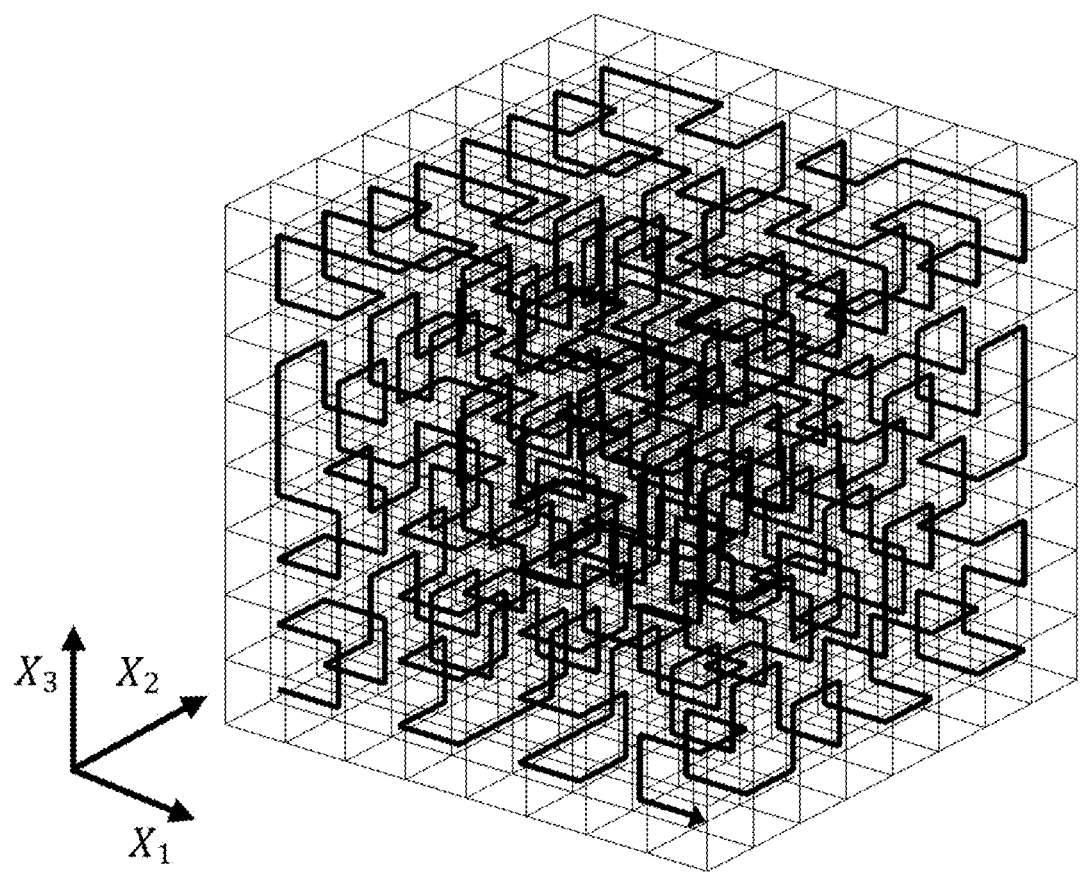
FIG. 1 is a schematic diagram of a three-dimensional Hilbert curve according to the present disclosure.

In order to further understand the present disclosure, the preferred embodiments of the present disclosure are described below with reference to examples, but it should be understood that these descriptions are only for further explaining the features and advantages of the present disclosure, and are not a limitation of the claims of the present disclosure.

For the convenience of expression, the following definitions are made:

For n binary numbers $X_1, X_2, \ldots, X_n$, $X_1 X_2 \ldots X_n$ means to put this n binary numbers are bitwise spliced together, and the number on the left is high and the number on the right is low.

If each dimension of a D-dimensional hypercube is divided equally by $2^n$, then the hypercube is called a D-dimensional n-order hypercube, expressed by $HC_n^D$, let $(X_1, X_2 \ldots X_d \ldots X_D)$ denote the coordinates of the smallest sub-cube in D-dimensional n-order hyper-cube, where, $0 \le X_d < 2^n$, $1 \le d \le D$. A curve passing through the smallest sub-cube in $HC_n^D$ is called a D-dimensional n-order Hilbert curve denoted by $H_n^D$. The scan order index of each minimal sub-cube over $H_n^D$ in a D-dimensional n-order hypercube $HC_n^D$ is called the Hilbert code of the minimal sub-cube, which is represented by $HCode_n^D$, where $HCode_n^D$ starts from 0.

The order of scanning the smallest cube of the D-dimensional 1-order Hilbert curve in the D-dimensional 1-order hyper-cube $H_1^D$ is the order of gray codes. For example, for three-dimensional, the gray codes of the sub-cubes with the scanning order of 0, 1, 2, 3, 4, 5, 6 and 7 are 000, 001, 011, 010, 110, 111, 101 and 100, which are exactly the coordinates of the sub-cubes. Therefore, the Hilbert code of the D-dimensional 1-order curve can be generated according to the gray code.

Symbols $(x^1 x^2 \ldots x^K)_b$ are used to express K bits binary number, where $0 \leq x^k < b$, $1 \leq k \leq K$.

Gray code coding function is $$G((x^1 x^2 \ldots x^K)_2) = (g^1 g^2 \ldots g^K)_2,$$

$(g^1 g^2 \ldots g^K)^2$ is the Gray code of $(x^1 x^2 \ldots x^K)_2$, the calculation formula is as follows:

$$(g^1 g^2 \ldots g^K)^2 = (x^1 x^2 \ldots x^K)_2 \wedge ((x^1 x^2 \ldots x^K)^2 >> 1)$$

Where $\wedge$ denotes exclusive or operators, $>>$ denotes the right shift operator.

The decoding function of Gray code is $$DG((g^1 g^2 \ldots g^K)_2) = (x^1 x^2 \ldots x^K)_2$$

Where $x^k = DG^k((g^1 g^2 \ldots g^K)_2)$

The calculation formula is as follows $$x^1 = DG_1((g^1 g^2 \ldots g^K)_2) = g^1,$$

$$x^k = DG_k((g^1 g^2 \ldots g^K)_2) = \left(\left(\sum_{i=1}^{k-1} g^i\right) \bmod 2\right) \wedge g^k,$$

$$2 \leq k \leq K$$

Hilbert curve is self-similar, and the generation of the curve is a recursive process. The Hilbert curve of order n+1 needs the Hilbert curve of order N, specifically, the position corresponding to the $2^D$ sub-cubes of the D-dimensional 1-order hyper-cube is regarded as the $2^D$ quadrant of the D-dimensional space, then for the n+1-order Hilbert curve, it is necessary to copy the n-order Hilbert curve directly or put it in a quadrant of the n+1-order Hilbert curve after mirror flipping, and then connect the starting point and end point of the n-order Hilbert curve of the adjacent quadrant or the n-order Hilbert curve after mirror flipping, so as to form the n+1-order curve. There are two main flips used: mirror flip 1 and mirror flip 2. Both flips are mirror flips along a hyperplane, where Mirror flip 1 is along the hyperplane $X_i - X_j = 0$ to flip. Exchange the coordinates between $X_i$ and $X_j$ needed. $X_i \leftrightarrow X_j$ represents the exchange of coordinates.

Mirror flip 2 is along the hyperplane $$X_i = \frac{2^n - 1}{2}$$

to flip, the coordinate $X_i$ needs to be exchanged to be $2^n - 1 - X_i$.

These two flips are order-preserving, that is, the relative position of each point on the curve remains unchanged before and after flipping.

Hilbert sub-curve is directional, and the direction can be uniquely determined by the coordinates of the starting point and the ending point. There is only one different bit between the coordinates of the starting point and the ending point. For example, the starting point coordinate of the three-dimensional first-order Hilbert curve is DG (0)=000, and the ending point coordinate is DG (7)=100. $B^q$ and $E^q$ are used to represent respectively the starting coordinates and ending coordinates of the sub-curves of the D-dimensional 1-order in the quadrant q (as mentioned above, the coordinates of the quadrant q can be obtained by the gray code G(q)). Then for three dimensions, there are $B^0=000$, $E^0=010$, $B^1=000$, $E^1=100$, $B^2=000$, $E^2=100$, $B^3=110$, $E^3=111$, $B^4=110$, $E^4=111$, $B^5=101$, $E^5=001$, $B^6=101$, $E^6=001$, $B^7=001$, $E^7=011$.

It can be determined by the coordinates of the starting point and the ending point to turn each sub-curve into a line mirror image flip similar to the one-order curve.

It is three-dimensional space that counts in the following. That is: D=3, giving the three-dimensional coordinates ($X_1$, $X_2$, $X_3$) of a point, which is expanded in binary to $$X_1=(x_1^1 x_1^2 \ldots x_1^n \ldots x_1^{N-1} x_1^N), X_2=(x_2^1 x_2^2 \ldots x_2^n \ldots x_2^{N-1} x_2^N), X_3=(x_3^1 x_3^2 \ldots x_3^n \ldots x_3^{N-1} x_3^N)$$

The mirror flip 1 of quadrant q $$T_1^q = (DG(0) \wedge DG(7)) \wedge (B^q \wedge E^q), 0 \leq q \leq 7$$

The obtained 3 digits $T_1^q$ above represents the flip rule of mirror flip 1. The specific flip rule is as follows: there is only one different bit between the coordinates of starting point and the coordinates of ending point, so $G(0) \wedge DG(7)$ and $B^q \wedge E^q$ only one digit 1. Therefore, there are only two 1 or all 0s in each binary bit of $T_1^q$, if the ith bit and jth bit of $T_1^q$ is 1, then exchange coordinates $X_i$ and $X_j$, $1 \leq i, j \leq 3$.

The mirror flip 2 of quadrant q $$T_2^q = DG(0) \wedge B^q, 0 \leq q \leq 7$$

The obtained 3 digits $T_2^q$ represents the flip rule of mirror flip 2. The specific flip rule is as follows: if the ith bit of $T_2^q$ is 1, setting $X_i = 2^n - 1 - X_i$, where n is the order of the curve to be flipped.

Hilbert coding is the process of calculating the Hilbert code $HCode_N = (C_1 C_2 \ldots C_n \ldots C_{N-1} C_N)$ according to the given coordinates ($X_1$, $X_2$, $X_3$), where $C_n$ is the 3-bit binary subcode of each layer, and n is taken from 1 to N to obtain $C_n$ by the following calculation.

1. $C_n = DG((x_1^n x_2^n x_3^n)_2)$
2. Set $X_i = (x_i^{n+1} \ldots x_i^{N-1} x_i^N)$, $1 \leq i \leq 3$
3. Mirror Flip 2: if the ith bit of $t_2^{C_n}$ is 1, make $X_i = 2^{N-n+1} - 1 - X_i$, $1 \leq i \leq 3$.
4. Mirror Flip 1: if the ith bit and jth bit of $T_1^{C_n}$ is 1, $X_i \leftrightarrow X_j$, $1 \leq i, j \leq 3$.

Embodiment 1

Figure 2:
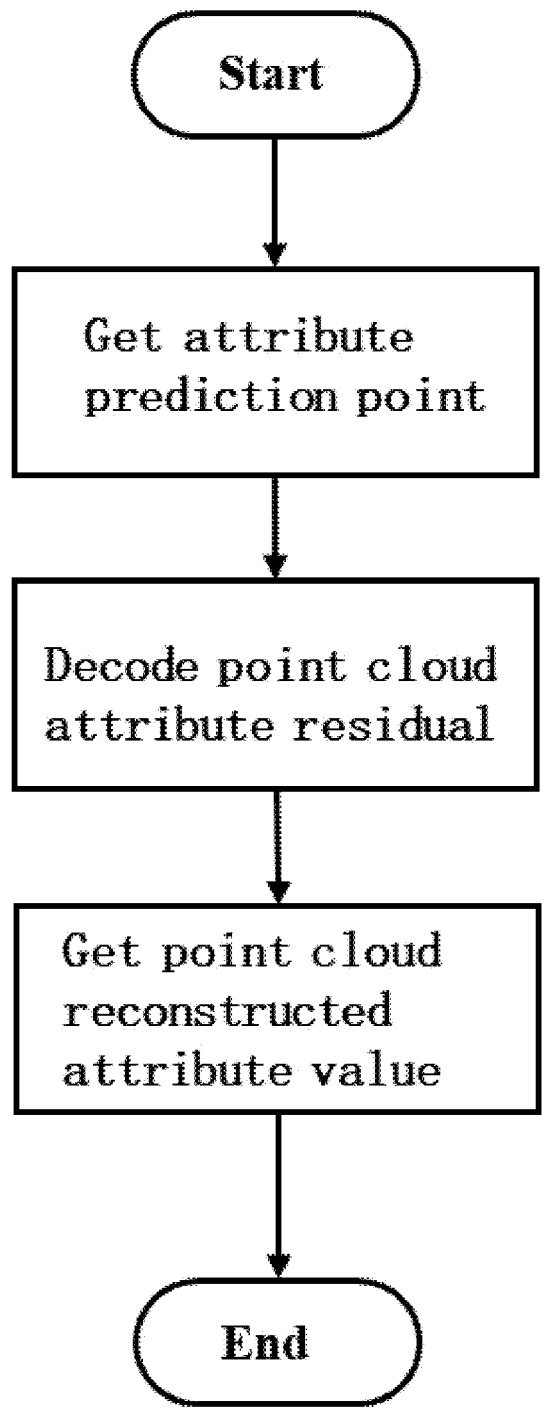
FIG. 2 is an algorithm flow chart of an embodiment of the present disclosure.

A method of decoding point cloud attribute based on a new processing order in this embodiment, as shown in FIG. 2, includes the following contents.

For the reconstructed point cloud geometry, the associated Hilbert code is generated according to its three-dimensional spatial coordinates. As mentioned above, for a point given three-dimensional coordinate ($X_1$, $X_2$, $X_3$), its coordinates are expanded in terms of binary as follows:

$$X_1=(x_1^1 x_1^2 \ldots x_1^n \ldots x_1^{N-1} x_1^N), X_2=(x_2^1 x_2^2 \ldots x_2^n \ldots x_2^{N-1} x_2^N), X_3=(x_3^1 x_3^2 \ldots x_3^n \ldots x_3^{N-1} x_3^N)$$

The Hilbert code of the point ($X_1$, $X_2$, $X_3$) can be obtained by the following process, $HCode_N = (C_1 C_2 \ldots C_n \ldots C_{N-1} C_N)$, where $C_n$ is a 3-bit binary subcode, $C_n$ is obtained by sequentially taking n from 1 to N through the following calculation 1. $C_n=DG((x_1{}^n x_2{}^n x_3{}^n)_2)$
2. Set $X_i=(x_i{}^{n+1} \ldots x_i{}^{N-1} x_i{}^N)$, $1 \leq i \leq 3$
3. Mirror Flip 2: if the ith bit of $t_2{}^{C_n}$ is 1, make $X_i=2^{N-n+1}-1-X_i$, $1 \leq i \leq 3$
4. Mirror Flip 1: if the ith bit and jth bit of $T_1{}^{C_n}$ is 1, $X_i \leftrightarrow X_j$, $1 \leq i, j \leq 3$;

The attribute values of points in the point cloud are processed in sequence according to Hilbert order, and the attribute values of the current points are processed by the following steps: Use the weighted average of reconstructed attribute values of preceding decoding points in Hilbert order is as the attribute prediction value of the current point, where Hilbert order is the point order obtained by sorting points in the point cloud from small to large or from large to small according to their corresponding Hilbert code values: use the first point P of the current point in Hilbert order, let its attribute value=Â. That is, Â is the attribute prediction value of the current point;

1) Decode the attribute residual value R of the current point from the bitstream;

Obtain the reconstructed attribute value of the current point according to the attribute prediction value of the current point and the decoded attribute residual value, wherein the reconstructed attribute value of the current point is A=Â+R.

Embodiment 2

A method of decoding point cloud attribute based on a new processing order in this embodiment includes: For the reconstructed point cloud geometry, the associated Hilbert code is generated according to its three-dimensional spatial coordinates. As mentioned above, for a point given three-dimensional coordinate $(X_1, X_2, X_3)$, its coordinates are expanded in terms of binary as follows:

$$X_1=(x_1{}^1 x_1{}^2 \ldots x_1{}^n \ldots x_1{}^{N-1} x_1{}^N), X_2=(x_2{}^1 x_2{}^2 \ldots x_2{}^n \ldots x_2{}^{N-1} x_2{}^N), X_3=(x_3{}^1 x_3{}^2 \ldots x_3{}^n \ldots x_3{}^{N-1} x_3{}^N)$$

The Hilbert code of the point $(X_1, X_2, X_3)$ can be obtained by the following process, $HCode_N=(C_1 C_2 \ldots C_n \ldots C_{N-1} C_N)$, where $C_n$ is a 3-bit binary subcode, $C_n$ is obtained by sequentially taking n from 1 to N through the following calculation.

1. $C_n=DG((x_1{}^n x_2{}^n x_3{}^n)_2)$
2. Let $X_i=(x_i{}^{n+1} \ldots x_i{}^{N-1} x_i{}^N)$, $1 \leq i \leq 3$
3. Mirror Flip 2: if the $i^{th}$ bit of $t_2{}^{C_n}$ is 1, make $X_i=2^{N-n+1}-1-X_i$, $1 \leq i \leq 3$
4. Mirror Flip 1: if the $i^{th}$ bit and $j^{th}$ bit of $T_1{}^{C_n}$ is 1, $X_i \leftrightarrow X_j$, $1 \leq i, j \leq 3$;

The attribute values of points in the point cloud are processed in sequence according to Hilbert order, and the attribute values of the current points are processed by the following steps:

1) N proceeding decoding points in Hilbert order are used as the attribute prediction points of the current point, where n is a natural number. n is taken to be 3 in this embodiment: use the first three points of the current 128 points in Hilbert order, $P_i=(Z_i, Y_i, Z_i)$, i=1, 2, 3. Set their attribute values $(A_i)_{i=1,2,3}$;

2) The weighted average of the reconstructed attribute values from these three attribute prediction points is used as the attribute prediction value of the current point: the weights $(\omega_i)_{i=1,2,3}$ of the three points are obtained respectively, $$\omega_i = \frac{1}{d_i},$$

$$i = 1, 2, 3$$

Where $d_i$ is the distance of point $P_i$ from current point (X, Y, Z), the distance is at least one of the following distances:
Euclidean distance: $d_i=\sqrt{a(X_i-X)^2+b(Y_i-Y)^2+c(Z_i-Z)^2}$
Square of Euclidean distance: $d_i=a(X_i-X)^2+b(Y_i-Y)^2+c(Z_i-Z)^2$
Chebyshev distance: $d_i=\max(a|X_i-X|, b|Y_i-Y|, c|Z_i-Z|)$
Manhattan distance: $d_i=a|X_i-X|+b|Y_i-Y|+c|Z_i-Z|$
a, b, c are weighting coefficients of three dimensions, which are used to control the weights of the three dimensions. In this embodiment, the weighting coefficient a, b, c are respectively valued as a=2, b=1, c=3;
Use the following formula to calculate the weighted average of the attribute values of three points $P_1$, $P_2$, $P_3$, and take the weighted average value as the attribute prediction value of the current point Â, $$\hat{A} = \frac{\sum_{i=1}^{3} \omega_i A_i}{\sum_{i=1}^{3} \omega_i}$$

3) Decoding the attribute residual value of the current point from the bitstream R;
4) Obtaining the reconstructed attribute value of the current point according to the attribute prediction value of the current point and the decoded attribute residual value, wherein the reconstructed attribute value of the current point is A=Â+R.

Embodiment 3

A point cloud attribute decoding method based on a new processing order in this embodiment includes the following contents.

For the reconstructed point cloud geometry, the corresponding Hilbert code is generated according to its three-dimensional spatial coordinates. As mentioned above, for a given three-dimensional coordinate $(X_1, X_2, X_3)$, the coordinates of the point are expanded in binary as follows:

$$X_1=(x_1{}^1 x_1{}^2 \ldots x_1{}^n \ldots x_1{}^{N-1} x_1{}^N), X_2=(x_2{}^1 x_2{}^2 \ldots x_2{}^n \ldots x_2{}^{N-1} x_2{}^N), X_3=(x_3{}^1 x_3{}^2 \ldots x_3{}^n \ldots x_3{}^{N-1} x_3{}^N)$$

Hilbert code $HCode_N=(C_1 C_2 \ldots C_n \ldots C_{N-1} C_N)$ of the point $(X_1, X_2, X_3)$ can be obtained by the following process, in which $C_n$ is a 3-bit binary subcode, $C_n$ is obtained by taking n from 1 to N in order for the following calculation:

1. $C_n=DG((x_1{}^n x_2{}^n x_3{}^n)_2)$
2. Let $X_i=(x_i{}^{n+1} \ldots x_i{}^{N-1} x_i{}^N)$, $1 \leq i \leq 3$
3. Mirror Flip 2: if the $i^{th}$ bit of $t_2{}^{C_n}$ is 1, make $X_i=2^{N-n+1}-1-X_i$, $1 \leq i \leq 3$
4. Mirror Flip 1: if the $i^{th}$ bit and $j^{th}$ bit of $T_1{}^{C_n}$ is 1, $X_i \leftrightarrow X_j$, $1 \leq i, j \leq 3$;

The attribute values of points in the point cloud are processed in sequence according to Hilbert order, and the attribute values of the current points are processed by the following steps:

1) N decoding points in the preceding of Hilbert order are selected as the attribute prediction points of the current point, where n is a natural number, and in this embodiment, n is taken as 3: the first three points of the current 128 points under Hilbert order $P_i=(X_i, Y_i, Z_i)$, i=1, 2, 3 are selected. Set their property values as follows $(A_i)_{i=1,2,3}$;

2) The weighted average of the reconstructed attribute values from these three attribute prediction points is used as the attribute prediction value of the current point: the weights $(\omega_i)_{i=1,2,3}$ of the three points are obtained respectively, $$\omega_i = \frac{1}{d_i},$$
$$i = 1, 2, 3$$

Where, $d_i$ is the distance between the point $P_i$ and the current point (X, Y, Z), which can be at least one of the following distances:

Euclidean distance: $d_i=\sqrt{a(X_i-X)^2+b(Y_i-Y)^2+c(Z_i-Z)^2}$

Square of Euclidean distance: $d_i=a(X_i-X)^2+b(Y_i-Y)^2+c(Z_i-Z)^2$

Chebyshev distance: $d_i=\max(a|X_i-X|, b|Y_i-Y|, c|Z_i-Z|)$

Manhattan distance: $d_i=a|X_i-X|+b|Y_i-Y|+c|Z_i-Z|$ a, b, c are weighting coefficients of three dimensions, which are used to control the weights of the three dimensions. In this embodiment, the weighting coefficient a, b, c are respectively valued as a=2, b=1, c=3;

Use the following formula to calculate the weighted average of the attribute values of three points $P_1$, $P_2$, $P_3$, and take the weighted average value as the attribute prediction value of the current point $\hat{A}$, $$\hat{A} = \frac{\sum_{i=1}^{3} \omega_i A_i}{\sum_{i=1}^{3} \omega_i}$$

3) Decoding the attribute residual value of the current point from the bitstream R;
4) Obtaining the reconstructed attribute value of the current point according to the attribute prediction value of the current point and the decoded attribute residual value, wherein the reconstructed attribute value of the current point is $A=\hat{A}+R$.

Embodiment 4

A point cloud attribute decoding method based on a new processing order in this embodiment includes the following contents.

For the reconstructed point cloud geometry, the corresponding Hilbert code is generated according to its three-dimensional spatial coordinates. As mentioned above, for a given three-dimensional coordinate $(X_1, X_2, X_3)$, the coordinates of the point are expanded in binary as follows:

$$X_1=(x_1^1 x_1^2 \ldots x_1^n \ldots x_1^{N-1} x_1^N), X_2=(x_2^1 x_2^2 \ldots x_2^n \ldots x_2^{N-1} x_2^N), X_3=(x_3^1 x_3^2 \ldots x_3^n \ldots x_3^{N-1} x_3^N)$$

Hilbert code $HCode_N=(C_1 C_2 \ldots C_n \ldots C_{N-1} C_N)$ of the point $(X_1, X_2, X_3)$ can be obtained by the following process, in which $C_n$ is a 3-bit binary subcode, $C_n$ is obtained by taking n from 1 to N in order for the following calculation:

1. $C_n=DG((x_1^n x_2^n x_3^n)_2)$
2. Let $X_i=(x_i^{n+1} \ldots x_i^{N-1} x_i^N)$, $1 \leq i \leq 3$ 3. Mirror Flip 2: if the $i^{th}$ bit of $t_2^{C_n}$ is 1, make $X_i=2^{N-n+1}-1-X_i$, $1 \leq i \leq 3$
4. Mirror Flip 1: if the $i^{th}$ bit and $j^{th}$ bit of $T_1^{C_n}$ is 1, $X_i \leftrightarrow X_j$, $1 \leq i, j \leq 3$;

The attribute values of points in the point cloud are processed in sequence according to Hilbert order, and the attribute values of the current points are processed by the following steps:

1) Using coplanar points of the current point and collinear points of the current point among L numbered preceding points in the Hilbert order as prediction points of attribute of the current point, wherein each of the coplanar points is the point located in its cube that has a common surface with the cube where the current point is located, each of the collinear points is the point located in its cube that has a common edge with the cube where the current point located, and L is a natural number greater than 0. In this embodiment, L is taken as 128: search the first 128 points of the current point in Hilbert order for coplanar and collinear points with the current point k, if k is not 0, let these neighbors be $(P_i)_{i=1,2 \ldots k}$, the attribute value of each neighbor point is $(A_i)_{i=1,2 \ldots k}$;

2) Weight coplanar points and collinear points $\omega_{pl}$ and $\omega_{po}$ respectively, in which $\omega_{pl}$ and $\omega_{po}$ are real number greater than or equal to 0, $\omega_{pl}$ is greater than $\omega_{po}$, In this embodiment, let $\omega_{pl}=2$, $\omega_{po}=1$, the weight of each neighbor point is $(\omega_i)_{i=1,2 \ldots k}$, in which the neighbor points with a distance of 1 are given a weight of 2, and the neighbor points with a distance of $\sqrt{2}$ are given a weight of 2;

3) The weighted average of the reconstructed attribute value of coplanar points and collinear points is used as the attribute prediction value of the current point: the weighted average of the attribute values of these neighboring points $(P_i)_{i=1,2 \ldots k}$ are calculated by using the following formula, and take the weighted average value as the attribute prediction value of the current point $\hat{A}$, $$\hat{A} = \frac{\sum_{i=1}^{k} \omega_i A_i}{\sum_{i=1}^{k} \omega_i}$$

4) Decoding the attribute residual value of the current point from the bitstream R;
5) Obtaining the reconstructed attribute value of the current point according to the attribute prediction value of the current point and the decoded attribute residual value, wherein the reconstructed attribute value of the current point is $A=\hat{A}+R$.

Embodiment 5

A point cloud attribute decoding method based on a new processing order in this embodiment includes the following contents.

For the reconstructed point cloud geometry, the corresponding Hilbert code is generated according to its three-dimensional spatial coordinates. As mentioned above, for a given three-dimensional coordinate $(X_1, X_2, X_3)$, the coordinates of the point are expanded in binary as follows:

$$X_1=(x_1^1 x_1^2 \ldots x_1^n \ldots x_1^{N-1} x_1^N), X_2=(x_2^1 x_2^2 \ldots x_2^n \ldots x_2^{N-1} x_2^N), X_3=(x_3^1 x_3^2 \ldots x_3^n \ldots x_3^{N-1} x_3^N)$$

Hilbert code $HCode_N=(C_1C_2 \ldots C_n \ldots C_{N-1}C_N)$ of the point $(X_1, X_2, X_3)$ can be obtained by the following process, in which $C_n$ is a 3-bit binary subcode, $C_n$ is obtained by taking n in order from 1 to N for the following calculation:
1. $C_n=DG((x_1{}^n x_2{}^n x_3{}^n)_2)$
2. Let $X_i=(x_i^{n+1} \ldots x_i^{N-1} x_i^N)$, $1 \leq i \leq 3$
3. Mirror Flip 2: if the $i^{th}$ bit of $t_2{}^{C_n}$ is 1, make $X_i=2^{N-n+1}-1-X_i$, $1 \leq i \leq 3$
4. Mirror Flip 1: if the $i^{th}$ bit and $j^{th}$ bit of $T_1{}^{C_n}$ is 1, $X_i \leftrightarrow X_j$, $1 \leq i, j \leq 3$;

Constructing L-level of detail $(LOD_i)_{i=0,1 \ldots L-1}$, in which, $LOD_i$ is a subset of the reconstructed point cloud, $LOD_i \subset LOD_j (i<j)$, $LOD_{L-1}$ is the whole reconstructed point cloud, L is a natural number greater than 0, and L is taken as 10 in this embodiment;

Obtain n attribute prediction points of the current point, and make $(R_i=LOD_i-LOD_{i-1})_{i=1 \ldots L-1}$, $R_0=LOD_0$, for a point P of Hilbert code H in $R_i$, n points which are closest to the point P are selected from the points of Hilbert code in the range of $[H_1, H_2](H_1 \leq H \leq H_2)$ in $LOD_{i-1}$, and these n points are used as the attribute prediction points of the current point, where N is a natural number, in this embodiment, n is taken as 3. Make these three attribute prediction points as $P_i=(X_i, Y_i, Z_i)$, i=1, 2, 3, set their property values as $(A_i)_{i=1,2,3}$;

The weighted average of the reconstructed attribute values from these three attribute prediction points is used as the attribute prediction value of the current point: the weights of the three points $(\omega_i)_{i=1,2,3}$ are obtained respectively, $$\omega_i = \frac{1}{d_i},$$
$$i = 1, 2, 3$$

Among them, $d_i$ is the distance between the point $P_i$ and the current point $(X, Y, Z)$, which can be at least one of the following distances:

Euclidean distance: $d_i=\sqrt{a(X_i-X)^2+b(Y_i-Y)^2+c(Z_i-Z)^2}$

Square of Euclidean distance: $d_i=a(X_i-X)^2+b(Y_i-Y)^2+c(Z_i-Z)^2$

Chebyshev distance: $d_i=\max(a|X_i-X|, b|Y_i-Y|, c|Z_i-Z|)$

Manhattan distance: $d_i=a|X_i-X|+b|Y_i-Y|+c|Z_i-Z|$ a, b, c are weighting coefficients of three dimensions, which are used to control the weights of the three dimensions. In this embodiment, the weighting coefficient a, b, c are respectively valued as a=2, b=1, c=3;

Use the following formula to calculate the weighted average of the attribute values of three points $P_1, P_2, P_3$, and take the weighted average value as the attribute prediction value of the current point $\hat{A}$, $$\hat{A} = \frac{\sum_{i=1}^{3} \omega_i A_i}{\sum_{i=1}^{3} \omega_i}$$

Decoding the attribute residual value of the current point from the bitstream R;

Obtaining the reconstructed attribute value of the current point according to the attribute prediction value of the current point and the decoded attribute residual value, wherein the reconstructed attribute value of the current point is $A=\hat{A}+R$.

Embodiment 6

Figure 3:
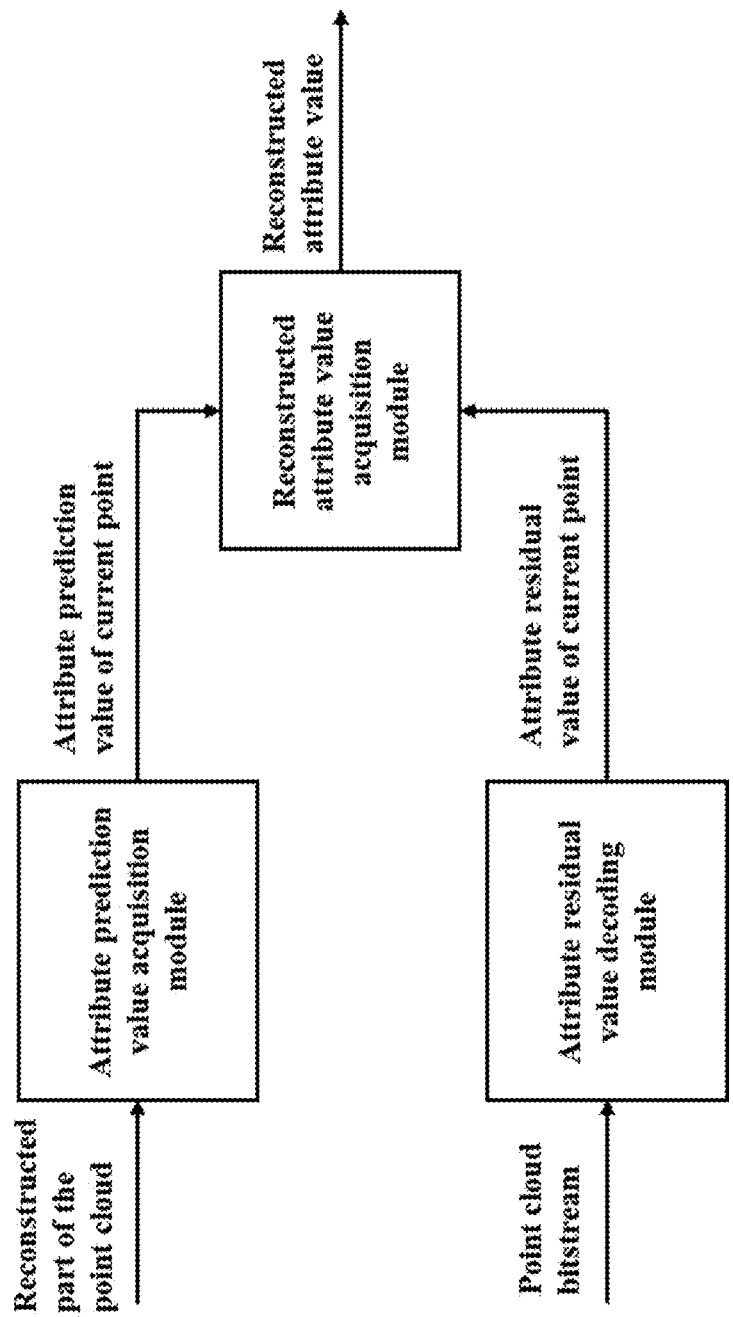
FIG. 3 is a schematic diagram of the device according to the patent embodiment of the disclosure.

As shown in FIG. 3, a point cloud attribute decoding device based on a new processing order in this embodiment includes the following modules, Hilbert code generation module: the input of this module is the reconstructed point cloud geometry, and the output is the point cloud geometry containing Hilbert code. For the reconstructed point cloud geometry, this module generates the corresponding Hilbert code according to its three-dimensional spatial coordinates. As mentioned above, for a given three-dimensional coordinate $(X_1, X_2, X_3)$, the coordinates of the point are expanded in binary as follows:

$$X_1=(x_1^1 x_1^2 \ldots x_1^n \ldots x_1^{N-1} x_1^N), X_2=(x_2^1 x_2^2 \ldots x_2^n \ldots x_2^{N-1} x_2^N), X_3=(x_3^1 x_3^2 \ldots x_3^n \ldots x_3^{N-1} x_3^N)$$

Hilbert code $HCode_N=(C_1C_2 \ldots C_n \ldots C_{N-1}C_N)$ of the point $(X_1, X_2, X_3)$ can be obtained by the following process, in which $C_n$ is a 3-bit binary subcode, $C_n$ is obtained by taking n from 1 to N in order for the following calculation:
1. $C_n=DG((x_1{}^n x_2{}^n x_3{}^n)_2)$
2. Let $X_i=(x_i^{n+1} \ldots x_i^{N-1} x_i^N)$, $1 \leq i \leq 3$
3. Mirror Flip 2: if the $i^{th}$ bit of $t_2{}^{C_n}$ is 1, make $X_i=2^{N-n+1}-1-X_i$, $1 \leq i \leq 3$
4. Mirror Flip 1: if the $i^{th}$ bit and $j^{th}$ bit of $T_1{}^{C_n}$ is 1, $X_i \leftrightarrow X_j$, $1 \leq i, j \leq 3$;

Process the attribute values of points in the point cloud in sequence according to Hilbert order, and execute the following modules to process the attribute values of the current points:

1) An attribute prediction value acquisition module: the input of the module is the reconstructed point cloud, and the output is the attribute prediction value of the current point, and the module uses the weighted average of the reconstructed attribute values of the preceding decoding points in Hilbert order as the attribute prediction value of the current point, wherein the Hilbert order is the point order obtained by sorting the points in the point cloud from small to large or from large to small according to their corresponding Hilbert code values: select the first point P of the current point in Hilbert order, set its property values as $\hat{A}$, the property value $\hat{A}$, is the attribute prediction value of the current point;

2) Attribute residual decoding module: the input of this module is the bitstream and the output is the attribute residual, and this module decodes the attribute residual value of the current point from the bitstream R;

3) Reconstructed attribute value acquisition module: the input of the module is attribute residual and attribute prediction value, and the output is the reconstructed attribute value of the current point, and the module obtains the reconstructed attribute value of the current point according to the attribute prediction value of the current point and the decoded attribute residual value: the reconstructed attribute value of the current point is $A=\hat{A}+R$.

Embodiment 7

A point cloud attribute decoding device based on a new processing order in this embodiment includes the following modules.

Hilbert code generation module: the input of this module is the reconstructed point cloud geometry, and the output is the point cloud geometry containing Hilbert code. For the reconstructed point cloud geometry, this module generates the corresponding Hilbert code according to its three-dimensional spatial coordinates. As mentioned above, for a given three-dimensional coordinate $(X_1, X_2, X_3)$, the coordinates of the point are expanded in binary as follows $$X_1=(x_1^1 x_1^2 \ldots x_1^n \ldots x_1^{N-1} x_1^N), X_2=(x_2^1 x_2^2 \ldots x_2^n \ldots x_2^{N-1} x_2^N), X_3=(x_3^1 x_3^2 \ldots x_3^n \ldots x_3^{N-1} x_3^N)$$

Hilbert code $HCode_N=(C_1 C_2 \ldots C_n \ldots C_{N-1} C_N)$ of the point $(X_1, X_2, X_3)$ can be obtained by the following process, in which $C_n$ is a 3-bit binary subcode, $C_n$ is obtained by taking n from 1 to N in order for the following calculation:

1. $C_n = DG((x_1^n x_2^n x_3^n)_2)$
2. Let $X_i = (x_i^{n+1} \ldots x_i^{N-1} x_i^N)$, $1 \leq i \leq 3$
3. Mirror Flip 2: if the $i^{th}$ bit of $t_2^{C_n}$ is 1, make $X_i = 2^{N-n+1}-1-X_i$, $1 \leq i \leq 3$
4. Mirror Flip 1: if the $i^{th}$ bit and $j^{th}$ bit of $T_1^{C_n}$ is 1, $X_i \leftrightarrow X_j$, $1 \leq i, j \leq 3$;

Process the attribute values of points in the point cloud in sequence according to Hilbert order, and execute the following modules to process the attribute values of the current points:

1) Attribute prediction point acquisition module: the input of this module is the reconstructed point cloud, and the output is the attribute prediction point of the current point. This module selects n decoded points in Hilbert order as the attribute prediction points of the current point, where n is a natural number. In this embodiment, n is taken as 3: the first three points $P_i=(X_1, =1, 2, 3$ in previous 128 points of the current point in Hilbert order are selected, set their property values as follows $(A_i)_{i=1,2,3}$;

2) Attribute prediction value calculation module: the input of this module is the attribute prediction point, and the output is the attribute prediction value of the current point. This module uses the weighted average of the reconstructed attribute values of these three attribute prediction points as the attribute prediction value of the current point: the weights $(\omega_i)_{i=1,2,3}$ of the three points are obtained respectively, $$\omega_i = \frac{1}{d_i},$$

$i = 1, 2, 3$

Among them, $d_i$ is the distance between the point $P_i$ and the current point $(X, Y, Z)$, which can be at least one of the following distances:

Euclidean distance: $d_i = \sqrt{a(X_i-X)^2 + b(Y_i-Y)^2 + c(Z_i-Z)^2}$

Square of Euclidean distance: $d_i = a(X_i-X)^2 + b(Y_i-Y)^2 + c(Z_i-Z)^2$

Chebyshev distance: $d_i = \max(a|X_i-X|, b|Y_i-Y|, c|Z_i-Z|)$

Manhattan distance: $d_i = a|X_i-X| + b|Y_i-Y| + c|Z_i-Z|$ a, b, c are weighting coefficients of three dimensions, which are used to control the weights of the three dimensions. In this embodiment, the weighting coefficient a, b, c are respectively valued as a=2, b=1, c=3;

Use the following formula to calculate the weighted average of the attribute values of three points $P_1, P_2, P_3$, and take the weighted average value as the attribute prediction value of the current point Â, $$\hat{A} = \frac{\sum_{i=1}^{3} \omega_i A_i}{\sum_{i=1}^{3} \omega_i}$$

3) Attribute residual decoding module: the input of this module is the bitstream and the output is the attribute residual, and this module decodes the attribute residual value of the current point from the bitstream R;

Reconstructed attribute value acquisition module: the input of the module is attribute residual and attribute prediction value, and the output is the reconstructed attribute value of the current point, and the module obtains the reconstructed attribute value of the current point according to the attribute prediction value of the current point and the decoded attribute residual value: the reconstructed attribute value of the current point is A=Â+R.

Embodiment 8

A point cloud attribute decoding device based on a new processing order in this embodiment includes the following modules.

Hilbert code generation module: the input of this module is the reconstructed point cloud geometry, and the output is the point cloud geometry containing Hilbert code. For the reconstructed point cloud geometry, this module generates the corresponding Hilbert code according to its three-dimensional spatial coordinates. As mentioned above, for a given three-dimensional coordinate $(X_1, X_2, X_3)$, the coordinates of the point are expanded in binary as follows:

$$X_1=(x_1^1 x_1^2 \ldots x_1^n \ldots x_1^{N-1} x_1^N), X_2=(x_2^1 x_2^2 \ldots x_2^n \ldots x_2^{N-1} x_2^N), X_3=(x_3^1 x_3^2 \ldots x_3^n \ldots x_3^{N-1} x_3^N)$$

Hilbert code $HCode_N=(C_1 C_2 \ldots C_n \ldots C_{N-1} C_N)$ of the point $(X_1, X_2, X_3)$ can be obtained by the following process, in which $C_n$ is a 3-bit binary subcode, $C_n$ is obtained by taking n from 1. $C_n = DG((x_1^n x_2^n x_3^n)_2)$
2. Let $X_i = (x_i^{n+1} \ldots x_i^{N-1} x_i^N)$, $1 \leq i \leq 3$
3. Mirror Flip 2: if the $i^{th}$ bit of $t_2^{C_n}$ is 1, make $X_i = 2^{N-n+1}-1-X_i$, $1 \leq i \leq 3$
4. Mirror Flip 1: if the $i^{th}$ bit and $j^{th}$ bit of $T_1^{C_n}$ is 1, $X_i \leftrightarrow X_j$, $1 \leq i, j \leq 3$;

Process the attribute values of points in the point cloud in sequence according to Hilbert order, and execute the following modules to process the attribute values of the current points:

1) Attribute prediction point acquisition module: the input of this module is the reconstructed point cloud, and the output is the attribute prediction point of the current point. This module selects n decoded points in Hilbert order as the attribute prediction points of the current point, where n is a natural number. In this embodiment, n is taken as 3: the first three points $P_i=(X_i, Y_i, Z_i)$, i=1, 2, 3 in previous 128 points of the current point in Hilbert order are selected, set their property values as follows $(A_i)_{i=1,2,3}$;

2) Attribute prediction value calculation module: the input of this module is the attribute prediction point, and the output is the attribute prediction value of the current point. This module uses the weighted average of the reconstructed attribute values of these three attribute prediction points as the attribute prediction value of the current point: the weights $(\omega_i)_{i=1,2,3}$ of the three points are obtained respectively, $$\omega_i = \frac{1}{d_i},$$
$$i = 1, 2, 3$$

Among them, $d_i$ is the distance between the point $P_i$ and the current point (X, Y, Z), which can be at least one of the following distances:

Euclidean distance: $d_i=\sqrt{a(X_i-X)^2+b(Y_i-Y)^2+c(Z_i-Z)^2}$

Square of Euclidean distance: $d_i=a(X_i-X)^2+b(Y_i-Y)^2+c(Z_i-Z)^2$

Chebyshev distance: $d_i=\max(a|X_i-X|, b|Y_i-Y|, c|Z_i-Z|)$

Manhattan distance: $d_i=a|X_i-X|+b|Y_i-Y|+c|Z_i-Z|$ a, b, c are weighting coefficients of three dimensions, which are used to control the weights of the three dimensions. In this embodiment, the weighting coefficient a, b, c are respectively valued as a=2, b=1, c=3;

Use the following formula to calculate the weighted average of the attribute values of the three points $P_1$, $P_2$, $P_3$, and take the weighted average value as the attribute prediction value $\hat{A}$ of the current point, $$\hat{A} = \frac{\sum_{i=1}^{3} \omega_i A_i}{\sum_{i=1}^{3} \omega_i}$$

3) Attribute residual decoding module: the input of this module is the bitstream and the output is the attribute residual, and this module decodes the attribute residual value of the current point from the bitstream R;

4) Reconstructed attribute value acquisition module: the input of the module is attribute residual and attribute prediction value, and the output is the reconstructed attribute value of the current point, and the module obtains the reconstructed attribute value of the current point according to the attribute prediction value of the current point and the decoded attribute residual value: the reconstructed attribute value of the current point is $A=\hat{A}+R$.

Embodiment 9

A point cloud attribute decoding device based on a new processing order in this embodiment includes the following modules.

Hilbert code generation module: the input of this module is the reconstructed point cloud geometry, and the output is the point cloud geometry containing Hilbert code. For the reconstructed point cloud geometry, this module generates the corresponding Hilbert code according to its three-dimensional spatial coordinates. As mentioned above, for a given three-dimensional coordinate $(X_1, X_2, X_3)$, the coordinates of the point are expanded in binary as follows $X_1=(x_1^1 x_1^2 \ldots x_1^n \ldots x_1^{N-1} x_1^N), X_2=(x_2^1 x_2^2 \ldots x_2^n \ldots x_2^{N-1} x_2^N), X_3=(x_3^1 x_3^2 \ldots x_3^n \ldots x_3^{N-1} x_3^N)$ Hilbert code $HCode_N=(C_1 C_2 \ldots C_n \ldots C_{N-1} C_N)$ of the point $(X_1, X_2, X_3)$ can be obtained by the following process, in which $C_n$ is a 3-bit binary subcode, $C_n$ is obtained by taking n from 1 to N in order for the following calculation:
1. $C_n = DG((x_1^n x_2^n x_3^n)_2)$
2. Let $X_i = (x_i^{n+1} \ldots x_i^{N-1} x_i^N)$, $1 \leq i \leq 3$
3. Mirror Flip 2: if the $i^{th}$ bit of $t_2^{C_n}$ is 1, make $X_i = 2^{N-n+1}-1-X_i$, $1 \leq i \leq 3$
4. Mirror Flip 1: if the $i^{th}$ bit and $j^{th}$ bit of $T_1^{C_n}$ is 1, $X_i \leftrightarrow X_j$, $1 \leq i, j \leq 3$;

Process the attribute values of points in the point cloud in sequence according to Hilbert order, and execute the following modules to process the attribute values of the current points:

1) Attribute prediction point acquisition module: the input of the module is the reconstructed point cloud, and the output is the attribute prediction point of the current point, and the module selects the coplanar point and collinear point of the current point among L points in the preceding of Hilbert order as the attribute prediction points of the current point, where the coplanar point is the point whose cube has a common surface with the current point, the collinear point is the point whose cube has a common edge with the current point, and L is a natural number greater than 0, in this embodiment, L is taken as 128: search the first 128 points of the current point in Hilbert order for coplanar and collinear points with the current point k, if k is not 0, let these neighbors be $(P_i)_{i=1,2 \ldots k}$, the attribute value of each neighbor point is $(A_i)_{i=1,2 \ldots k}$;

2) Attribute prediction point weighting module: the input of this module is attribute prediction point, and the output is attribute prediction point with weight, and this module gives coplanar points and collinear points $\omega_{pl}$ and $\omega_{po}$ respectively, in which $\omega_{pl}$ and $\omega_{po}$ are real number greater than or equal to 0, $\omega_{pl}$ is greater than $\omega_{po}$, In this embodiment, let $\omega_{pl}=2$, $\omega_{po}=1$, the weight of each neighbor point is $(\omega_i)_{i=1,2 \ldots k}$, in which the neighbor points with a distance of 1 are given a weight of 2, and the neighbor points with a distance of $\sqrt{2}$ are given a weight of 2;

3) Attribute prediction value calculation module: the input of this module is the weighted attribute prediction point, and the output is the attribute prediction value of the current point. This module uses the weighted average of the reconstructed attribute values of coplanar points and collinear points as the attribute prediction value of the current point: calculate the weighted average of the attribute values of these neighbor points $(P_i)_{i=1,2 \ldots k}$ by using the following formula, and take the weighted average value as the attribute prediction value of the current point $\hat{A}$, $$\hat{A} = \frac{\sum_{i=1}^{k} \omega_i A_i}{\sum_{i=1}^{k} \omega_i}$$

4) Attribute residual decoding module: the input of this module is the bitstream and the output is the attribute residual, and this module decodes the attribute residual value of the current point from the bitstream R;

Reconstructed attribute value acquisition module: the input of the module is attribute residual and attribute prediction value, and the output is the reconstructed attribute value of the current point, and the module obtains the reconstructed attribute value of the current point according to the attribute prediction value of the current point and the decoded attribute residual value: the reconstructed attribute value of the current point is $A=\hat{A}+R$.

Embodiment 10

A point cloud attribute decoding device based on a new processing order in this embodiment includes the following modules.

Hilbert code generation module: the input of this module is the reconstructed point cloud geometry, and the output is the point cloud geometry containing Hilbert code. For the reconstructed point cloud geometry, this module generates the corresponding Hilbert code according to its three-dimensional spatial coordinates. As mentioned above, for a given three-dimensional coordinate $(X_1, X_2, X_3)$, the coordinates of the point are expanded in binary as follows:

$$X_1=(x_1^1 x_1^2 \ldots x_1^n \ldots x_1^{N-1} x_1^N), X_2=(x_2^1 x_2^2 \ldots x_2^n \ldots x_2^{N-1} x_2^N), X_3=(x_3^1 x_3^2 \ldots x_3^n \ldots x_3^{N-1} x_3^N)$$

Hilbert code $HCode_N=(C_1 C_2 \ldots C_n \ldots C_{N-1} C_N)$ of the point $(X_1, X_2, X_3)$ can be obtained by the following process, in which $C_n$ is a 3-bit binary subcode, $C_n$ is obtained by taking n from 1 to N in order for the following calculation:

1. $C_n = DG((x_1^n x_2^n x_3^n)_2)$
2. Set $X_i = (x_i^{n+1} \ldots x_i^{N-1} x_i^N)$, $1 \le i \le 3$
3. Mirror Flip 2: if the $i^{th}$ bit of $t_2^{C_n}$ is 1, make $X_i = 2^{N-n+1} - 1 - X_i$, $1 \le i \le 3$
4. Mirror Flip 1: if the $i^{th}$ bit and $j^{th}$ bit of $T_1^{C_n}$ is 1, $X_i \leftrightarrow X_j$, $1 \le i, j \le 3$;

LOD building module: The input of this module is the reconstructed point cloud geometry, and the output is the built LOD, this module builds L-level detail level $(LOD_i)_{i=0,1 \ldots L-1}$, in which, $LOD_i$ is a subset of the reconstructed point cloud, $LOD_i \subset LOD_j (i<j)$, $LOD_{L-1}$ is the whole reconstructed point cloud, L is a natural number greater than 0, and L is taken as 10 in this embodiment;

Attribute prediction point acquisition module: the input of the module is the constructed LOD, and the output is the attribute prediction point of the current point, the module acquires n attribute prediction points of the current point, and make $(R_i = LOD_i - LOD_{i-1})_{i=1 \ldots L-1}$, $R_0 = LOD_0$, for a point P of Hilbert code H in $R_i$, n points which are closest to the point P are selected from the points of Hilbert code in the range of $[H_1, H_2]$ ($H_1 \le H \le H_2$) in $LOD_{i-1}$, and these n points are used as the attribute prediction points of the current point, where N is a natural number, in this embodiment, n is taken as 3. Make these three attribute prediction points as $P_i=(X_i, Y_i, Z_i)$, $i=1, 2, 3$, set their property values as $(A_i)_{i=1,2,3}$;

Attribute prediction value calculation module: the input of this module is the attribute prediction point, and the output is the attribute prediction value of the current point. This module uses the weighted average of the reconstructed attribute values from these three attribute prediction points is used as the attribute prediction value of the current point: the weights of the three points $(\omega_i)_{i=1, 2, 3}$ are obtained respectively, $$\omega_i = \frac{1}{d_i},$$

$i=1, 2, 3$

Among them, $d_i$ is the distance between the point $P_i$ and the current point $(X, Y, Z)$, which can be at least one of the following distances:

Euclidean distance: $d_i = \sqrt{a(X_i-X)^2+b(Y_i-Y)^2+c(Z_i-Z)^2}$

Square of Euclidean distance: $d_i = a(X_i-X)^2+b(Y_i-Y)^2+c(Z_i-Z)^2$

Chebyshev distance: $d_i = \max(a|X_i-X|, b|Y_i-Y|, c|Z_i-Z|)$

Manhattan distance: $d_i = a|X_i-X|+b|Y_i-Y|+c|Z_i-Z|$ a, b, c are weighting coefficients of three dimensions, which are used to control the weights of the three dimensions. In this embodiment, the weighting coefficient a, b, c are respectively valued as a=2, b=1, c=3;

Use the following formula to calculate three points $P_1$, $P_2$, $P_3$. The weighted average of the attribute values of, and take the weighted average as the attribute prediction value of the current point $\hat{A}$, $$\hat{A} = \frac{\sum_{i=1}^{3} \omega_i A_i}{\sum_{i=1}^{3} \omega_i}$$

Attribute residual decoding module: the input of this module is the bitstream and the output is the attribute residual, and this module decodes the attribute residual value of the current point from the bitstream R;

Reconstructed attribute value acquisition module: the input of the module is attribute residual and attribute prediction value, and the output is the reconstructed attribute value of the current point, and the module obtains the reconstructed attribute value of the current point according to the attribute prediction value of the current point and the decoded attribute residual value: the reconstructed attribute value of the current point is $A=\hat{A}+R$;

Embodiment 11

A point cloud attribute decoding method based on a new processing order in this embodiment, as shown in FIG. 2, includes the following contents, When the decoded geometric points are in Hilbert order, the point cloud attributes are directly processed according to the decoding order, and the attribute values of the current points are processed by the following steps:

1) The weighted average of reconstructed attribute values of preceding decoding points under Hilbert order is used as the attribute prediction value of the current point, where Hilbert order is the point order obtained by sorting points in the point cloud from small to large or from large to small according to their corresponding Hilbert code values: the previous point P of the current point under Hilbert order is selected, set its property values as $\hat{A}$, the property value $\hat{A}$ is the predicted value of the attribute of the current point;

2) Decoding the attribute residual value of the current point from the bitstream R;

3) Obtaining the reconstructed attribute value of the current point according to the attribute prediction value of the current point and the decoded attribute residual value, wherein the reconstructed attribute value of the current point is $A=\hat{A}+R$.

Embodiment 12

A point cloud attribute decoding method based on a new processing order in this embodiment includes the following contents.

When the decoded geometric points are in Hilbert order, the point cloud attributes are directly processed according to the decoding order, and the attribute values of the current points are processed by the following steps:

1) N decoding points in that preceding under Hilbert order are selected as the attribute prediction points of the current point, where n is a natural number, and in this embodiment, n is taken as 3: the first three points $P_i=(X_i, Y_i, Z_i)$, i=1, 2, 3 of the current point under Hilbert order are selected, set their property values as follows $(A_i)_{i=1,2,3}$;

2) The weighted average of the reconstructed attribute values from these three attribute prediction points is used as the attribute prediction value of the current point: the weights $(\omega_i)_{i=1,2,3}$ of the three points are obtained respectively, $$\omega_i = \frac{1}{d_i},$$
$$i = 1, 2, 3$$

Among them, $d_i$ is the distance between the point $P_i$ and the current point $(X, Y, Z)$, which can be at least one of the following distances:

Euclidean distance: $d_i=\sqrt{a(X_i-X)^2+b(Y_i-Y)^2+c(Z_i-Z)^2}$

Square of Euclidean distance: $d_i=a(X_i-X)^2+b(Y_i-Y)^2+c(Z_i-Z)^2$

Chebyshev distance: $d_i=\max(a|X_i-X|, b|Y_i-Y|, c|Z_i-Z|)$

Manhattan distance: $d_i=a|X_i-X|+b|Y_i-Y|+c|Z_i-Z|$ a, b, c are weighting coefficients of three dimensions, which are used to control the weights of the three dimensions. In this embodiment, the weighting coefficient a, b, c are respectively valued as a=2, b=1, c=3;

Use the following formula to calculate the weighted average of the attribute values of the three points $P_1$, $P_2$, $P_3$, and take the weighted average value as the attribute prediction value $\hat{A}$ of the current point, $$\hat{A} = \frac{\sum_{i=1}^{3} \omega_i A_i}{\sum_{i=1}^{3} \omega_i}$$

3) Decoding the attribute residual value of the current point from the bitstream R;

4) Obtaining the reconstructed attribute value of the current point according to the attribute prediction value of the current point and the decoded attribute residual value, wherein the reconstructed attribute value of the current point is $A=\hat{A}+R$.

Embodiment 13

A point cloud attribute decoding method based on a new processing order in this embodiment includes the following contents.

When the decoded geometric points are in Hilbert order, the point cloud attributes are directly processed according to the decoding order, and the attribute values of the current points are processed by the following steps:

1) Select n points closest to the current point from L points in the preceding of Hilbert order as the attribute prediction points of the current point, where n is a natural number. In this embodiment, n is taken as 3: find 3 points closest to the current point from the first 128 points of the current point in Hilbert order, and make $P_i=(X_i, Y_i, Z_i)$, i=1, 2, 3, set their property values as follows $(A_i)_{i=1,2,3}$;

2) The weighted average of the reconstructed attribute values from these three attribute prediction points is used as the attribute prediction value of the current point: the weights $(\omega_i)_{i=1, 2, 3}$ of the three points are obtained respectively, $$\omega_i = \frac{1}{d_i},$$
$$i = 1, 2, 3$$

Among them, $d_i$ is the distance between the point $P_i$ and the current point $(X, Y, Z)$, which can be at least one of the following distances:

Euclidean distance: $d_i=\sqrt{a(X_i-X)^2+b(Y_i-Y)^2+c(Z_i-Z)^2}$

Square of Euclidean distance: $d_i=a(X_i-X)^2+b(Y_i-Y)^2+c(Z_i-Z)^2$

Chebyshev distance: $d_i=\max(a|X_i-X|, b|Y_i-Y|, c|Z_i-Z|)$

Manhattan distance: $d_i=a|X_i-X|+b|Y_i-Y|+c|Z_i-Z|$ a, b, c are weighting coefficients of three dimensions, which are used to control the weights of the three dimensions. In this embodiment, the weighting coefficient a, b, c are respectively valued as a=2, b=1, c=3;

Use the following formula to calculate the weighted average of the attribute values of the three points $P_1$, $P_2$, $P_3$, and take the weighted average value as the attribute prediction value $\hat{A}$ of the current point, $$\hat{A} = \frac{\sum_{i=1}^{3} \omega_i A_i}{\sum_{i=1}^{3} \omega_i}$$

1) Decoding the attribute residual value of the current point from the bitstream R;

2) Obtaining the reconstructed attribute value of the current point according to the attribute prediction value of the current point and the decoded attribute residual value, wherein the reconstructed attribute value of the current point is $A=\hat{A}+R$.

Embodiment 14

A point cloud attribute decoding method based on a new processing order in this embodiment includes the following contents.

When the decoded geometric points are in Hilbert order, the point cloud attributes are directly processed according to the decoding order, and the attribute values of the current points are processed by the following steps:

1) Select the coplanar point and collinear point of the current point among L points in the preceding of Hilbert order as the attribute prediction points of the current point, where the coplanar point is the point where the cube where the point is located and the cube where the current point is located have a common surface, and the collinear point refers to the point where the cube where the point is located and the cube where the current point is located have a common edge, and L is a natural number greater than 0. In this embodiment, L is taken as 128: search the first 128 points of the current point in Hilbert order for coplanar and collinear neighbor points of the current point, let the number of these neighbors is k, if k is not 0, let these neighbors be $(P_i)_{i=1,2 \ldots k}$, the attribute value of each neighbor point is $(A_i)_{i=1,2 \ldots k}$;

2) Weight coplanar points and collinear points $\omega_{pl}$ and $\omega_{po}$ respectively, in which $\omega_{pl}$ and $\omega_{po}$ are real number greater than or equal to 0, $\omega_{pl}$ is greater than $\omega_{po}$, In this embodiment, let $\omega_{pl}=2$, $\omega_{po}=1$, the weight of each neighbor point is $(\omega_i)_{i=1,2 \ldots k}$, in which the neighbor points with a distance of 1 are given a weight of 2, and the neighbor points with a distance of $\sqrt{2}$ are given a weight of 2;

3) Use the weighted average of the reconstructed attribute values of coplanar points and collinear points as the attribute prediction value of the current point: calculate the weighted average of the attribute values of these neighbor points $(P_i)_{i=1,2 \ldots k}$ by using the following formula, and take the weighted average as the attribute prediction value of the current point $\hat{A}$, $$\hat{A} = \frac{\sum_{i=1}^{k} \omega_i A_i}{\sum_{i=1}^{k} \omega_i}$$

4) Decoding the attribute residual value of the current point from the bitstream R;
5) Obtaining the reconstructed attribute value of the current point according to the attribute prediction value of the current point and the decoded attribute residual value, wherein the reconstructed attribute value of the current point is $A=\hat{A}+R$.

Embodiment 15

As shown in FIG. 3, a point cloud attribute decoding device based on a new processing order in this embodiment includes the following modules.

When the decoded geometric points are in Hilbert order, the point cloud attributes are directly processed according to the decoding order, and the following modules are executed for processing the attribute values of the current points:

1) Attribute prediction value acquisition module: the input of the module is the reconstructed point cloud, and the output is the attribute prediction value of the current point, and the module uses the weighted average of the reconstructed attribute values of the preceding decoding points in Hilbert order as the attribute prediction value of the current point, wherein the Hilbert order is the point order obtained by sorting the points in the point cloud from small to large or from large to small according to their corresponding Hilbert code values: select the first point of the current point in Hilbert order. PSet their property values as follows $\hat{A}$, the property value $\hat{A}$ is the predicted value of the attribute of the current point;

2) Attribute residual decoding module: the input of this module is the bitstream and the output is the attribute residual, and this module decodes the attribute residual value of the current point from the bitstream R;
3) Reconstructed attribute value acquisition module: the input of the module is attribute residual and attribute prediction value, and the output is the reconstructed attribute value of the current point, and the module obtains the reconstructed attribute value of the current point according to the attribute prediction value of the current point and the decoded attribute residual value: the reconstructed attribute value of the current point is $A=\hat{A}+R$.

Embodiment 16

A point cloud attribute decoding device based on a new processing order in this embodiment includes the following modules.

When the decoded geometric points are in Hilbert order, the point cloud attributes are directly processed according to the decoding order, and the following modules are executed for processing the attribute values of the current points:

1) Attribute prediction point acquisition module: the input of this module is the reconstructed point cloud, and the output is the attribute prediction point of the current point. This module selects n decoded points in Hilbert order as the attribute prediction points of the current point, where n is a natural number. In this embodiment, n is taken as 3: the first three points $P_i=(X_i, Y_i, Z_i)$, i=1, 2, 3 of the current point in Hilbert order are selected, set their property values as follows $(A_i)_{i=1, 2, 3}$;
2) Attribute prediction value calculation module: the input of this module is the attribute prediction point, and the output is the attribute prediction value of the current point. This module uses the weighted average of the reconstructed attribute values of these three attribute prediction points as the attribute prediction value of the current point: the weights $(\omega_i)_{i=1, 2, 3}$ of the three points are obtained respectively, $$\omega_i = \frac{1}{d_i},$$

$$i = 1, 2, 3$$

Among them, $d_i$ is the distance between the point $P_i$ and the current point (X, Y, Z), which can be at least one of the following distances:

Euclidean distance: $d_i=\sqrt{a(X_i-X)^2+b(Y_i-Y)^2+c(Z_i-Z)^2}$
Square of Euclidean distance: $d_i=a(X_i-X)^2+b(Y_i-Y)^2+c(Z_i-Z)^2$
Chebyshev distance: $d_i=\max(a|X_i-X|, b|Y_i-Y|, c|Z_i-Z|)$
Manhattan distance: $d_i=a|X_i-X|+b|Y_i-Y|+c|Z_i-Z|$
a, b, c are weighting coefficients of three dimensions, which are used to control the weights of the three dimensions. In this embodiment, the weighting coefficient a, b, c are respectively valued as a=2, b=1, c=3;
Use the following formula to calculate the weighted average of the attribute values of the three points $P_1$, $P_2$, $P_3$, and take the weighted average value as the attribute prediction value $\hat{A}$ of the current point, $$\hat{A} = \frac{\sum_{i=1}^{3} \omega_i A_i}{\sum_{i=1}^{3} \omega_i}$$

3) Decoding the attribute residual value of the current point from the bitstream R;
4) Obtaining the reconstructed attribute value of the current point according to the attribute prediction value of the current point and the decoded attribute residual value, wherein the reconstructed attribute value of the current point is $A=\hat{A}+R$.

Embodiment 17

A point cloud attribute decoding device based on a new processing order in this embodiment includes the following modules.

When the decoded geometric points are in Hilbert order, the point cloud attributes are directly processed according to the decoding order, and the following modules are executed for processing the attribute values of the current points:

1) Attribute prediction point acquisition module: the input of this module is the reconstructed point cloud, and the output is the attribute prediction point of the current point. This module selects n decoded points in Hilbert order as the attribute prediction points of the current point, where n is a natural number. In this embodiment, n is taken as 3: the first three points $P_i=(X_i, Y_i, Z_i)$, i=1, 2, 3 of the current point in Hilbert order are selected, set their property values as follows $(A_i)_{i=1,2,3}$;

2) Attribute prediction value calculation module: the input of this module is the attribute prediction point, and the output is the attribute prediction value of the current point. This module uses the weighted average of the reconstructed attribute values of these three attribute prediction points as the attribute prediction value of the current point: the weights $(\omega_i)$ i=1, 2, 3 of the three points are obtained respectively, $$\omega_i = \frac{1}{d_i},$$
$i = 1, 2, 3$ Among them, $d_i$ is the distance between the point $P_i$ and the current point (X, Y, Z), which can be at least one of the following distances:

Euclidean distance: $d_i=\sqrt{a(X_i-X)^2+b(Y_i-Y)^2+c(Z_i-Z)^2}$

Square of Euclidean distance: $d_i=a(X_i-X)^2+b(Y_i-Y)^2+c(Z_i-Z)^2$

Chebyshev distance: $d_i=\max(a|X_i-X|, b|Y_i-Y|, c|Z_i-Z|)$

Manhattan distance: $d_i=a|X_i-X|+b|Y_i-Y|+c|Z_i-Z|$ a, b, c are weighting coefficients of three dimensions, which are used to control the weights of the three dimensions. In this embodiment, the weighting coefficient a, b, c are respectively valued as a=2, b=1, c=3;

Use the following formula to calculate the weighted average of the attribute values of the three points $P_1$, $P_2$, $P_3$, and take the weighted average value as the attribute prediction value $\hat{A}$ of the current point, $$\hat{A} = \frac{\sum_{i=1}^{3} \omega_i A_i}{\sum_{i=1}^{3} \omega_i}$$

3) Decoding the attribute residual value of the current point from the bitstream R;
4) Obtaining the reconstructed attribute value of the current point according to the attribute prediction value of the current point and the decoded attribute residual value, wherein the reconstructed attribute value of the current point is $A=\hat{A}+R$.

Embodiment 18

A point cloud attribute decoding device based on a new processing order in this embodiment includes the following modules.

When the decoded geometric points are in Hilbert order, the point cloud attributes are directly processed according to the decoding order, and the following modules are executed for processing the attribute values of the current points:

1) Attribute prediction point acquisition module: the input of the module is the reconstructed point cloud, and the output is the attribute prediction point of the current point, this module selects the coplanar point and collinear point of the current point among L points in the preceding of Hilbert order as the attribute prediction points of the current point, where the coplanar point is the point where the cube where the point is located and the cube where the current point is located have a common surface, and the collinear point refers to the point where the cube where the point is located and the cube where the current point is located have a common edge, and L is a natural number greater than 0. In this embodiment, L is taken as 128: search the first 128 points of the current point in Hilbert order for coplanar and collinear neighbor points of the current point, let the number of these neighbors is k, if k is not 0, let these neighbors be $(P_i)_{i=1,2\ldots k}$, the attribute value of each neighbor point is $(A_i)_{i=1,2\ldots k}$;

2) Attribute prediction point weighting module: the input of the module is the attribute prediction point, and the output is the weighted attribute prediction point, this module weights coplanar points and collinear points $\omega_{pl}$ and $\omega_{po}$ respectively, in which $\omega_{pl}$ and $\omega_{po}$ are real number greater than or equal to 0, $\omega_{pl}$ is greater than $\omega_{po}$, In this embodiment, let $\omega_{pl}=2$, $\omega_{po}=1$, the weight of each neighbor point is $(\omega_i)_{i=1,2\ldots k}$, in which the neighbor points with a distance of 1 are given a weight of 2, and the neighbor points with a distance of $\sqrt{2}$ are given a weight of 2;

3) Attribute prediction value calculation module: The input of this module is a weighted attribute prediction point, and the output is the attribute prediction value of the current point, this module uses the weighted average of the reconstructed attribute values of coplanar points and collinear points as the attribute prediction value of the current point: calculate the weighted average of the attribute values of these neighbor points $(P_i)_{i=1,2,...,k}$ by using the following formula, and take the weighted average as the attribute prediction value of the current point $\hat{A}$, $$\hat{A} = \frac{\sum_{i=1}^{k} \omega_i A_i}{\sum_{i=1}^{k} \omega_i}$$

4) Decoding the attribute residual value of the current point from the bitstream R;
5) Obtaining the reconstructed attribute value of the current point according to the attribute prediction value of the current point and the decoded attribute residual value, wherein the reconstructed attribute value of the current point is $A=\hat{A}+R$.

Embodiment 19

A point cloud attribute decoding method based on a new processing order in this embodiment includes the following contents.

The three-dimensional geometric coordinates $(X_1, X_2, X_3)_N$ of reconstructed points in the point cloud are processed sequentially from high position to low position of the binary bits, where the $i^{th}$ processing: generate the corresponding Hilbert code subcode $C_{i,m_i}$ according to the $(3*m_i)$ binary bits of the three-dimensional geometric coordinates of the reconstructed point, in this embodiment, N=bitWidth, $X_1$=x, $X_2$=y, $X_3$=z, each fixed only deal with 1 bit, that is, $m_i$=1, p=bitWidth, ConvertCode$^{m_i}$ corresponds to the table lookup operation HilbertTable [state][pos][1], ConvertState$^{m_i}$ corresponds to the table lookup operation HilbertTable [state][pos][0], the Hilbert code HCode of the decoded point is obtained by the following method:

```
HCode= 0;
    state = 4;
    for (i = bitWidth-1; i >= 0; i=i-1) {
        HCode= HCode<<3;
        bx = (x >> i) & 1;
        by = (y >> i) & 1;
        bz = (z >> i) & 1;
        pos = (bx << 2) | (by << 1) | bz;
        HCode= HCode+ HilbertTable [state][pos][1];
        state = HilbertTable [state][pos][0];
    }
```

Where >> refers to bitwise right shift operation and << refers to bitwise left shift operation, and the lookup table HilbertCode used is as follows:

```
HilbertTable[12][8][2] = {
{{5, 0}, {1, 7}, {4, 1}, {2, 6}, {3, 3}, {3, 4}, {4, 2}, {2, 5}},
{{6, 4}, {2, 7}, {6, 3}, {8, 0}, {0, 5}, {0, 6}, {7, 2}, {7, 1}},
{{1, 6}, {0, 7}, {1, 5}, {9, 4}, {10, 1}, {11, 0}, {10, 2}, {9, 3}},
{{9, 2}, {8, 5}, {0, 3}, {0, 4}, {9, 1}, {8, 6}, {6, 0}, {10, 7}},
{{0, 0}, {5, 1}, {8, 3}, {5, 2}, {11, 7}, {6, 6}, {8, 4}, {6, 5}},
{{4, 0}, {10, 3}, {9, 7}, {10, 4}, {0, 1}, {0, 2}, {7, 6}, {7, 5}},
{{11, 6}, {11, 5}, {3, 1}, {3, 2}, {4, 7}, {1, 4}, {9, 0}, {1, 3}},
{{9, 6}, {8, 1}, {5, 7}, {1, 0}, {9, 5}, {8, 2}, {11, 4}, {11, 3}},
{{1, 2}, {4, 3}, {1, 1}, {7, 0}, {10, 5}, {4, 4}, {10, 6}, {3, 7}},
{{2, 4}, {5, 5}, {7, 7}, {5, 6}, {2, 3}, {6, 2}, {3, 0}, {6, 1}},
{{11, 2}, {11, 1}, {3, 5}, {3, 6}, {5, 3}, {2, 0}, {5, 4}, {8, 7}},
{{7, 4}, {7, 3}, {4, 5}, {2, 2}, {6, 7}, {10, 0}, {4, 6}, {2, 1}},
```

According to the sequence of Hilbert from small to large or from large to small, the reconstructed attribute information of the point cloud is decoded from the bitstream in order, and the attribute value of the current point is processed by the following steps:

1) Select n points closest to the current point from L points in the preceding of Hilbert order as the attribute prediction points of the current point, where n is a natural number. In this embodiment, n is taken as 3: find 3 points closest to the current point from the first 128 points of the current point in Hilbert order, and make $P_i=(X_1, Y_i, Z_i)$, i=1, 2, 3, set their property values as follows$(A_i)_{i=1, 2, 3}$;
2) The weighted average of the reconstructed attribute values from these three attribute prediction points is used as the attribute prediction value of the current point: the weights $(\omega_i)_{i=1,2,3}$ of the three points are obtained respectively, $$\omega_i = \frac{1}{d_i},$$

$$i = 1, 2, 3$$

Among them, $d_i$ is the distance between the point $P_i$ and the current point (X, Y, Z), which can be at least one of the following distances:

Euclidean distance: $d_i=\sqrt{a(X_i-X)^2+b(Y_i-Y)^2+c(Z_i-Z)^2}$

Square of Euclidean distance: $d_i=a(X_i-X)^2+b(Y_i-Y)^2+c(Z_i-Z)^2$

Chebyshev distance: $d_i=\max(a|X_i-X|, b|Y_i-Y|, c|Z_i-Z|)$

Manhattan distance: $d_i=a|X_i-X|+b|Y_i-Y|+c|Z_i-Z|$ a, b, c are weighting coefficients of three dimensions, which are used to control the weights of the three dimensions. In this embodiment, the weighting coefficient a, b, c are respectively valued as a=2, b=1, c=3;

Use the following formula to calculate the weighted average of the attribute values of the three points $P_1$, $P_2$, $P_3$, and take the weighted average value as the attribute prediction value $\hat{A}$ of the current point, $$\hat{A} = \frac{\sum_{i=1}^{3} \omega_i A_i}{\sum_{i=1}^{3} \omega_i}$$

3) Decoding the attribute residual value of the current point from the bitstream R;
4) Obtaining the reconstructed attribute value of the current point according to the attribute prediction value of the current point and the decoded attribute residual value, wherein the reconstructed attribute value of the current point is $A=\hat{A}+R$.

Embodiment 20

A point cloud attribute decoding device based on a new processing order in this embodiment includes the following modules.

Hilbert code generation module: the input of this module is the reconstructed geometric coordinates of the point cloud, and the output is the Hilbert code corresponding to the geometric coordinates of the point cloud. This module sequentially processes the three-dimensional geometric coordinates $(X_1, X_2, X_3)_N$ of reconstructed points in the point cloud sequentially from high position to low position of the binary bits, where the $i^{th}$ processing: generate the corresponding Hilbert code subcode $C_{i,m_i}$ according to the $(3*m_i)$ binary bits of the three-dimensional geometric coordinates of the reconstructed point, in this embodiment, N=bitWidth, $X_1$=x, $X_2$=y, $X_3$=z, each fixed only deal with 1 bit, that is, $m_i$=1, p=bitWidth, ConvertCode$^{m_i}$ corresponds to the table lookup operation HilbertTable [state][pos][1], ConvertState$^{m_i}$ corresponds to the table lookup operation HilbertTable [state][pos][0], the Hilbert code HCode of the decoded point is obtained by the following method:

```
HCode= 0;
  state = 4;
  for (i = bitWidth−1; i >= 0; i=i−1) {
    HCode= HCode<<3;
    bx = (x >> i) & 1;
    by = (y >> i) & 1;
    bz = (z >> i) & 1;
    pos = (bx << 2) | (by << 1) | bz;
    HCode = HCode+ Hilbert Table [state ][pos][1];
    state = HilbertTable [state ][pos][0];
  }
```

Where >> refers to bitwise right shift operation and << refers to bitwise left shift operation, and the lookup table of HilbertCode used is as follows:

```
HilbertTable[12][8][2] = {
  {{5, 0}, {1, 7}, {4, 1}, {2, 6}, {3, 3}, {3, 4}, {4, 2}, {2, 5}},
  {{6, 4}, {2, 7}, {6, 3}, {8, 0}, {0, 5}, {0, 6}, {7, 2}, {7, 1}},
  {{1, 6}, {0, 7}, {1, 5}, {9, 4}, {10, 1}, {11, 0}, {10, 2}, {9, 3}},
  {{9, 2}, {8, 5}, {0, 3}, {0, 4}, {9, 1}, {8, 6}, {6, 0}, {10, 7}},
  {{0, 0}, {5, 1}, {8, 3}, {5, 2}, {11, 7}, {6, 6}, {8, 4}, {6, 5}},
  {{4, 0}, {10, 3}, {9, 7}, {10, 4}, {0, 1}, {0, 2}, {7, 6}, {7, 5}},
  {{11, 6}, {11, 5}, {3, 1}, {3, 2}, {4, 7}, {1, 4}, {9, 0}, {1, 3}},
  {{9, 6}, {8, 1}, {5, 7}, {1, 0}, {9, 5}, {8, 2}, {11, 4}, {11, 3}},
  {{1, 2}, {4, 3}, {1, 1}, {7, 0}, {10, 5}, {4, 4}, {10, 6}, {3, 7}},
  {{2, 4}, {5, 5}, {7, 7}, {5, 6}, {2, 3}, {6, 2}, {3, 0}, {6, 1}},
  {{11, 2}, {11, 1}, {3, 5}, {3, 6}, {5, 3}, {2, 0}, {5, 4}, {8, 7}},
  {{7, 4}, {7, 3}, {4, 5}, {2, 2}, {6, 7}, {10, 0}, {4, 6}, {2, 1}},
```

Attribute decoding module: the input of this module is the attribute bitstream, and the output is the reconstructed point cloud attribute. This module decodes the reconstructed point cloud attribute information from the bitstream in order of Hilbert from small to large or from large to small, and executes the following modules to process the attribute value of the current point:

1) Attribute prediction point acquisition module: the input of this module is the reconstructed point cloud, and the output is the attribute prediction point of the current point. The module selects n points closest to the current point from the L points in the preceding under Hilbert order as the attribute prediction points of the current point, where n is a natural number, and in this embodiment, n is taken as 3: three points closest to the current point are found in the first 128 points of the current point under Hilbert order, and make these as $P_i$=($X_1$, i=1, 2, 3, set their property values as follows $(A_i)_{i=1, 2, 3}$;

2) Attribute prediction value calculation module: the input of this module is the attribute prediction point, and the output is the attribute prediction value of the current point. This module uses the weighted average of the reconstructed attribute values of these three attribute prediction points as the attribute prediction value of the current point: the weights $(\omega_i)_{i=1, 2, 3}$ of the three points are obtained respectively, $$\omega_i = \frac{1}{d_i}, i = 1, 2, 3$$

Among them, $d_i$ is the distance between the point $P_i$ and the current point (X, Y, Z), which can be at least one of the following distances:

Euclidean distance: $d_i=\sqrt{a(X_i-X)^2+b(Y_i-Y)^2+c(Z_i-Z)^2}$

Square of Euclidean distance: $d_i=a(X_i-X)^2+b(Y_i-Y)^2+c(Z_i-Z)^2$

Chebyshev distance: $d_i=\max(a|X_i-X|, b|Y_i-Y|, c|Z_i-Z|)$

Manhattan distance: $d_i=a|X_i-X|+b|Y_i-Y|+c|Z_i-Z|$ a, b, c are weighting coefficients of three dimensions, which are used to control the weights of the three dimensions. In this embodiment, the weighting coefficient a, b, c are respectively valued as a=2, b=1, c=3;

Use the following formula to calculate the weighted average of the attribute values of the three points $P_1$, $P_2$, $P_3$, and take the weighted average value as the attribute prediction value $\hat{A}$ of the current point, $$\hat{A} = \frac{\sum_{i=1}^{3} \omega_i A_i}{\sum_{i=1}^{3} \omega_i}$$

3) Decoding the attribute residual value of the current point from the bitstream R;

4) Obtaining the reconstructed attribute value of the current point according to the attribute prediction value of the current point and the decoded attribute residual value, wherein the reconstructed attribute value of the current point is A=$\hat{A}$+R.

Embodiment 21

A point cloud attribute decoding method based on a new processing order in this embodiment includes the following contents.

The three-dimensional geometric coordinates $(X_1, X_2, X_3)_N$ of reconstructed points in the point cloud are processed sequentially from high position to low position of the binary bits, where the $i^{th}$ processing: generate the corresponding Hilbert code subcode $C_{i,m_i}$ according to the $(3*m_i)$ binary bits of the three-dimensional geometric coordinates of the reconstructed point, in this embodiment, N=bitWidth and even, $X_1$=x, $X_2$=y, $X_3$=z, each fixed only deal with 2 bit, that is, $m_i$=2, p=bitWidth/2, ConvertCode$^{m_i}$ corresponds to the table lookup operation HilbertTable [state][pos][1], ConvertState$^{m_i}$ corresponds to the table lookup operation HilbertTable [state][pos][1], the Hilbert code HCode of the decoded point is obtained by the following method:

```
HCode= 0;
  state = 4;
  for (i = bitWidth−2; i >= 0; i−=2) {
    HilbertCode <<= 6;
    bx = (x >> i) & 3;
    by = (y >> 1) & 3;
    bz = (z >> i) & 3;
    pos = (bx << 4) | (by << 2) | bz;
    HilbertCode += HilbertTable [state][pos][1];
    state = HilbertTable [state][pos][0];
  }
```

Where >> refers to bitwise right shift operation and << refers to bitwise left shift operation, and the lookup table of HilbertCode used is as follows:

```
HilbertTable [12][64][2] = {
{{4, 0}, {10, 3}, {6, 60}, {2, 63}, {9, 7}, {10, 4}, {6, 59}, {8, 56}, {0, 8}, {5, 9}, {1, 54}, {0, 55}, {8, 11},
{5, 10}, {1, 53}, {9, 52}, {0, 1}, {0, 2}, {0, 61}, {0, 62}, {7, 6}, {7, 5}, {7, 58}, {7, 57}, {11, 15}, {6, 14}, {10, 49},
{11, 48}, {8, 12}, {6, 13}, {10, 50}, {9, 51}, {9, 26}, {8, 29}, {9, 34}, {8, 37}, {0, 27}, {0, 28}, {0, 35}, {0, 36},
{0, 16}, {5, 17}, {1, 46}, {0, 47}, {8, 19}, {5, 18}, {1, 45}, {9, 44}, {9, 25}, {8, 30}, {9, 33}, {8, 38}, {6, 24},
{10, 31}, {6, 32}, {10, 39}, {11, 23}, {6, 22}, {10, 41}, {11, 40}, {8, 20}, {6, 21}, {10, 42}, {9, 43}},
{{11, 38}, {11, 37}, {1, 62}, {0, 63}, {3, 33}, {3, 34}, {1, 61}, {9, 60}, {11, 30}, {11, 29}, {1, 2}, {4, 3}, {3, 25},
{3, 26}, {1, 1}, {7, 0}, {4, 39}, {1, 36}, {10, 57}, {11, 56}, {9, 32}, {1, 35}, {10, 58}, {9, 59}, {4, 31}, {1, 28},
{10, 5}, {4, 4}, {9, 24}, {1, 27}, {10, 6}, {3, 7}, {5, 40}, {1, 47}, {5, 48}, {1, 55}, {4, 41}, {2, 46}, {4, 49},
{2, 54}, {9, 22}, {8, 17}, {9, 14}, {8, 9}, {5, 23}, {1, 16}, {5, 15}, {1, 8}, {3, 43}, {3, 44}, {3, 51}, {3, 52},
{4, 42}, {2, 45}, {4, 50}, {2, 53}, {9, 21}, {8, 18}, {9, 13}, {8, 10}, {11, 20}, {11, 19}, {11, 12}, {11, 11}},
{{6, 52}, {2, 55}, {5, 56}, {1, 63}, {6, 51}, {8, 48}, {4, 57}, {2, 62}, {6, 44}, {2, 47}, {2, 36}, {5, 37}, {6, 43},
{8, 40}, {7, 39}, {5, 38}, {0, 53}, {0, 54}, {3, 59}, {3, 60}, {7, 50}, {7, 49}, {4, 58}, {2, 61}, {0, 45}, {0, 46},
{2, 35}, {6, 34}, {7, 42}, {7, 41}, {3, 32}, {6, 33}, {11, 10}, {11, 9}, {7, 4}, {7, 3}, {3, 13}, {3, 14}, {4, 5}, {2, 2},
{11, 18}, {11, 17}, {2, 28}, {5, 29}, {3, 21}, {3, 22}, {7, 31}, {5, 30}, {5, 11}, {2, 8}, {6, 7}, {10, 0}, {5, 12},
{8, 15}, {4, 6}, {2, 1}, {5, 19}, {2, 16}, {2, 27}, {6, 26}, {5, 20}, {8, 23}, {3, 24}, {6, 25}},
{{2, 20}, {5, 21}, {1, 42}, {4, 43}, {7, 23}, {5, 22}, {1, 41}, {7, 40}, {5, 24}, {1, 31}, {5, 32}, {1, 39}, {4, 25},
{2, 30}, {4, 33}, {2, 38}, {2, 19}, {6, 18}, {10, 45}, {4, 44}, {3, 16}, {6, 17}, {10, 46}, {3, 47}, {3, 27}, {3, 28},
{3, 35}, {3, 36}, {4, 26}, {2, 29}, {4, 34}, {2, 37}, {2, 12}, {5, 13}, {1, 50}, {4, 51}, {7, 15}, {5, 14}, {1, 49},
{7, 48}, {11, 6}, {11, 5}, {11, 58}, {11, 57}, {3, 1}, {3, 2}, {3, 61}, {3, 62}, {2, 11}, {6, 10}, {10, 53}, {4, 52},
{3, 8}, {6, 9}, {10, 54}, {3, 55}, {4, 7}, {1, 4}, {5, 59}, {2, 56}, {9, 0}, {1, 3}, {5, 60}, {8, 63}},
{{5, 0}, {1, 7}, {4, 8}, {10, 11}, {4, 1}, {2, 6}, {9, 15}, {10, 12}, {1, 26}, {4, 27}, {4, 16}, {10, 19}, {1, 25},
{7, 24}, {9, 23}, {10, 20}, {3, 3}, {3, 4}, {0, 9}, {0, 10}, {4, 2}, {2, 5}, {7, 14}, {7, 13}, {10, 29}, {4, 28}, {0, 17},
{0, 18}, {10, 30}, {3, 31}, {7, 22}, {7, 21}, {7, 60}, {7, 59}, {11, 54}, {11, 53}, {4, 61}, {2, 58}, {3, 49}, {3, 50},
{1, 34}, {4, 35}, {11, 46}, {11, 45}, {1, 33}, {7, 32}, {3, 41}, {3, 42}, {6, 63}, {10, 56}, {4, 55}, {1, 52}, {4, 62},
{2, 57}, {9, 48}, {1, 51}, {10, 37}, {4, 36}, {4, 47}, {1, 44}, {10, 38}, {3, 39}, {9, 40}, {1, 43}},
{{0, 0}, {5, 1}, {11, 26}, {11, 25}, {8, 3}, {5, 2}, {3, 29}, {3, 30}, {2, 60}, {5, 61}, {11, 34}, {11, 33}, {7, 63},
{5, 62}, {3, 37}, {3, 38}, {11, 7}, {6, 6}, {5, 27}, {2, 24}, {8, 4}, {6, 5}, {5, 28}, {8, 31}, {2, 59}, {6, 58},
{5, 35}, {2, 32}, {3, 56}, {6, 57}, {5, 36}, {8, 39}, {5, 8}, {1, 15}, {5, 16}, {1, 23}, {4, 9}, {2, 14}, {4, 17}, {2, 22},
{9, 54}, {8, 49}, {9, 46}, {8, 41}, {5, 55}, {1, 48}, {5, 47}, {1, 40}, {3, 11}, {3, 12}, {3, 19}, {3, 20}, {4, 10},
{2, 13}, {4, 18}, {2, 21}, {9, 53}, {8, 50}, {9, 45}, {8, 42}, {11, 52}, {11, 51}, {11, 44}, {11, 43}},
{{7, 52}, {7, 51}, {7, 44}, {7, 43}, {4, 53}, {2, 50}, {4, 45}, {2, 42}, {9, 10}, {8, 13}, {9, 18}, {8, 21}, {0, 11},
{0, 12}, {0, 19}, {0, 20}, {6, 55}, {10, 48}, {6, 47}, {10, 40}, {4, 54}, {2, 49}, {4, 46}, {2, 41}, {9, 9}, {8, 14},
{9, 17}, {8, 22}, {6, 8}, {10, 15}, {6, 16}, {10, 23}, {0, 56}, {5, 57}, {6, 36}, {2, 39}, {8, 59}, {5, 58}, {6, 35},
{8, 32}, {2, 4}, {5, 5}, {6, 28}, {2, 31}, {7, 7}, {5, 6}, {6, 27}, {8, 24}, {11, 63}, {6, 62}, {0, 37}, {0, 38},
{8, 60}, {6, 61}, {7, 34}, {7, 33}, {2, 3}, {6, 2}, {0, 29}, {0, 30}, {3, 0}, {6, 1}, {7, 26}, {7, 25}},
{{2, 52}, {5, 53}, {1, 10}, {4, 11}, {7, 55}, {5, 54}, {1, 9}, {7, 8}, {4, 56}, {10, 59}, {6, 4}, {2, 7}, {9, 63},
{10, 60}, {6, 3}, {8, 0}, {2, 51}, {6, 50}, {10, 13}, {4, 12}, {3, 48}, {6, 49}, {10, 14}, {3, 15}, {0, 57}, {0, 58},
{0, 5}, {0, 6}, {7, 62}, {7, 61}, {7, 2}, {7, 1}, {2, 44}, {5, 45}, {1, 18}, {4, 19}, {7, 47}, {5, 46}, {1, 17}, {7, 16},
{7, 36}, {7, 35}, {7, 28}, {7, 27}, {4, 37}, {2, 34}, {4, 29}, {2, 26}, {2, 43}, {6, 42}, {10, 21}, {4, 20}, {3, 40},
{6, 41}, {10, 22}, {3, 23}, {6, 39}, {10, 32}, {6, 31}, {10, 24}, {4, 38}, {2, 33}, {4, 30}, {2, 25}},
{{6, 20}, {2, 23}, {0, 24}, {5, 25}, {6, 19}, {8, 16}, {8, 27}, {5, 26}, {6, 12}, {2, 15}, {9, 6}, {8, 1}, {6, 11},
{8, 8}, {5, 7}, {1, 0}, {0, 21}, {0, 22}, {11, 31}, {6, 30}, {7, 18}, {7, 17}, {8, 28}, {6, 29}, {0, 13}, {0, 14}, {9, 5},
{8, 2}, {7, 10}, {7, 9}, {11, 4}, {11, 3}, {11, 42}, {11, 41}, {0, 32}, {5, 33}, {3, 45}, {3, 46}, {8, 35}, {5, 34},
{11, 50}, {11, 49}, {9, 58}, {8, 61}, {3, 53}, {3, 54}, {0, 59}, {0, 60}, {5, 43}, {2, 40}, {11, 39}, {6, 38}, {5, 44},
{8, 47}, {8, 36}, {6, 37}, {5, 51}, {2, 48}, {9, 57}, {8, 62}, {5, 52}, {8, 55}, {6, 56}, {10, 63}},
{{1, 38}, {0, 39}, {4, 40}, {10, 43}, {1, 37}, {9, 36}, {9, 47}, {10, 44}, {9, 62}, {8, 57}, {4, 48}, {10, 51}, {5, 63},
{1, 56}, {9, 55}, {10, 52}, {10, 33}, {11, 32}, {0, 41}, {0, 42}, {10, 34}, {9, 35}, {7, 46}, {7, 45}, {9, 61}, {8, 58},
{0, 49}, {0, 50}, {11, 60}, {11, 59}, {7, 54}, {7, 53}, {1, 30}, {0, 31}, {11, 22}, {11, 21}, {1, 29}, {9, 28}, {3, 17},
{3, 18}, {9, 2}, {8, 5}, {11, 14}, {11, 13}, {0, 3}, {0, 4}, {3, 9}, {3, 10}, {10, 25}, {11, 24}, {4, 23}, {1, 20},
{10, 26}, {9, 27}, {9, 16}, {1, 19}, {9, 1}, {8, 6}, {4, 15}, {1, 12}, {6, 0}, {10, 7}, {9, 8}, {1, 11}},
{{7, 20}, {7, 19}, {7, 12}, {7, 11}, {4, 21}, {2, 18}, {4, 13}, {2, 10}, {9, 42}, {8, 45}, {9, 50}, {8, 53}, {0, 43},
{0, 44}, {0, 51}, {0, 52}, {6, 23}, {10, 16}, {6, 15}, {10, 8}, {4, 22}, {2, 17}, {4, 14}, {2, 9}, {9, 41}, {8, 46},
{9, 49}, {8, 54}, {6, 40}, {10, 47}, {6, 48}, {10, 55}, {4, 24}, {10, 27}, {1, 6}, {0, 7}, {9, 31}, {10, 28}, {1, 5},
{9, 4}, {4, 32}, {10, 35}, {1, 58}, {4, 59}, {9, 39}, {10, 36}, {1, 57}, {7, 56}, {0, 25}, {0, 26}, {10, 1}, {11, 0},
{7, 30}, {7, 29}, {10, 2}, {9, 3}, {0, 33}, {0, 34}, {10, 61}, {4, 60}, {7, 38}, {7, 37}, {10, 62}, {3, 63}},
{{9, 38}, {8, 33}, {9, 30}, {8, 25}, {5, 39}, {1, 32}, {5, 31}, {1, 24}, {0, 40}, {5, 41}, {1, 22}, {0, 23}, {8, 43},
{5, 42}, {1, 21}, {9, 20}, {9, 37}, {8, 34}, {9, 29}, {8, 26}, {11, 36}, {11, 35}, {11, 28}, {11, 27}, {11, 47},
{6, 46}, {10, 17}, {11, 16}, {8, 44}, {6, 45}, {10, 18}, {9, 19}, {11, 62}, {11, 61}, {11, 2}, {11, 1}, {3, 57}, {3, 58},
{3, 5}, {3, 6}, {0, 48}, {5, 49}, {1, 14}, {0, 15}, {8, 51}, {5, 50}, {1, 13}, {9, 12}, {4, 63}, {1, 60}, {5, 3},
{2, 0}, {9, 56}, {1, 59}, {5, 4}, {8, 7}, {11, 55}, {6, 54}, {10, 9}, {11, 8}, {8, 52}, {6, 53}, {10, 10}, {9, 11}}};
```

According to the Hilbert order from small to large or from large to small, the reconstructed attribute information of the point cloud is decoded from the bitstream in order, and the attribute value of the current point is processed by the following steps:

1) Select the nearest point of n among the L points in the preceding sequence of Hilbert order as the attribute prediction point of the current point, n is a natural number, and in this example, n is 3: find three points closest to the current point among the first 128 points of the current point under Hilbert order, and set them as $P_i=(X_1, Y_i, Z_i)$, i=1, 2, 3, and set their attribute values as $(A_i)_{i=1, 2, 3}$;

2) Use the weighted average value of the three attribute prediction points to reconstruct the attribute values as the attribute prediction value of the current point: the weight $(\omega_i)_{i=1,2,3}$ of the three points are obtained respectively.

$$\omega_i = \frac{1}{d_i}, i = 1, 2, 3$$

Among them, $d_i$ is the distance between the point $P_i$ and the current point (X, Y, Z), which can be at least one of the following distances:

Euclidean distance: $d_i=\sqrt{a(X_i-X)^2+b(Y_i-Y)^2+c(Z_i-Z)^2}$

Square of Euclidean distance: $d_i=a(X_i-X)^2+b(Y_i-Y)^2+c(Z_i-Z)^2$

Chebyshev distance: $d_i=\max(a|X_i-X|, b|Y_i-Y|, c|Z_i-Z|)$

Manhattan distance: $d_i=a|X_i-X|+b|Y_i-Y|+c|Z_i-Z|$ a, b, c are the weighting coefficients of the three dimensions, which are used to control the weight of the three dimensions. In this embodiment, the weighting coefficients a, b, c are a=2, b=1 and c=3 respectively.

Use the following formula to calculate the weighted average of the attribute values of the three points $P_1$, $P_2$, $P_3$, and take the weighted average value as the attribute prediction value $\hat{A}$ of the current point, $$\hat{A} = \frac{\sum_{i=1}^{3} \omega_i A_i}{\sum_{i=1}^{3} \omega_i}$$

3) The attribute residual value R of the current point is decoded from the bitstream;
4) According to the attribute prediction value of the current point and the decoded attribute residual value, the reconstructed attribute value of the current point is $A=\hat{A}+R$.

Embodiment 22

A point cloud attribute decoding device based on a new processing order in this embodiment includes the following modules.

The binary bits of the three-dimensional geometric coordinates $(X_1, X_2, X_3)_N$ of the reconstructed points in the point cloud are processed in order from high to low, and the i th processing: According to the $(3*m_i)$ binary bits in the three-dimensional geometric coordinates of the reconstructed points, the corresponding Hilbert code is generated. In this embodiment, N=bitWidth and is an even number. $X_1=x$, $X_2=y$, $X_3=z$. Only 2 bits are processed each time, that is, $m_i=2$, p=bitWidth/2. ConvertCode$^{m_i}$ corresponds to HilbertTable [state] [pos] [1], ConvertState$^{m_i}$ corresponds to HilbertTable [state] [pos] [0]. The Hilbert code HCode of the decoded point is obtained by the following method:

```
HCode= 0;
  state = 4;
  for (i = bitWidth−2; i >= 0; i−=2) {
    HilbertCode <<= 6;
    bx = (x >> i) & 3;
    by = (y >> i) & 3;
    bz = (z >> i) & 3;
    pos = (bx << 4) | (by << 2) | bz;
    HilbertCode += HilbertTable [state][pos][1];
    state = HilbertTable [state][pos][0];
  }
```

Where >> refers to bitwise right shift operation and << refers to bitwise left shift operation, and the lookup table HilbertCode used is as follows:

```
HilbertTable [12][64][2] = {
{{4, 0}, {10, 3}, {6, 60}, {2, 63}, {9, 7}, {10, 4}, {6, 59}, {8, 56}, {0, 8}, {5, 9}, {1, 54}, {0, 55}, {8, 11}, {5, 10},
{1, 53}, {9, 52}, {0, 1}, {0, 2}, {0, 61}, {0, 62}, {7, 6}, {7, 5}, {7, 58}, {7, 57}, {11, 15}, {6, 14}, {10, 49},
{11, 48}, {8, 12}, {6, 13}, {10, 50}, {9, 51}, {9, 26}, {8, 29}, {9, 34}, {8, 37}, {0, 27}, {0, 28}, {0, 35}, {0, 36},
{0, 16}, {5, 17}, {1, 46}, {0, 47}, {8, 19}, {5, 18}, {1, 45}, {9, 44}, {9, 25}, {8, 30}, {9, 33}, {8, 38}, {6, 24},
{10, 31}, {6, 32}, {10, 39}, {11, 23}, {6, 22}, {10, 41}, {11, 40}, {8, 20}, {6, 21}, {10, 42}, {9, 43}},
{{11, 38}, {11, 37}, {1, 62}, {0, 63}, {3, 33}, {3, 34}, {1, 61}, {9, 60}, {11, 30}, {11, 29}, {1, 2}, {4, 3},
{3, 25}, {3, 26}, {1, 1}, {7, 0}, {4, 39}, {1, 36}, {10, 57}, {11, 56}, {9, 32}, {1, 35}, {10, 58}, {9, 59}, {4, 31},
{1, 28}, {10, 5}, {4, 4}, {9, 24}, {1, 27}, {10, 6}, {3, 7}, {5, 40}, {1, 47}, {5, 48}, {1, 55}, {4, 41}, {2, 46}, {4, 49},
{2, 54}, {9, 22}, {8, 17}, {9, 14}, {8, 9}, {5, 23}, {1, 16}, {5, 15}, {1, 8}, {3, 43}, {3, 44}, {3, 51}, {3, 52},
{4, 42}, {2, 45}, {4, 50}, {2, 53}, {9, 21}, {8, 18}, {9, 13}, {8, 10}, {11, 20}, {11, 19}, {11, 12}, {11, 11}},
{{6, 52}, {2, 55}, {5, 56}, {1, 63}, {6, 51}, {8, 48}, {4, 57}, {2, 62}, {6, 44}, {2, 47}, {2, 36}, {5, 37}, {6, 43},
{8, 40}, {7, 39}, {5, 38}, {0, 53}, {0, 54}, {3, 59}, {3, 60}, {7, 50}, {7, 49}, {4, 58}, {2, 61}, {0, 45}, {0, 46},
{2, 35}, {6, 34}, {7, 42}, {7, 41}, {3, 32}, {6, 33}, {11, 10}, {11, 9}, {7, 4}, {7, 3}, {3, 13}, {3, 14}, {4, 5}, {2, 2},
{11, 18}, {11, 17}, {2, 28}, {5, 29}, {3, 21}, {3, 22}, {7, 31}, {5, 30}, {5, 11}, {2, 8}, {6, 7}, {10, 0}, {5, 12},
{8, 15}, {4, 6}, {2, 1}, {5, 19}, {2, 16}, {2, 27}, {6, 26}, {5, 20}, {8, 23}, {3, 24}, {6, 25}}},
{{2, 20}, {5, 21}, {1, 42}, {4, 43}, {7, 23}, {5, 22}, {1, 41}, {7, 40}, {5, 24}, {1, 31}, {5, 32}, {1, 39}, {4, 25},
{2, 30}, {4, 33}, {2, 38}, {2, 19}, {6, 18}, {10, 45}, {4, 44}, {3, 16}, {6, 17}, {10, 46}, {3, 47}, {3, 27}, {3, 28},
{3, 35}, {3, 36}, {4, 26}, {2, 29}, {4, 34}, {2, 37}, {2, 12}, {5, 13}, {1, 50}, {4, 51}, {7, 15}, {5, 14}, {1, 49},
{7, 48}, {11, 6}, {11, 5}, {11, 58}, {11, 57}, {3, 1}, {3, 2}, {3, 61}, {3, 62}, {2, 11}, {6, 10}, {10, 53}, {4, 52},
{3, 8}, {6, 9}, {10, 54}, {3, 55}, {4, 7}, {1, 4}, {5, 59}, {2, 56}, {9, 0}, {1, 3}, {5, 60}, {8, 63}},
{{5, 0}, {1, 7}, {4, 8}, {10, 11}, {4, 1}, {2, 6}, {9, 15}, {10, 12}, {1, 26}, {4, 27}, {4, 16}, {10, 19}, {1, 25},
{7, 24}, {9, 23}, {10, 20}, {3, 3}, {3, 4}, {0, 9}, {0, 10}, {4, 2}, {2, 5}, {7, 14}, {7, 13}, {10, 29}, {4, 28}, {0, 17},
```

-continued

{0, 18}, {10, 30}, {3, 31}, {7, 22}, {7, 21}, {7, 60}, {7, 59}, {11, 54}, {11, 53}, {4, 61}, {2, 58}, {3, 49}, {3, 50}, {1, 34}, {4, 35}, {11, 46}, {11, 45}, {1, 33}, {7, 32}, {3, 41}, {3, 42}, {6, 63}, {10, 56}, {4, 55}, {1, 52}, {4, 62}, {2, 57}, {9, 48}, {1, 51}, {10, 37}, {4, 36}, {4, 47}, {1, 44}, {10, 38}, {3, 39}, {9, 40}, {1, 43}}, {{0, 0}, {5, 1}, {11, 26}, {11, 25}, {8, 3}, {5, 2}, {3, 29}, {3, 30}, {2, 60}, {5, 61}, {11, 34}, {11, 33}, {7, 63}, {5, 62}, {3, 37}, {3, 38}, {11, 7}, {6, 6}, {5, 27}, {2, 24}, {8, 4}, {6, 5}, {5, 28}, {2, 59}, {6, 58}, {5, 35}, {2, 32}, {3, 56}, {6, 57}, {5, 36}, {8, 39}, {5, 8}, {1, 15}, {5, 16}, {1, 23}, {4, 9}, {2, 14}, {4, 17}, {2, 22}, {9, 54}, {8, 49}, {9, 46}, {8, 41}, {5, 55}, {1, 48}, {5, 47}, {1, 40}, {3, 11}, {3, 12}, {3, 19}, {3, 20}, {4, 10}, {2, 13}, {4, 18}, {2, 21}, {9, 53}, {8, 50}, {9, 45}, {8, 42}, {11, 52}, {11, 51}, {11, 44}, {11, 43}}, {{7, 52}, {7, 51}, {7, 44}, {7, 43}, {4, 53}, {2, 50}, {4, 45}, {2, 42}, {9, 10}, {8, 13}, {9, 18}, {8, 21}, {0, 11}, {0, 12}, {0, 19}, {0, 20}, {6, 55}, {10, 48}, {6, 47}, {10, 40}, {4, 54}, {2, 49}, {4, 46}, {2, 41}, {9, 9}, {8, 14}, {9, 17}, {8, 22}, {6, 8}, {10, 15}, {6, 16}, {10, 23}, {0, 56}, {5, 57}, {6, 36}, {2, 39}, {8, 59}, {5, 58}, {6, 35}, {8, 32}, {2, 4}, {5, 5}, {6, 28}, {2, 31}, {7, 7}, {5, 6}, {6, 27}, {8, 24}, {11, 63}, {6, 62}, {0, 37}, {0, 38}, {8, 60}, {6, 61}, {7, 34}, {7, 33}, {2, 3}, {6, 2}, {0, 29}, {0, 30}, {3, 0}, {6, 1}, {7, 26}, {7, 25}}, {{2, 52}, {5, 53}, {1, 10}, {4, 11}, {7, 55}, {5, 54}, {1, 9}, {7, 8}, {4, 56}, {10, 59}, {6, 4}, {2, 7}, {9, 63}, {10, 60}, {6, 3}, {8, 0}, {2, 51}, {6, 50}, {10, 13}, {4, 12}, {3, 48}, {6, 49}, {10, 14}, {3, 15}, {0, 57}, {0, 58}, {0, 5}, {0, 6}, {7, 62}, {7, 61}, {7, 2}, {7, 1}, {2, 44}, {5, 45}, {1, 18}, {4, 19}, {7, 47}, {5, 46}, {1, 17}, {7, 16}, {7, 36}, {7, 35}, {7, 28}, {7, 27}, {4, 37}, {2, 34}, {4, 29}, {2, 26}, {2, 43}, {6, 42}, {10, 21}, {4, 20}, {3, 40}, {6, 41}, {10, 22}, {3, 23}, {6, 39}, {10, 32}, {6, 31}, {10, 24}, {4, 38}, {2, 33}, {4, 30}, {2, 25}}, {{6, 20}, {2, 23}, {0, 24}, {5, 25}, {6, 19}, {8, 16}, {8, 27}, {5, 26}, {6, 12}, {2, 15}, {9, 6}, {8, 1}, {6, 11}, {8, 8}, {5, 7}, {1, 0}, {0, 21}, {0, 22}, {11, 31}, {6, 30}, {7, 18}, {7, 17}, {8, 28}, {6, 29}, {0, 13}, {0, 14}, {9, 5}, {8, 2}, {7, 10}, {7, 9}, {11, 4}, {11, 3}, {11, 42}, {11, 41}, {0, 32}, {5, 33}, {3, 45}, {3, 46}, {8, 35}, {5, 34}, {11, 50}, {11, 49}, {9, 58}, {8, 61}, {3, 53}, {3, 54}, {0, 59}, {10, 59}, {3, 49}, {2, 40}, {11, 39}, {6, 38}, {5, 44}, {8, 47}, {8, 36}, {6, 37}, {5, 51}, {2, 48}, {9, 57}, {8, 62}, {5, 52}, {8, 55}, {6, 56}, {10, 63}}, {{1, 38}, {0, 39}, {4, 40}, {10, 43}, {1, 37}, {9, 36}, {9, 47}, {10, 44}, {9, 62}, {8, 57}, {4, 48}, {10, 51}, {5, 63}, {1, 56}, {9, 55}, {10, 52}, {10, 33}, {11, 32}, {0, 41}, {0, 42}, {10, 34}, {9, 35}, {7, 46}, {7, 45}, {9, 61}, {8, 58}, {0, 49}, {0, 50}, {11, 60}, {11, 59}, {7, 54}, {7, 53}, {1, 30}, {0, 31}, {11, 22}, {11, 21}, {1, 29}, {9, 28}, {3, 17}, {3, 18}, {9, 2}, {8, 5}, {11, 14}, {11, 13}, {0, 3}, {0, 4}, {3, 9}, {3, 10}, {10, 25}, {11, 24}, {4, 23}, {1, 20}, {10, 26}, {9, 27}, {9, 16}, {1, 19}, {9, 1}, {8, 6}, {4, 15}, {1, 12}, {6, 0}, {10, 7}, {9, 8}, {1, 11}}}, {{7, 20}, {7, 19}, {7, 12}, {7, 11}, {4, 21}, {2, 18}, {4, 13}, {2, 10}, {9, 42}, {8, 45}, {9, 50}, {8, 53}, {0, 43}, {0, 44}, {0, 51}, {0, 52}, {6, 23}, {10, 16}, {6, 15}, {10, 8}, {4, 22}, {2, 17}, {4, 14}, {2, 9}, {9, 41}, {8, 46}, {9, 49}, {8, 54}, {6, 40}, {10, 47}, {6, 48}, {10, 55}, {4, 24}, {10, 27}, {1, 6}, {0, 7}, {9, 31}, {10, 28}, {1, 5}, {9, 4}, {4, 32}, {10, 35}, {1, 58}, {4, 59}, {9, 39}, {10, 36}, {1, 57}, {7, 56}, {0, 25}, {0, 26}, {10, 1}, {11, 0}, {7, 30}, {7, 29}, {10, 2}, {9, 3}, {0, 33}, {0, 34}, {10, 61}, {4, 60}, {7, 38}, {7, 37}, {10, 62}, {3, 63}}, {{9, 38}, {8, 33}, {9, 30}, {8, 25}, {5, 39}, {1, 32}, {5, 31}, {1, 24}, {0, 40}, {5, 41}, {1, 22}, {0, 23}, {8, 43}, {5, 42}, {1, 21}, {9, 20}, {9, 37}, {8, 34}, {9, 29}, {8, 26}, {11, 36}, {11, 35}, {11, 28}, {11, 27}, {11, 47}, {6, 46}, {10, 17}, {11, 16}, {8, 44}, {6, 45}, {10, 18}, {9, 19}, {11, 62}, {11, 61}, {11, 2}, {11, 1}, {3, 57}, {3, 58}, {3, 5}, {3, 6}, {0, 48}, {5, 49}, {1, 14}, {0, 15}, {8, 51}, {5, 50}, {1, 13}, {9, 12}, {4, 63}, {1, 60}, {5, 3}, {2, 0}, {9, 56}, {1, 59}, {5, 4}, {8, 7}, {11, 55}, {6, 54}, {10, 9}, {11, 8}, {8, 52}, {6, 53}, {10, 10}, {9, 11}}}; {{9, 38}, {8, 33}, {9, 30}, {8, 25}, {5, 39}, {1, 32}, {5, 31}, {1, 24}, {0, 40}, {5, 41}, {1, 22}, {0, 23}, {8, 43}, {5, 42}, {1, 21}, {9, 20}, {9, 37}, {8, 34}, {9, 29}, {8, 26}, {11, 36}, {11, 35}, {11, 28}, {11, 27}, {11, 47}, {6, 46}, {10, 17}, {11, 16}, {8, 44}, {6, 45}, {10, 18}, {9, 19}, {11, 62}, {11, 61}, {11, 2}, {11, 1}, {3, 57}, {3, 58}, {3, 5}, {3, 6}, {0, 48}, {5, 49}, {1, 14}, {0, 15}, {8, 51}, {5, 50}, {1, 13}, {9, 12}, {4, 63}, {1, 60}, {5, 3}, {2, 0}, {9, 56}, {1, 59}, {5, 4}, {8, 7}, {11, 55}, {6, 54}, {10, 9}, {11, 8}, {8, 52}, {6, 53}, {10, 10}, {9, 11}}};

Attribute decoding module: the input of the module is attribute bitstream and the output is reconstructed attribute of the point cloud. According to the Hilbert order from small to large or from large to small, the reconstructed attribute information of the point cloud is decoded from the bitstream in order, and the attribute value of the current point is processed by the following steps:

3) Attribute prediction point acquisition module: The input of this module is the reconstructed point cloud, and the output is the attribute prediction point of the current point. The module selects the nearest point of n among the L points in the preceding sequence of Hilbert order as the attribute prediction point of the current point, n is a natural number, and in this example, n is 3: find three points closest to the current point among the first 128 points of the current point under Hilbert order, and set them as $P_i=(X_i, Y_i, Z_i)$ i=1, 2, 3, and set their attribute values as $(A_i)_{i=1, 2, 3}$;

4) Attribute prediction value calculation module: the input of the module is the attribute prediction point, and the output is the attribute prediction value of the current point. The module uses the weighted average value of the three attribute prediction points to reconstruct the attribute values as the attribute prediction value of the current point: the weight $(\omega_i)_{i=1,2,3}$ of the three points are obtained respectively, $$\omega_i = \frac{1}{d_i}, i = 1, 2, 3$$

Among them, $d_i$ is the distance between the point $P_i$ and the current point (X, Y, Z), which can be at least one of the following distances:

Euclidean distance: $d_i = \sqrt{a(X_i-X)^2 + b(Y_i-Y)^2 + c(Z_i-Z)^2}$

Square of Euclidean distance: $d_i = a(X_i-X)^2 + b(Y_i-Y)^2 + c(Z_i-Z)^2$

Chebyshev distance: $d_i = \max(a|X_i-X|, b|Y_i-Y|, c|Z_i-Z|)$

Manhattan distance: $d_i = a|X_i-X| + b|Y_i-Y| + c|Z_i-Z|$ a, b, c are the weighting coefficients of the three dimensions, which are used to control the weight of the three dimensions. In this embodiment, the weighting coefficients a, b, c are a=2, b=1 and c=3 respectively.

Use the following formula to calculate the weighted average of the attribute values of the three points $P_1$, $P_2$, $P_3$, and take the weighted average value as the attribute prediction value $\hat{A}$ of the current point, $$\hat{A} = \frac{\sum_{i=1}^{3} \omega_i A_i}{\sum_{i=1}^{3} \omega_i}$$

3) The attribute residual value R of the current point is decoded from the bitstream;
4) According to the attribute prediction value of the current point and the decoded attribute residual value, the reconstructed attribute value of the current point is $A = \hat{A} + R$.

Embodiment 23

A method for generating a new processing order in this embodiment includes the following contents.

For the reconstructed point cloud geometry, the Hilbert code corresponding to it is generated according to its three-dimensional spatial coordinates. As mentioned above, for a given three-dimensional coordinate $(X_1, X_2, X_3)$, the coordinates of the point are expanded in binary as follows:

$$X_1 = (x_1^1 x_1^2 \ldots x_1^n \ldots x_1^{N-1} x_1^N), X_2 = (x_2^1 x_2^2 \ldots x_2^n \ldots x_2^{N-1} x_2^N), X_3 = (x_3^1 x_3^2 \ldots x_3^n \ldots x_3^{N-1} x_3^N)$$

The Hilbert code $HCode_N(X_1, X_2, X_3) = (C_1 C_2 \ldots C_n \ldots C_{N-1} C_N)$ of point $(X_1, X_2, X_3)$ is obtained through the following process, The Hilbert code has 3*N binary bits. $C_i$, $i=1, \ldots, N$, is the i-th substring code composed of three binary bits, while $C_1$ is the highest 3-bit subcode and $C_N$ is the lowest 3-bit subcode. Hilbert codes are obtained by performing the following calculations:

$$C_1 = f_{S_1}(x_1^1, x_2^1, x_3^1), S_1 \in [a, b, c, d, e, h, k, m, p, q, r, s]$$

$$C_2 = f_{S_2}(x_1^2, x_2^2, x_3^2), S_2 = g(S_1, C_1)$$

...

$$C_n = f_{S_n}(x_1^n, x_2^n, x_3^n), S_n = g(S_{n-1}, C_{n-1})$$

...

$$C_N = f_{S_N}(x_1^N, x_2^N, x_3^N), S_N = g(S_{N-1}, C_{N-1})$$

Figure 4:
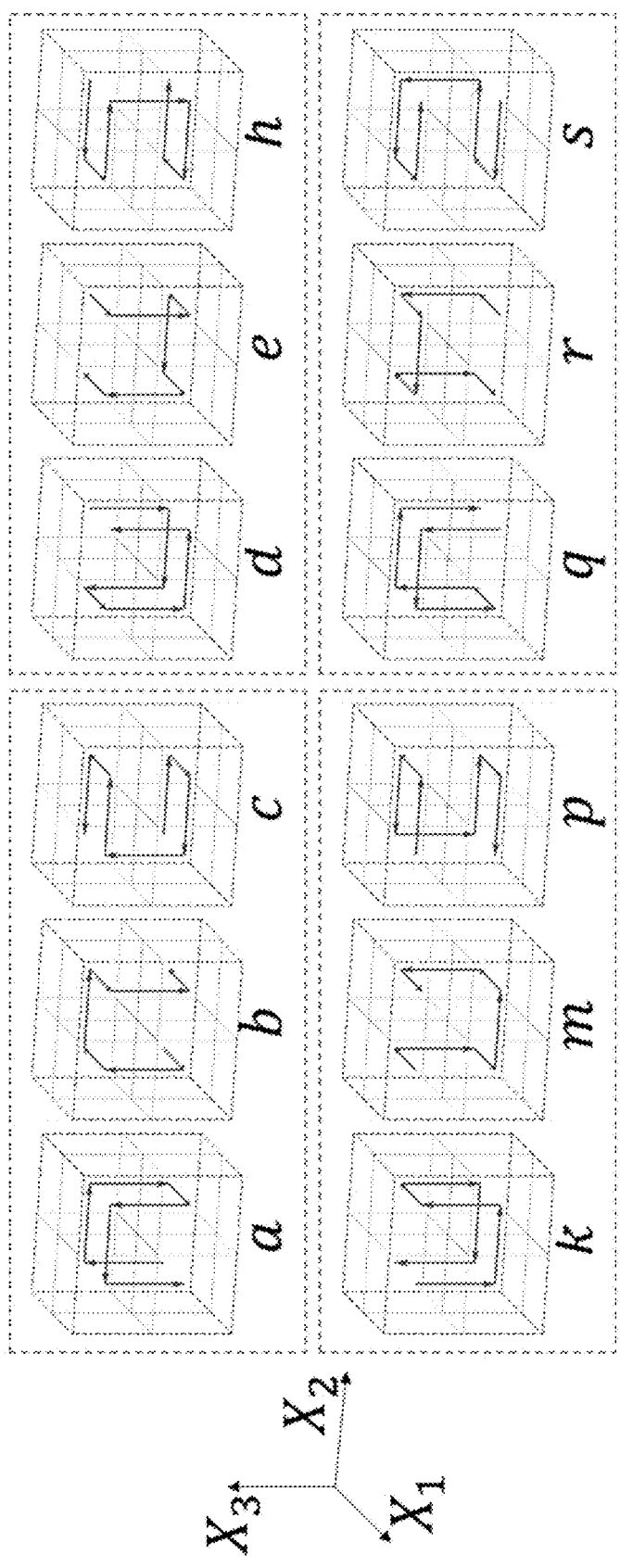
FIG. 4 shows 12 Hilbert states related to the present disclosure.
Figure 5:
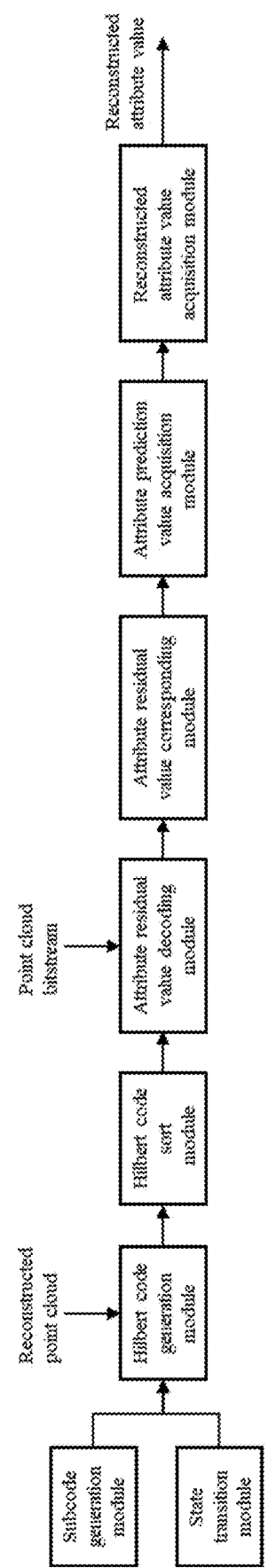
FIG. 5 is a schematic diagram of the device according to the patent embodiment of the disclosure.

Among them, $S_i$ is the state when the subcode $C_{i-1}$ of the i-th string is generated, and $S_i$ is one of the 12 states, as shown in FIG. 4. Each state corresponds to a conversion function $f_{S_i}(x_1^i, x_2^i, x_3^i)$ of $(x_1^i, x_2^i, x_3^i)$ to $C_{i-1}$. $S_i \in [a, b, c, d, e, h, k, m, p, q, r, s]$ means that when calculating $C_1$, one of the 12 states should be selected as the initial value state, and then each time $S_i$ is calculated according to the mapping relationship defined by the function $g(S_{i-1}, C_{i-1})$, which contains the upper state $S_{i-1}$ corresponding to the subcode and the upper subcode $C_{i-1}$ corresponding to the subcode. Until all subcodes $C_1, C_2 \ldots C_N$ are calculated and all subcodes are arranged in order, the Hilbert code $HCode_N(X_1, X_2, X_3)$ of points with three-dimensional space coordinates $(x_1^i, x_2^i, x_3^i)$ is obtained. The bits of the binary code of the Hilbert code cannot form a one-to-one correspondence with the bits of the binary code of the geometric coordinates.

The correspondence between the input $x_1^i, x_2^i, x_3^i$ of a mapping function $f_a(x_1^i, x_2^i, x_3^i)$ corresponding to the 12 states defined in FIG. 4 and the output $C_i$ is as follows:

| $x_1^n$ | $x_2^n$ | $x_3^n$ | $C_i$ |
|---|---|---|---|
| 0 | 0 | 0 | 000 |
| 0 | 0 | 1 | 001 |
| 0 | 1 | 0 | 011 |
| 0 | 1 | 1 | 010 |
| 1 | 0 | 0 | 111 |
| 1 | 0 | 1 | 110 |
| 1 | 1 | 0 | 100 |

The remaining functions are as follows:
$f_b(x_1^i,x_2^i,x_3^i)=f_a(x_2^i,x_3^i,x_1^i), f_c(x_1^i,x_2^i,x_3^i)=f_a(x_3^i,x_1^i, x_2^i), f_d(x_1^i,x_2^i,x_3^i)=f_a(x_1^i,x_2^i, x_3^i), f_e(x_1^i,x_2^i,x_3^i)=f_a(x_2^i,x_3^i,x_1^i), f_h(x_1^i,x_2^i,x_3^i)=f_a(x_3^i,x_1^i,x_2^i), f_k(x_1^i,x_2^i,x_3^i)=f_a(x_1^i,x_2^i, x_3^i), f_m(x_1^i,x_2^i,x_3^i)=f_a(x_2^i,x_3^i,x_1^i), f_p(x_1^i,x_2^i,x_3^i)= f_a(x_3^i,x_1^i,x_2^i), f_q(x_1^i,x_2^i,x_3^i)=f_a(x_1^i, x_2^i,x_3^i), f_r(x_1^i,x_2^i,x_3^i)=f_a(x_2^i,x_3^i, x_1^i), f_s(x_1^i,x_2^i,x_3^i)=f_a(x_3^i,x_1^i,x_2^i),$ The transformation relationship between the above maps has the same meaning as the transformation relationship between the curves corresponding to the state, the order exchange of the binary coordinates input by $f(x_1^i, x_2^i, x_3^i)$ corresponds to the symmetry of the plane in the curve, and the reverse of the binary coordinates input by $f(x_1^i, x_2^i, x_3^i)$ corresponds to the rotation around the axis in the curve. The remaining mappings are shown in the following table:

| $C_i = f_b(x_1^i, x_2^i, x_3^i)$ | | | | $C_i = f_c(x_1^i, x_2^i, x_3^i)$ | | | |
|---|---|---|---|---|---|---|---|
| $x_1^i$ | $x_2^i$ | $x_3^i$ | $C_i$ | $x_1^i$ | $x_2^i$ | $x_3^i$ | $C_i$ |
| 0 | 0 | 0 | 000 | 0 | 0 | 0 | 000 |
| 0 | 0 | 1 | 011 | 0 | 0 | 1 | 111 |
| 0 | 1 | 0 | 111 | 0 | 1 | 0 | 001 |
| 0 | 1 | 1 | 100 | 0 | 1 | 1 | 110 |
| 1 | 0 | 0 | 001 | 1 | 0 | 0 | 011 |
| 1 | 0 | 1 | 010 | 1 | 0 | 1 | 100 |
| 1 | 1 | 0 | 110 | 1 | 1 | 0 | 010 |
| 1 | 1 | 1 | 101 | 1 | 1 | 1 | 101 |

| $C_i = f_d(x_1^i, x_2^i, x_3^i)$ | | | | $C_i = f_e(x_1^i, x_2^i, x_3^i)$ | | | | $C_i = f_h(x_1^i, x_2^i, x_3^i)$ | | | |
|---|---|---|---|---|---|---|---|---|---|---|---|
| $x_1^i$ | $x_2^i$ | $x_3^i$ | $C_i$ | $x_1^i$ | $x_2^i$ | $x_3^i$ | $C_i$ | $x_1^i$ | $x_2^i$ | $x_3^i$ | $C_i$ |
| 0 | 0 | 0 | 010 | 0 | 0 | 0 | 100 | 0 | 0 | 0 | 110 |
| 0 | 0 | 1 | 011 | 0 | 0 | 1 | 111 | 0 | 0 | 1 | 001 |
| 0 | 1 | 0 | 001 | 0 | 1 | 0 | 011 | 0 | 1 | 0 | 111 |
| 0 | 1 | 1 | 000 | 0 | 1 | 1 | 000 | 0 | 1 | 1 | 000 |
| 1 | 0 | 0 | 101 | 1 | 0 | 0 | 101 | 1 | 0 | 0 | 101 |
| 1 | 0 | 1 | 100 | 1 | 0 | 1 | 110 | 1 | 0 | 1 | 010 |
| 1 | 1 | 0 | 110 | 1 | 1 | 0 | 010 | 1 | 1 | 0 | 100 |
| 1 | 1 | 1 | 111 | 1 | 1 | 1 | 001 | 1 | 1 | 1 | 011 |

| $C_i = f_k(x_1^i, x_2^i, x_3^i)$ | | | | $C_i = f_m(x_1^i, x_2^i, x_3^i)$ | | | | $C_i = f_p(x_1^i, x_2^i, x_3^i)$ | | | |
|---|---|---|---|---|---|---|---|---|---|---|---|
| $x_1^i$ | $x_2^i$ | $x_3^i$ | $C_i$ | $x_1^i$ | $x_2^i$ | $x_3^i$ | $C_i$ | $x_1^i$ | $x_2^i$ | $x_3^i$ | $C_i$ |
| 0 | 0 | 0 | 110 | 0 | 0 | 0 | 010 | 0 | 0 | 0 | 100 |
| 0 | 0 | 1 | 111 | 0 | 0 | 1 | 001 | 0 | 0 | 1 | 011 |
| 0 | 1 | 0 | 101 | 0 | 1 | 0 | 101 | 0 | 1 | 0 | 101 |
| 0 | 1 | 1 | 100 | 0 | 1 | 1 | 110 | 0 | 1 | 1 | 010 |
| 1 | 0 | 0 | 001 | 1 | 0 | 0 | 011 | 1 | 0 | 0 | 111 |

-continued

| $C_i = f_k(x_1^i, x_2^i, x_3^i)$ | | | | $C_i = f_m(x_1^i, x_2^i, x_3^i)$ | | | | $C_i = f_p(x_1^i, x_2^i, x_3^i)$ | | | |
|---|---|---|---|---|---|---|---|---|---|---|---|
| $x_1^i$ | $x_2^i$ | $x_3^i$ | $C_i$ | $x_1^i$ | $x_2^i$ | $x_3^i$ | $C_i$ | $x_1^i$ | $x_2^i$ | $x_3^i$ | $C_i$ |
| 1 | 0 | 1 | 000 | 1 | 0 | 1 | 000 | 1 | 0 | 1 | 000 |
| 1 | 1 | 0 | 010 | 1 | 1 | 0 | 100 | 1 | 1 | 0 | 110 |
| 1 | 1 | 1 | 011 | 1 | 1 | 1 | 111 | 1 | 1 | 1 | 001 |

| $C_i = f_q(x_1^i, x_2^i, x_3^i)$ | | | | $C_i = f_r(x_1^i, x_2^i, x_3^i)$ | | | | $C_i = f_s(x_1^i, x_2^i, x_3^i)$ | | | |
|---|---|---|---|---|---|---|---|---|---|---|---|
| $x_1^i$ | $x_2^i$ | $x_3^i$ | $C_i$ | $x_1^i$ | $x_2^i$ | $x_3^i$ | $C_i$ | $x_1^i$ | $x_2^i$ | $x_3^i$ | $C_i$ |
| 0 | 0 | 0 | 100 | 0 | 0 | 0 | 110 | 0 | 0 | 0 | 010 |
| 0 | 0 | 1 | 101 | 0 | 0 | 1 | 101 | 0 | 0 | 1 | 101 |
| 0 | 1 | 0 | 111 | 0 | 1 | 0 | 001 | 0 | 1 | 0 | 011 |
| 0 | 1 | 1 | 110 | 0 | 1 | 1 | 010 | 0 | 1 | 1 | 100 |
| 1 | 0 | 0 | 011 | 1 | 0 | 0 | 111 | 1 | 0 | 0 | 001 |
| 1 | 0 | 1 | 010 | 1 | 0 | 1 | 100 | 1 | 0 | 1 | 110 |
| 1 | 1 | 0 | 000 | 1 | 1 | 0 | 000 | 1 | 1 | 0 | 000 |
| 1 | 1 | 1 | 001 | 1 | 1 | 1 | 011 | 1 | 1 | 1 | 111 |

The function $S_i = g(S_{i-1}, C_{i-1})$ is used to obtain the state $S_i$ of the current level from the previous level state $S_{i-1}$ and the previous level subcode $C_{i-1}$, which is shown as follows:

Table 1. the g function mapping relation to get $S_i$ according to $S_{i-1}$ and $C_{i-1}$

| | $S_{i-1}$ | | | | | | | | | | |
|---|---|---|---|---|---|---|---|---|---|---|---|
| $C_{i-1}$ | a | b | c | d | e | h | k | m | p | q | r | s |
| 000 | c | a | b | h | d | e | p | k | m | s | q | r |
| 001 | b | c | a | e | h | d | m | p | k | r | s | q |
| 010 | b | c | a | e | h | d | m | p | k | r | s | q |
| 011 | q | e | p | k | b | s | d | r | c | a | m | h |
| 100 | q | e | p | k | b | s | d | r | c | a | m | h |
| 101 | m | s | d | r | p | a | b | h | q | e | c | k |
| 110 | m | s | d | r | p | a | b | h | q | e | c | k |
| 111 | h | k | r | c | q | m | s | a | e | p | d | b |

In this example, the numbers corresponding to the 12 states shown in FIG. 4 can be changed, but the $g(S_{i-1}, C_{i-1})$ function in Table 1 should also be adjusted accordingly so that the state transition relationship of $S_i$ obtained from $S_{i-1}$) remains unchanged.

Embodiment 24

A method of generating a new processing order for this embodiment includes the following For the reconstructed point cloud geometry, the corresponding Hilbert code is generated according to its three-dimensional space coordinates. As mentioned above, for a given three-dimensional coordinate of $(X_1, X_2, X_3)$, its coordinates are expanded in binary as follows $$X_1 = (x_1^1 x_1^2 \ldots x_1^n \ldots x_1^{N-1} x_1^N), X_2 = (x_2^1 x_2^2 \ldots x_2^n \ldots x_2^{N-1} x_2^N), X_3 = (x_3^1 x_3^2 \ldots x_3^n \ldots x_3^{N-1} x_3^N)$$

The Hilbert code $HCode_N(X_1, X_2, X_3) = (C_1 C_2 \ldots C_n \ldots C_{N-1} C_N)$ of point $(X_1, X_2, X_3)$ is obtained through the following process, The Hilbert code has 3*N binary bits. $C_i$, $i=1, \ldots, N$, is the i-th substring code composed of three binary bits, while $C_1$ is the highest 3-bit subcode and $C_N$ is the lowest 3-bit subcode. Hilbert codes are obtained by performing the following calculations:

$$C_1 = f_{S_1}(x_1^1, x_2^1, x_3^1), S_1 \in [a, b, c, d, e, h, k, m, p, q, r, s]$$

$$C_2 = f_{S_2}(x_1^2, x_2^2, x_3^2), S_2 = g(S_1, C_1)$$

$$\ldots$$

$$C_n = f_{S_n}(x_1^n, x_2^n, x_3^n), S_n = g(S_{n-1}, C_{n-1})$$

$$\ldots$$

$$C_N = f_{S_N}(x_1^N, x_2^N, x_3^N), S_N = g(S_{N-1}, C_{N-1})$$

Among them, $S_i$ is the state when the subcode $C_{i-1}$ of the i-th string is generated, and $S_i$ is one of the 12 states, as shown in FIG. 4. Each state corresponds to a conversion function $f_{S_i}(x_1^i, x_2^i, x_3^i)$ of $(x_1^i, x_2^i, x_3^i)$ to $C_{i-1}$. $S_i \in [a, b, c, d, e, h, k, m, p, q, r, s]$ means that when calculating $C_1$, one of the 12 states should be selected as the initial value state, and then each time $S_i$ is calculated according to the mapping relationship defined by the function $g(S_{i-1}, C_{i-1})$, which contains the upper state $S_{i-1}$ corresponding to the subcode and the upper subcode $C_{i-1}$ corresponding to the subcode. Until all subcodes $C_1, C_2 \ldots C_N$ are calculated and all subcodes are arranged in order, the Hilbert code $HCode_N(X_1, X_2, X_3)$ of points with three-dimensional space coordinates $(x_1^i, x_2^i, x_3^i)$ is obtained. The bits of the binary code of the Hilbert code cannot form a one-to-one correspondence with the bits of the binary code of the geometric coordinates.

The correspondence between the input $x_1^i, x_2^i, x_3^i$ of a mapping function $f_a(x_1^i, x_2^i, x_3^i)$ corresponding to the 12 states defined in FIG. 4 and the output $C_i$ is as follows:

$$c_1^i = x_1^i$$

$$c_2^i = x_1^i - x_2^i$$

$$c_3^i = \overline{x_1^i}(x_2^i \oplus x_3^i) + x_1^i(x_2^i \odot x_3^i)$$

$$C_i = c_1^i c_2^i c_3^i$$

Among them, $\oplus$ denotes the exclusive-or operation, and $\odot$ denotes the inclusive-or operation. The mapping relationship between the remaining states and $f_a(x_1^i, x_2^i, x_3^i)$ has the following operational relationship, where $\overline{x}$ denotes the reverse operation of x.

$$f_b(x_1^i, x_2^i, x_3^i) = f_a(x_2^i, x_3^i, x_1^i), f_c(x_1^i, x_2^i, x_3^i) = f_a(x_3^i, x_1^i, x_2^i), f_d(x_1^i, x_2^i, x_3^i) = f_a(x_1^i, \overline{x_2^i}, x_3^i), f_e(x_1^i, x_2^i, x_3^i) = f_a(\overline{x_2^i}, x_3^i, x_1^i), f_h(x_1^i, x_2^i, x_3^i) = f_a(\overline{x_3^i}, x_1^i, x_2^i), f_k(x_1^i, x_2^i, x_3^i) = f_a(\overline{x_1^i}, x_2^i, \overline{x_3^i}), f_m(x_1^i, x_2^i, x_3^i) = f_a(x_2^i, \overline{x_3^i}, \overline{x_1^i}), f_p(x_1^i, x_2^i, x_3^i) = f_a(\overline{x_3^i}, \overline{x_1^i}, x_2^i), f_q(x_1^i, x_2^i, x_3^i) = f_a(\overline{x_1^i}, \overline{x_2^i}, x_3^i), f_r(x_1^i, x_2^i, x_3^i) = f_a(\overline{x_2^i}, x_3^i, \overline{x_1^i}), f_s(x_1^i, x_2^i, x_3^i) = f_a(x_3^i, \overline{x_1^i}, \overline{x_2^i}),$$

The transformation relationship between the above maps has the same meaning as the transformation relationship between the curves corresponding to the state, the order exchange of the binary coordinates input by $f(x_1^i, x_2^i, x_3^i)$ corresponds to the symmetry of the plane in the curve, and the reverse of the binary coordinates input by $f(x_1^i, x_2^i, x_3^i)$ corresponds to the rotation around the axis in the curve.

The mapping relationship of the function $S_i=g(S_{i-1}, C_{i-1})$ is shown in Table 2.

TABLE 2 the g function mapping relation to get $S_i$ according to $S_{i-1}$ and $C_{i-1}$

| $C_{i-1}$ | $S_{i-1}$ | | | | | | | | | | |
|---|---|---|---|---|---|---|---|---|---|---|---|
| | a | b | c | d | e | h | k | m | p | q | r | s |
| 000 | c | a | b | h | d | e | p | k | m | s | q | r |
| 001 | b | c | a | e | h | d | m | p | k | r | s | q |
| 010 | b | c | a | e | h | d | m | p | k | r | s | q |
| 011 | q | e | p | k | b | s | d | r | c | a | m | h |
| 100 | q | e | p | k | b | s | d | r | c | a | m | h |
| 101 | m | s | d | r | p | a | b | h | q | e | c | k |
| 110 | m | s | d | r | p | a | b | h | q | e | c | k |
| 111 | h | k | r | c | q | m | s | a | e | p | d | b |

In this embodiment, the numbers corresponding to the 12 states shown in FIG. 4 can be changed, but the $g(S_{i-1}, C_{i-1})$ function in Table 2 should also be adjusted accordingly so that the state transition relationship of $S_i$ obtained from $S_{i-1}$ remains unchanged.

Embodiment 25

A method of generating a new processing order for this embodiment includes the following For the reconstructed point cloud geometry, the corresponding Hilbert code is generated according to its three-dimensional space coordinates. As mentioned above, for a given three-dimensional coordinate of $(X_1, X_2, X_3)$, its coordinates are expanded in binary as follows $$X_1=(x_1^1 x_1^2 \ldots x_1^n \ldots x_1^{N-1} x_1^N), X_2=(x_2^1 x_2^2 \ldots x_2^n \ldots x_2^{N-1} x_2^N), X_3=(x_3^1 x_3^2 \ldots x_3^n \ldots x_3^{N-1} x_3^N)$$

The Hilbert code $HCode_N(X_1, X_2, X_3)=(C_1 C_2 \ldots C_n \ldots C_{N-1} C_N)$ of point $(X_1, X_2, X_3)$ is obtained through the following process, The Hilbert code has 3*N binary bits. $C_i$, i=1, . . . , N, is the i-th substring code composed of three binary bits, while $C_1$ is the highest 3-bit subcode and $C_N$ is the lowest 3-bit subcode. Hilbert codes are obtained by performing the following calculations:

$$C_1 = f_{S_1}(x_1^1, x_2^1, x_3^1), S_1 \in [a, b, c, d, e, h, k, m, p, q, r, s]$$

$$C_2 = f_{S_2}(x_1^2, x_2^2, x_3^2), S_2 = g(S_1, C_1)$$

...

$$C_n = f_{S_n}(x_1^n, x_2^n, x_3^n), S_n = g(S_{n-1}, C_{n-1})$$

...

$$C_N = f_{S_N}(x_1^N, x_2^N, x_3^N), S_N = g(S_{N-1}, C_{N-1})$$

Among them, $S_i$ is the state when the subcode $C_{i-1}$ of the i-th string is generated, and $S_i$ is one of the 12 states, as shown in FIG. 4. Each state corresponds to a conversion function $f_{S_i}(x_1^i, x_2^i, x_3^i)$ of $(x_1^i, x_2^i, x_3^i)$ to $C_{i-1}$. $S_i \in [a, b, c, d, e, h, k, m, p, q, r, s]$ means that when calculating $C_1$, one of the 12 states should be selected as the initial value state, and then each time $S_i$ is calculated according to the mapping relationship defined by the function $g(S_{i-1}, C_{i-1})$, which contains the upper state $S_{i-1}$ corresponding to the subcode and the upper subcode $C_{i-1}$ corresponding to the subcode. Until all subcodes $C_1, C_2 \ldots C_N$ are calculated and all subcodes are arranged in order, the Hilbert codeHCode$_N$ $(X_1, X_2, X_3)$ of points with three-dimensional space coordinates $(x_1^i, x_2^i, x_3^i)$ is obtained. The bits of the binary code of the Hilbert code cannot form a one-to-one correspondence with the bits of the binary code of the geometric coordinates.

The correspondence between the input $x_1^i, x_2^i, x_3^i$ and the output $C_i$ of a mapping function $f_a(x_1^i, x_2^i, x_3^i)$ is as follows:

| $C_i = f_a(x_1^i, x_2^i, x_3^i)$ | | | |
|---|---|---|---|
| $x_1^n$ | $x_2^n$ | $x_3^n$ | $C_i$ |
| 0 | 0 | 0 | 101 |
| 0 | 0 | 1 | 100 |
| 0 | 1 | 0 | 110 |
| 0 | 1 | 1 | 111 |
| 1 | 0 | 0 | 010 |
| 1 | 0 | 1 | 011 |
| 1 | 1 | 0 | 001 |
| 1 | 1 | 1 | 000 |

The remaining functions are as follows:

$f_b(x_1^i, x_2^i, x_3^i)=f_a(x_2^i, x_3^i, x_1^i), f_c(x_1^i, x_2^i, x_3^i)=f_a(x_3^i, x_1^i, x_2^i), f_d(x_1^i, x_2^i, x_3^i)=f_a(x_1^i, x_2^i, x_3^i)= f_a(x_2^i, x_3^i, x_1^i), f_h(x_1^i, x_2^i, x_3^i)=f_a(x_3^i, x_1^i, x_2^i), f_k(x_1^i, x_2^i, x_3^i)=f_a(x_1^i, x_2^i, x_3^i), f_m(x_1^i, x_2^i, x_3^i)=f_a(x_2^i, x_3^i, x_1^i), f_p(x_1^i, x_2^i, x_3^i)= f_a(x_3^i, x_1^i, x_2^i), f_q(x_1^i, x_2^i, x_3^i)=f_a(x_1^i, x_2^i, x_3^i), f_r(x_1^i, x_2^i, x_3^i)=f_a(x_2^i, x_3^i, x_1^i), f_s(x_1^i, x_2^i, x_3^i)=f_a(x_3^i, x_1^i, x_2^i),$

The transformation relationship between the above maps has the same meaning as the transformation relationship between the curves corresponding to the state, the order exchange of the binary coordinates input by $f(x_1^i, x_2^i, x_3^i)$ corresponds to the symmetry of the plane in the curve, and the reverse of the binary coordinates input by $f(x_1^i, x_2^i, x_3^i)$ corresponds to the rotation around the axis in the curve.

The remaining mappings are shown in the following table:

| $C_i = f_b(x_1^i, x_2^i, x_3^i)$ | | | | $C_i = f_c(x_1^i, x_2^i, x_3^i)$ | | | |
|---|---|---|---|---|---|---|---|
| $x_1^i$ | $x_2^i$ | $x_3^i$ | $C_i$ | $x_1^i$ | $x_2^i$ | $x_3^i$ | $C_i$ |
| 0 | 0 | 0 | 101 | 0 | 0 | 0 | 101 |
| 0 | 0 | 1 | 110 | 0 | 0 | 1 | 010 |
| 0 | 1 | 0 | 010 | 0 | 1 | 0 | 100 |
| 0 | 1 | 1 | 001 | 0 | 1 | 1 | 011 |
| 1 | 0 | 0 | 100 | 1 | 0 | 0 | 110 |
| 1 | 0 | 1 | 111 | 1 | 0 | 1 | 001 |
| 1 | 1 | 0 | 011 | 1 | 1 | 0 | 111 |
| 1 | 1 | 1 | 000 | 1 | 1 | 1 | 000 |

| $C_i = f_d(x_1^i, x_2^i, x_3^i)$ | | | | $C_i = f_e(x_1^i, x_2^i, x_3^i)$ | | | | $C_i = f_h(x_1^i, x_2^i, x_3^i)$ | | | |
|---|---|---|---|---|---|---|---|---|---|---|---|
| $x_1^i$ | $x_2^i$ | $x_3^i$ | $C_i$ | $x_1^i$ | $x_2^i$ | $x_3^i$ | $C_i$ | $x_1^i$ | $x_2^i$ | $x_3^i$ | $C_i$ |
| 0 | 0 | 0 | 111 | 0 | 0 | 0 | 001 | 0 | 0 | 0 | 011 |
| 0 | 0 | 1 | 110 | 0 | 0 | 1 | 010 | 0 | 0 | 1 | 100 |
| 0 | 1 | 0 | 100 | 0 | 1 | 0 | 110 | 0 | 1 | 0 | 010 |
| 0 | 1 | 1 | 101 | 0 | 1 | 1 | 101 | 0 | 1 | 1 | 101 |
| 1 | 0 | 0 | 000 | 1 | 0 | 0 | 000 | 1 | 0 | 0 | 000 |
| 1 | 0 | 1 | 001 | 1 | 0 | 1 | 011 | 1 | 0 | 1 | 111 |
| 1 | 1 | 0 | 011 | 1 | 1 | 0 | 111 | 1 | 1 | 0 | 001 |
| 1 | 1 | 1 | 010 | 1 | 1 | 1 | 100 | 1 | 1 | 1 | 110 |

| $C_i = f_k(x_1^i, x_2^i, x_3^i)$ | | | | $C_i = f_m(x_1^i, x_2^i, x_3^i)$ | | | | $C_i = f_p(x_1^i, x_2^i, x_3^i)$ | | | |
|---|---|---|---|---|---|---|---|---|---|---|---|
| $x_1^i$ | $x_2^i$ | $x_3^i$ | $C_i$ | $x_1^i$ | $x_2^i$ | $x_3^i$ | $C_i$ | $x_1^i$ | $x_2^i$ | $x_3^i$ | $C_i$ |
| 0 | 0 | 0 | 011 | 0 | 0 | 0 | 111 | 0 | 0 | 0 | 001 |
| 0 | 0 | 1 | 010 | 0 | 0 | 1 | 100 | 0 | 0 | 1 | 110 |
| 0 | 1 | 0 | 000 | 0 | 1 | 0 | 000 | 0 | 1 | 0 | 000 |
| 0 | 1 | 1 | 001 | 0 | 1 | 1 | 011 | 0 | 1 | 1 | 111 |
| 1 | 0 | 0 | 100 | 1 | 0 | 0 | 110 | 1 | 0 | 0 | 010 |
| 1 | 0 | 1 | 101 | 1 | 0 | 1 | 101 | 1 | 0 | 1 | 101 |
| 1 | 1 | 0 | 111 | 1 | 1 | 0 | 001 | 1 | 1 | 0 | 011 |
| 1 | 1 | 1 | 110 | 1 | 1 | 1 | 010 | 1 | 1 | 1 | 100 |

| $C_i = f_q(x_1^i, x_2^i, x_3^i)$ | | | | $C_i = f_r(x_1^i, x_2^i, x_3^i)$ | | | | $C_i = f_s(x_1^i, x_2^i, x_3^i)$ | | | |
|---|---|---|---|---|---|---|---|---|---|---|---|
| $x_1^i$ | $x_2^i$ | $x_3^i$ | $C_i$ | $x_1^i$ | $x_2^i$ | $x_3^i$ | $C_i$ | $x_1^i$ | $x_2^i$ | $x_3^i$ | $C_i$ |
| 0 | 0 | 0 | 001 | 0 | 0 | 0 | 011 | 0 | 0 | 0 | 111 |
| 0 | 0 | 1 | 000 | 0 | 0 | 1 | 000 | 0 | 0 | 1 | 000 |
| 0 | 1 | 0 | 010 | 0 | 1 | 0 | 100 | 0 | 1 | 0 | 110 |
| 0 | 1 | 1 | 011 | 0 | 1 | 1 | 111 | 0 | 1 | 1 | 001 |
| 1 | 0 | 0 | 110 | 1 | 0 | 0 | 010 | 1 | 0 | 0 | 100 |
| 1 | 0 | 1 | 111 | 1 | 0 | 1 | 001 | 1 | 0 | 1 | 011 |
| 1 | 1 | 0 | 101 | 1 | 1 | 0 | 101 | 1 | 1 | 0 | 101 |
| 1 | 1 | 1 | 100 | 1 | 1 | 1 | 110 | 1 | 1 | 1 | 010 |

The function $S_i = g(S_{i-1}, C_{i-1})$ is used to obtain the state $S_i$ of the current level from the previous level state $S_{i-1}$ and the previous level subcode $C_{i-1}$, which is shown as follows:

TABLE 3 the g function mapping relation to get $S_i$ according to $S_{i-1}$ and $C_{i-1}$

| | $S_{i-1}$ | | | | | | | | | | |
|---|---|---|---|---|---|---|---|---|---|---|---|
| $C_{i-1}$ | a | b | c | d | e | h | k | m | p | q | r | s |
| 000 | c | a | b | h | d | e | p | k | m | s | q | r |
| 001 | b | c | a | e | h | d | m | p | k | r | s | q |
| 010 | b | c | a | e | h | d | m | p | k | r | s | q |
| 011 | q | e | p | k | b | s | d | r | c | a | m | h |
| 100 | q | e | p | k | b | s | d | r | c | a | m | h |
| 101 | m | s | d | r | p | a | b | h | q | e | c | k |
| 110 | m | s | d | r | p | a | b | h | q | e | c | k |
| 111 | h | k | r | c | q | m | s | a | e | p | d | b |

In this embodiment, the numbers corresponding to the 12 states can be changed, but the $g(S_{i-1}, C_{i-1})$ function in Table 3 should also be adjusted accordingly so that the state transition relationship of $S_i$ obtained from $S S_{i-1}$) remains unchanged.

Embodiment 26

A method of generating a new processing order for this embodiment includes the following For the reconstructed point cloud geometry, the corresponding Hilbert code is generated according to its three-dimensional space coordinates. As mentioned above, for a given three-dimensional coordinate of $(X_1, X_2, X_3)$, its coordinates are expanded in binary as follows $$X_1 = (x_1^1 x_1^2 \ldots x_1^n \ldots x_1^{N-1} x_1^N), X_2 = (x_2^1 x_2^2 \ldots x_2^n \ldots x_2^{N-1} x_2^N), X_3 = (x_3^1 x_3^2 \ldots x_3^n \ldots x_3^{N-1} x_3^N)$$

The Hilbert code $HCode_N(X_1, X_2, X_3) = (C_1 C_2 \ldots C_n \ldots C_{N-1} C_N)$ of point $(X_1, X_2, X_3)$ is obtained through the following process, The Hilbert code has 3*N binary bits. $C_i$, $i=1, \ldots, N$, is the i-th substring code composed of three binary bits, while $C_1$ is the highest 3-bit subcode and $C_N$ is the lowest 3-bit subcode. Hilbert codes are obtained by performing the following calculations:

$$C_1 = f_{S_1}(x_1^1, x_2^1, x_3^1), S_1 \in [a, b, c, d, e, h, k, m, p, q, r, s]$$

$$C_2 = f_{S_2}(x_1^2, x_2^2, x_3^2), S_2 = g(S_1, C_1)$$

...

$$C_n = f_{S_n}(x_1^n, x_2^n, x_3^n), S_n = g(S_{n-1}, C_{n-1})$$

...

$$C_N = f_{S_N}(x_1^N, x_2^N, x_3^N), S_N = g(S_{N-1}, C_{N-1})$$

Among them, $S_i$ is the state when the subcode $C_{i-1}$ of the i-th string is generated, and $S_i$ is one of the 12 states, as shown in FIG. 4. Each state corresponds to a conversion function $f_{S_i}(x_1^i, x_2^i, x_3^i)$ of $(x_1^i, x_2^i, x_3^i)$ to $C_{i-1}$. $S_i \in [a, b, c, d, e, h, k, m, p, q, r, s]$ means that when calculating $C_1$, one of the 12 states should be selected as the initial value state, and then each time $S_i$ is calculated according to the mapping relationship defined by the function $g(S_{i-1}, C_{i-1})$, which contains the upper state $S_{i-1}$ corresponding to the subcode and the upper subcode $C_{i-1}$ corresponding to the subcode. Until all subcodes $C_1, C_2 \ldots C_N$ are calculated and all subcodes are arranged in order, the Hilbert code $HCode_N(X_1, X_2, X_3)$ of points with three-dimensional space coordinates $(x_1^i, x_2^i, x_3^i)$ is obtained. The bits of the binary code of the Hilbert code cannot form a one-to-one correspondence with the bits of the binary code of the geometric coordinates.

The correspondence between the input $x_1^i, x_2^i, x_3^i$ of a mapping function $f_a(x_1^i, x_2^i, x_3^i)$ corresponding to the 12 states defined in FIG. 4 and the output $C_i$ is as follows:

$$c_1^i = x_1^i$$

$$c_2^i = x_1^i - x_2^i$$

$$c_3^i = \overline{x_1^i}(x_2^i \oplus x_3^i) + x_1^i(x_2^i \odot x_3^i)$$

$$C_i = c_1^i c_2^i c_3^i$$

Among them, $\oplus$ denotes the exclusive-or operation, and $\odot$ denotes the inclusive-or operation. The mapping relationship between the remaining states and $f_a(x_1^i, x_2^i, x_3^i)$ has the following operational relationship, where $\overline{x}$ denotes the reverse operation of x.

$$f_b(x_1^i, x_2^i, x_3^i) = f_a(x_2^i, x_3^i, x_1^i), f_c(x_1^i, x_2^i, x_3^i) = f_a(x_3^i, x_1^i, x_2^i), f_d(x_1^i, x_2^i, x_3^i) = f_a(x_1^i, \overline{x_2^i}, \overline{x_3^i}), f_e(x_1^i, \overline{x_2^i}, \overline{x_3^i}) = f_a(x_2^i, \overline{x_3^i}, x_1^i), f_h(x_1^i, x_2^i, x_3^i) = f_a(\overline{x_3^i}, x_1^i, \overline{x_2^i}), f_k(x_1^i, x_2^i, x_3^i) = f_a(\overline{x_1^i}, x_2^i, \overline{x_3^i}), f_m(x_1^i, x_2^i, x_3^i) = f_a(x_2^i, \overline{x_3^i}, \overline{x_1^i}), f_p(x_1^i, x_2^i, x_3^i) = f_a(x_3^i, x_1^i, \overline{x_2^i}), f_q(x_1^i, x_2^i, x_3^i) = f_a(\overline{x_1^i}, \overline{x_2^i}, x_3^i), f_r(x_1^i, x_2^i, x_3^i) = f_a(\overline{x_2^i}, x_3^i, \overline{x_1^i}), f_s(x_1^i, x_2^i, x_3^i) = f_a(x_3^i, \overline{x_1^i}, x_2^i),$$

The transformation relationship between the above maps has the same meaning as the transformation relationship between the curves corresponding to the state The order exchange of the binary coordinates input by $f(x_1^i, x_2^i, x_3^i)$ corresponds to the symmetry of the plane in the curve, and the reverse of the binary coordinates input by $f(x_1^i, x_2^i, x_3^i)$ corresponds to the rotation around the axis in the curve.

The mapping relationship of the function $S_i = g(S_{i-1}, C_{i-1})$ is shown in Table 4.

TABLE 4 the g function mapping relation to get $S_i$ according to $S_{i-1}$ and $C_{i-1}$

| $C_{i-1}$ | $S_{i-1}$ | | | | | | | | | | | |
|---|---|---|---|---|---|---|---|---|---|---|---|---|
| | a | b | c | d | e | h | k | m | p | q | r | s |
| 000 | c | a | b | h | d | e | p | k | m | s | q | r |
| 001 | b | c | a | e | h | d | m | p | k | r | s | q |
| 010 | b | c | a | e | h | d | m | p | k | r | s | q |
| 011 | q | e | p | k | b | s | d | r | c | a | m | h |
| 100 | q | e | p | k | b | s | d | r | c | a | m | h |
| 101 | m | s | d | r | p | a | b | h | q | e | c | k |
| 110 | m | s | d | r | p | a | b | h | q | e | c | k |
| 111 | h | k | r | c | q | m | s | a | e | p | d | b |

In this example, the numbers corresponding to the 12 states can be changed, but the g ($S_{i-1}$, $C_{i-1}$) function in Table 4 should also be adjusted accordingly so that the state transition relationship of $S_i$ obtained from $S_{i-1}$) remains unchanged.

Embodiment 27

A point cloud attribute decoding method based on a new processing order for this embodiment includes the following contents.

According to the three-dimensional geometric coordinates of all points in the point set, the corresponding Hilbert code is calculated by any method in embodiment 23 to embodiment 26, and then these points are reordered according to the Hilbert code values of these points, and the multiple points arranged in Hilbert order are obtained. The bits of the binary code of the Hilbert code cannot form a one-to-one correspondence with the bits of the binary code of the geometric coordinates.

The attribute residual values of multiple points are obtained by decoding from the bitstream.

The attribute residual values of these points correspond to the Hilbert codes of each point in the Hilbert order point set, and also correspond to the three-dimensional geometric coordinates of each point in the Hilbert order. That is, the attribute residuals $r_1$, $r_2$, . . . decoded from the stream correspond to the points $P_1$, $P_2$, . . . sorted after Hilbert order.

Embodiment 28

A point cloud attribute decoding method based on a new processing order for this embodiment includes the following contents.

According to the three-dimensional geometric coordinates of all points in the point set, the corresponding Hilbert code is calculated by any method in embodiment 23 to embodiment 26, and then these points are reordered according to the Hilbert code values of these points, and the multiple points arranged in Hilbert order are obtained. The bits of the binary code of the Hilbert code cannot form a one-to-one correspondence with the bits of the binary code of the geometric coordinates.

In this paper, any method of embodiments 1 to 22 is used to decode the attribute residual value from the bitstream and predict the attribute value of the decoding point, and then the reconstructed attribute value of the point is obtained according to the attribute residual value corresponding to the point.

Embodiment 29

A point cloud attribute encoding method based on a new processing order in this embodiment includes the following contents.

According to the three-dimensional geometric coordinates of all points in the point set, the corresponding Hilbert code is calculated by any method in embodiment 23 to embodiment 26, and then these points are reordered according to the Hilbert code values of these points, and the multiple points arranged in Hilbert order are obtained. The bits of the binary code of the Hilbert code cannot form a one-to-one correspondence with the bits of the binary code of the geometric coordinates.

Use any attribute prediction method of implementation examples 1 to 22 to predict the attribute value of the coding point, and then obtain the attribute residual value of the point according to the actual attribute value corresponding to the point.

Write the attribute residual values of multiple points to the bitstream.

Embodiment 30

A device for generating a new processing order of this embodiment includes the following contents.

Subcode generation module: For the reconstructed point cloud geometry, for a given three-dimensional coordinate point $(X_1, X_2, X_3)$, its coordinates are expanded in binary as follows:

$$X_1 = (x_1^1 x_1^2 \ldots x_1^n \ldots x_1^{N-1} x_1^N), X_2 = (x_2^1 x_2^2 \ldots x_2^n \ldots x_2^{N-1} x_2^N), X_3 = (x_3^1 x_3^2 \ldots x_3^n \ldots x_3^{N-1} x_3^N)$$

Input the binary bits $x_1^i, x_2^i, x_3^i$ of its three-dimensional space coordinates, and output the corresponding Hilbert subcode $C_i$, i=1, . . . , N, where the subcode is composed of three binary bits, while $C_1$ is the highest 3-bit subcode and $C_N$ is the lowest 3-bit subcode. Hilbert codes are obtained by performing the following calculations:

$$C_i = f_{S_i}(x_1^i, x_2^i, x_3^i)$$

State transition module:

$$S_i = \begin{cases} \text{take any of the values in} & i = 1 \\ [a, b, c, d, e, h, k, m, p, q, r, s], & \\ g(S_{i-1}, C_{i-1}), & i \neq 1 \end{cases}$$

Among them, $S_i$ is the state when the subcode $C_{i-1}$ of the i-th string is generated, and $S_i$ is one of the 12 states, as shown in FIG. 4. Each state corresponds to a conversion function $f_{S_i}(x_1^i, x_2^i, x_3^i)$ of $(x_1^i, x_2^i, x_3^i)$ to $C_{i-1}$. $S_1 \in$ [a, b, c, d, e, h, k, m, p, q, r, s] means that when calculating $C_1$, one of the 12 states should be selected as the initial value state, and then each time $S_i$ is calculated according to the mapping relationship defined by the function $g(S_{i-1}, C_{i-1})$, which contains the upper state $S_{i-1}$ corresponding to the subcode and the upper subcode $C_{i-1}$ corresponding to the subcode.

Hilbert code generation module: until all subcodes $C_1$, $C_2$ . . . $C_N$ are calculated and all subcodes are arranged in order, the Hilbert code $HCode_N(X_1, X_2, X_3)$ of points with three-dimensional space coordinates $(x_1^i, x_2^i, x_3^i)$ is obtained. The bits of the binary code of the Hilbert code cannot form a one-to-one correspondence with the bits of the binary code of the geometric coordinates.

The correspondence between the input $x_1^i, x_2^i, x_3^i$ and the output $C_i$ of a mapping function $f_a(x_1^i, x_2^i, x_3^i)$ defined in FIG. 4 is as follows:

| $C_i = f_a(x_1^i, x_2^i, x_3^i)$ | | | |
|---|---|---|---|
| $x_1^n$ | $x_2^n$ | $x_3^n$ | $C_i$ |
| 0 | 0 | 0 | 000 |
| 0 | 0 | 1 | 001 |
| 0 | 1 | 0 | 011 |
| 0 | 1 | 1 | 010 |
| 1 | 0 | 0 | 111 |
| 1 | 0 | 1 | 110 |
| 1 | 1 | 0 | 100 |
| 1 | 1 | 1 | 101 |

The remaining functions are as follows:

$f_b(x_1^i, x_2^i, x_3^i) = f_a(x_2^i, x_3^i, x_1^i), f_c(x_1^i, x_2^i, x_3^i) = f_a(x_3^i, x_1^i, x_2^i), f_d(x_1^i, x_2^i, x_3^i) = f_a(x_1^i, \overline{x_2^i}, \overline{x_3^i}), f_e(x_1^i, x_2^i, x_3^i) = f_a(\overline{x_2^i}, \overline{x_3^i}, x_1^i), f_h(x_1^i, x_2^i, x_3^i) = f_a(x_3^i, x_1^i, \overline{x_2^i}), f_k(x_1^i, x_2^i, x_3^i) = f_a(\overline{x_1^i}, x_2^i, \overline{x_3^i}), f_m(x_1^i, x_2^i, x_3^i) = f_a(x_2^i, \overline{x_3^i}, \overline{x_1^i}), f_p(x_1^i, x_2^i, x_3^i) = f_a(\overline{x_3^i}, \overline{x_1^i}, x_2^i), f_q(x_1^i, x_2^i, x_3^i) = f_a(\overline{x_1^i}, \overline{x_2^i}, x_3^i), f_r(x_1^i, x_2^i, x_3^i) = f_a(\overline{x_2^i}, x_3^i), f_s(x_1^i, x_2^i, x_3^i) = f_a(x_3^i, \overline{x_1^i}, \overline{x_2^i}),$ The transformation relationship between the above maps has the same meaning as the transformation relationship between the curves corresponding to the state, the order exchange of the binary coordinates input by $f(x_1^i, x_2^i, x_3^i)$ corresponds to the symmetry of the plane in the curve, and the reverse of the binary coordinates input by $f(x_1^i, x_2^i, x_3^i)$ corresponds to the rotation around the axis in the curve.

The remaining mappings are shown in the following table:

| $C_i = f_b(x_1^i, x_2^i, x_3^i)$ | | | | $C_i = f_c(x_1^i, x_2^i, x_3^i)$ | | | |
|---|---|---|---|---|---|---|---|
| $x_1^i$ | $x_2^i$ | $x_3^i$ | $C_i$ | $x_1^i$ | $x_2^i$ | $x_3^i$ | $C_i$ |
| 0 | 0 | 0 | 000 | 0 | 0 | 0 | 000 |
| 0 | 0 | 1 | 011 | 0 | 0 | 1 | 111 |
| 0 | 1 | 0 | 111 | 0 | 1 | 0 | 001 |
| 0 | 1 | 1 | 100 | 0 | 1 | 1 | 110 |
| 1 | 0 | 0 | 001 | 1 | 0 | 0 | 011 |
| 1 | 0 | 1 | 010 | 1 | 0 | 1 | 100 |
| 1 | 1 | 0 | 110 | 1 | 1 | 0 | 010 |
| 1 | 1 | 1 | 101 | 1 | 1 | 1 | 101 |

| $C_i = f_d(x_1^i, x_2^i, x_3^i)$ | | | | $C_i = f_e(x_1^i, x_2^i, x_3^i)$ | | | | $C_i = f_h(x_1^i, x_2^i, x_3^i)$ | | | |
|---|---|---|---|---|---|---|---|---|---|---|---|
| $x_1^i$ | $x_2^i$ | $x_3^i$ | $C_i$ | $x_1^i$ | $x_2^i$ | $x_3^i$ | $C_i$ | $x_1^i$ | $x_2^i$ | $x_3^i$ | $C_i$ |
| 0 | 0 | 0 | 010 | 0 | 0 | 0 | 100 | 0 | 0 | 0 | 110 |
| 0 | 0 | 1 | 011 | 0 | 0 | 1 | 111 | 0 | 0 | 1 | 001 |
| 0 | 1 | 0 | 001 | 0 | 1 | 0 | 011 | 0 | 1 | 0 | 111 |
| 0 | 1 | 1 | 000 | 0 | 1 | 1 | 000 | 0 | 1 | 1 | 000 |
| 1 | 0 | 0 | 101 | 1 | 0 | 0 | 101 | 1 | 0 | 0 | 101 |
| 1 | 0 | 1 | 100 | 1 | 0 | 1 | 110 | 1 | 0 | 1 | 010 |
| 1 | 1 | 0 | 110 | 1 | 1 | 0 | 010 | 1 | 1 | 0 | 100 |
| 1 | 1 | 1 | 111 | 1 | 1 | 1 | 001 | 1 | 1 | 1 | 011 |

| $C_i = f_k(x_1^i, x_2^i, x_3^i)$ | | | | $C_i = f_m(x_1^i, x_2^i, x_3^i)$ | | | | $C_i = f_p(x_1^i, x_2^i, x_3^i)$ | | | |
|---|---|---|---|---|---|---|---|---|---|---|---|
| $x_1^i$ | $x_2^i$ | $x_3^i$ | $C_i$ | $x_1^i$ | $x_2^i$ | $x_3^i$ | $C_i$ | $x_1^i$ | $x_2^i$ | $x_3^i$ | $C_i$ |
| 0 | 0 | 0 | 110 | 0 | 0 | 0 | 010 | 0 | 0 | 0 | 100 |
| 0 | 0 | 1 | 111 | 0 | 0 | 1 | 001 | 0 | 0 | 1 | 011 |
| 0 | 1 | 0 | 101 | 0 | 1 | 0 | 101 | 0 | 1 | 0 | 101 |
| 0 | 1 | 1 | 100 | 0 | 1 | 1 | 110 | 0 | 1 | 1 | 010 |
| 1 | 0 | 0 | 001 | 1 | 0 | 0 | 011 | 1 | 0 | 0 | 111 |
| 1 | 0 | 1 | 000 | 1 | 0 | 1 | 000 | 1 | 0 | 1 | 000 |
| 1 | 1 | 0 | 010 | 1 | 1 | 0 | 100 | 1 | 1 | 0 | 110 |
| 1 | 1 | 1 | 011 | 1 | 1 | 1 | 111 | 1 | 1 | 1 | 001 |

| $C_i = f_q(x_1^i, x_2^i, x_3^i)$ | | | | $C_i = f_r(x_1^i, x_2^i, x_3^i)$ | | | | $C_i = f_s(x_1^i, x_2^i, x_3^i)$ | | | |
|---|---|---|---|---|---|---|---|---|---|---|---|
| $x_1^i$ | $x_2^i$ | $x_3^i$ | $C_i$ | $x_1^i$ | $x_2^i$ | $x_3^i$ | $C_i$ | $x_1^i$ | $x_2^i$ | $x_3^i$ | $C_i$ |
| 0 | 0 | 0 | 100 | 0 | 0 | 0 | 110 | 0 | 0 | 0 | 010 |
| 0 | 0 | 1 | 101 | 0 | 0 | 1 | 101 | 0 | 0 | 1 | 101 |
| 0 | 1 | 0 | 111 | 0 | 1 | 0 | 001 | 0 | 1 | 0 | 011 |
| 0 | 1 | 1 | 110 | 0 | 1 | 1 | 010 | 0 | 1 | 1 | 100 |
| 1 | 0 | 0 | 011 | 1 | 0 | 0 | 111 | 1 | 0 | 0 | 001 |
| 1 | 0 | 1 | 010 | 1 | 0 | 1 | 100 | 1 | 0 | 1 | 110 |
| 1 | 1 | 0 | 000 | 1 | 1 | 0 | 000 | 1 | 1 | 0 | 000 |
| 1 | 1 | 1 | 001 | 1 | 1 | 1 | 011 | 1 | 1 | 1 | 111 |

The function $S_i = g(S_{i-1}, C_{i-1})$ is used to obtain the state $S_i$ of the current level from the previous level state $S_{i-1}$ and the previous level subcode $C_{i-1}$, which is shown as follows:

TABLE 5 the g function mapping relation to get $S_i$ according to $S_{i-1}$ and $C_{i-1}$

| | $S_{i-1}$ | | | | | | | | | |
|---|---|---|---|---|---|---|---|---|---|---|
| $C_{i-1}$ | a | b | c | d | e | h | k | m | p | q | r | s |
| 000 | c | a | b | h | d | e | p | k | m | s | q | r |
| 001 | b | c | a | e | h | d | m | p | k | r | s | q |
| 010 | b | c | a | e | h | d | m | p | k | r | s | q |
| 011 | q | e | p | k | b | s | d | r | c | a | m | h |
| 100 | q | e | p | k | b | s | d | r | c | a | m | h |
| 101 | m | s | d | r | p | a | b | h | q | e | c | k |
| 110 | m | s | d | r | p | a | b | h | q | e | c | k |
| 111 | h | k | r | c | q | m | s | a | e | p | d | b |

In this embodiment, the numbers corresponding to the 12 states shown in FIG. 4 can be changed, but the $g(S_{i-1}, C_{i-1})$ function in Table 5 should also be adjusted accordingly so that the state transition relationship of $S_i$ obtained from $S_{i-1}$) remains unchanged.

Embodiment 31

A device for generating a new processing order of this embodiment includes the following contents.

Using the subcode generation module, state transition module and Hilbert code generation module of embodiment 30, the corresponding Hilbert code is output for the input three-dimensional coordinates of $(X_1, X_2, X_3)$.

The Hilbert sorting module: input the Hilbert code of multiple points, reorder these points according to the Hilbert code value of these points, and output the multiple points arranged in Hilbert order. The bits of the binary code of the Hilbert code cannot form a one-to-one correspondence with the bits of the binary code of the geometric coordinates;

according to the attribute residual decoding module of embodiments 6 to 10 and 20 to 22, the attribute residual values of the multiple points are obtained by decoding from the stream.

The attribute residual corresponding module: the respective attribute residual values of the multiple points correspond to the Hilbert code of each point in the Hilbert order, and also correspond to the three-dimensional geometric coordinates of each point in the Hilbert order.

According to the attribute prediction value acquisition module and the reconstructed attribute value acquisition module of implementation examples 6 to 10 and implementation examples 20 to 22, the input of the attribute prediction value acquisition module is the reconstructed point cloud, and the attribute prediction value of these points is output. The reconstructed attribute value acquisition module inputs the attribute prediction value and the attribute residual value corresponding to the reconstructed point to obtain the reconstructed attribute value of the current point.

Finally, we need to explain all the above implementation methods, such as the implementation methods of $f_{S_i}(x_1^i, x_2^i, x_3^i)$, $g(S_{i-1}, C_{i-1})$, including but not limited to functions, lookup tables, fixed circuit implementations, or state transitions using state machines.

The invention claimed is:

1. A decoding method of point cloud attribute, comprising:
    calculating Hilbert code values of a plurality of points according to three-dimensional geometric coordinates of the said points;
    reordering the said points into Hilbert order based on their Hilbert code values;
    decoding a sequence of attribute residual values of the points from the bitstream;
    associating each decoded attribute residuals value in the sequence of attribute residual values with a point in the said points in Hilbert order, such that each decoded attribute residual corresponds to the Hilbert code of the point and its three-dimensional geometric coordinates.

2. The decoding method of point cloud attribute according to claim 1, wherein calculating Hilbert code of a point according to three-dimensional geometric coordinates of the point comprises:
    generating Hilbert sub-code $C_i$ of the point according to the three-dimensional geometric coordinates ($X_1$, $X_2$, $X_3$) of the point by
    $$C_i = f_{S_i}(x_1^i, x_2^i, x_3^i),$$
    in the order of i=1, ... n, ..., N, i.e., the order from the highest bit to the lowest bit of the three-dimensional geometric coordinates,
    where
    $$X_1=(x_1^1 x_1^2 \ldots x_1^n \ldots x_1^{N-1} x_1^N), X_2=(x_2^1 x_2^2 \ldots x_2^n \ldots x_2^{N-1} x_2^N), X_3=(x_3^1 x_3^2 \ldots x_3^n \ldots x_3^{N-1} x_3^N),$$
    $x_j^i$ is a binary bit,
    N is the bit-depth of each of the geometric coordinates, $$S_i = \begin{cases} \text{take any of the values in} & i = 1 \\ [a, b, c, d, e, h, k, m, p, q, r, s], \\ g(S_{i-1}, C_{i-1}), & i \neq 1 \end{cases}$$

concatenating all the sub-codes $C_n$ to obtain the Hilbert code HCode=$C_1 C_2 \ldots C_N$ corresponding to the three-dimensional geometric coordinates ($X_1$, $X_2$, $X_3$).

3. The decoding method of point cloud attribute according to claim 2, wherein the function $f_{S_i}(x_1^i, x_2^i, x_3^i)$ is defined as one of $$f_a(x_1^i,x_2^i,x_3^i), f_b(x_1^i,x_2^i,x_3^i), f_c(x_1^i,x_2^i,x_3^i), f_d(x_1^i,x_2^i,x_3^i), f_e(x_1^i,x_2^i,x_3^i), f_h(x_1^i,x_2^i,x_3^i), f_k(x_1^i,x_2^i,x_3^i), f_m(x_1^i,x_2^i,x_3^i), f_p(x_1^i,x_2^i,x_3^i), f_q(x_1^i,x_2^i,x_3^i), f_r(x_1^i,x_2^i,x_3^i), \text{ or } f_s(x_1^i,x_2^i,x_3^i),$$

where the correspondence between the input $x_1^i, x_2^i, x_3^i$ of the function $f_a(x_1^i, x_2^i, x_3^i)$ and the output $C_i$ of the same function is as follows:
    when the input is (0, 0, 0), the output is 000,
    when the input is (0, 0, 1), the output is 001,
    when the input is (0, 1, 0), the output is 011,
    when the input is (0, 1, 1), the output is 010,
    when the input is (1, 0, 0), the output is 111,
    when the input is (1, 0, 1), the output is 110,
    when the input is (1, 1, 0), the output is 100,
    when the input is (1, 1, 1), the output is 101,
and $$f_b(x_1^i,x_2^i,x_3^i)=f_a(x_2^i,x_3^i,x_1^i),$$

$$f_c(x_1^i,x_2^i,x_3^i)=f_a(x_3^i,x_1^i,x_2^i),$$

$$f_d(x_1^i,x_2^i,x_3^i)=f_a(x_1^i,\overline{x_2^i},\overline{x_3^i}),$$

$$f_e(x_1^i,x_2^i,x_3^i)=f_a(\overline{x_2^i},\overline{x_3^i},x_1^i),$$

$$f_h(x_1^i,x_2^i,x_3^i)=f_a(\overline{x_3^i},x_1^i,\overline{x_2^i}),$$

$$f_k(x_1^i,x_2^i,x_3^i)=f_a(\overline{x_1^i},x_2^i,\overline{x_3^i}),$$

$$f_m(x_1^i,x_2^i,x_3^i)=f_a(x_2^i,\overline{x_3^i},\overline{x_1^i}),$$

$$f_p(x_1^i,x_2^i,x_3^i)=f_a(\overline{x_3^i},\overline{x_1^i},x_2^i),$$

$$f_q(x_1^i,x_2^i,x_3^i)=f_a(\overline{x_1^i},\overline{x_2^i},x_3^i),$$

$$f_r(x_1^i,x_2^i,x_3^i)=f_a(\overline{x_2^i},x_3^i,\overline{x_1^i}),$$

$$f_s(x_1^i,x_2^i,x_3^i)=f_a(x_3^i,\overline{x_1^i},\overline{x_2^i}).$$

4. The decoding method of point cloud attribute according to claim 2, wherein the function $g(S_{i-1}, C_{i-1})$ determining the current state $S_i$ based on the previous state $S_{i-1}$ and the previous sub-code $C_{i-1}$ as follows:
    if the previous sub-code $C_{i-1}$ is 000 and the previous state $S_{i-1}$ is a, the current state $S_i$ is c;
    if the previous sub-code $C_{i-1}$ is 000 and the previous state $S_{i-1}$ is b, the current state $S_i$ is a;
    if the previous sub-code $C_{i-1}$ is 000 and the previous state $S_{i-1}$ is c, the current state $S_i$ is b;
    if the previous sub-code $C_{i-1}$ is 000 and the previous state $S_{i-1}$ is d, the current state $S_i$ is h;
    if the previous sub-code $C_{i-1}$ is 000 and the previous state $S_{i-1}$ is e, the current state $S_i$ is d;
    if the previous sub-code $C_{i-1}$ is 000 and the previous state $S_{i-1}$ is h, the current state $S_i$ is e;
    if the previous sub-code $C_{i-1}$ is 000 and the previous state $S_{i-1}$ is k, the current state $S_i$ is p;
    if the previous sub-code $C_{i-1}$ is 000 and the previous state $S_{i-1}$ is m, the current state $S_i$ is k;
    if the previous sub-code $C_{i-1}$ is 000 and the previous state $S_{i-1}$ is p, the current state $S_i$ is m;

if the previous sub-code $C_{i-1}$ is 000 and the previous state $S_{i-1}$ is q, the current state $S_i$ is s;
if the previous sub-code $C_{i-1}$ is 000 and the previous state $S_{i-1}$ is r, the current state $S_i$ is q;
if the previous sub-code $C_{i-1}$ is 000 and the previous state $S_{i-1}$ is s, the current state $S_i$ is r;
if the previous sub-code $C_{i-1}$ is 001 and the previous state $S_{i-1}$ is a, the current state $S_i$ is b;
if the previous sub-code $C_{i-1}$ is 001 and the previous state $S_{i-1}$ is b, the current state $S_i$ is c;
if the previous sub-code $C_{i-1}$ is 001 and the previous state $S_{i-1}$ is c, the current state $S_i$ is a;
if the previous sub-code $C_{i-1}$ is 001 and the previous state $S_{i-1}$ is d, the current state $S_i$ is e;
if the previous sub-code $C_{i-1}$ is 001 and the previous state $S_{i-1}$ is e, the current state $S_i$ is h;
if the previous sub-code $C_{i-1}$ is 001 and the previous state $S_{i-1}$ is h, the current state $S_i$ is d;
if the previous sub-code $C_{i-1}$ is 001 and the previous state $S_{i-1}$ is k, the current state $S_i$ is m;
if the previous sub-code $C_{i-1}$ is 001 and the previous state $S_{i-1}$ is m, the current state $S_i$ is p;
if the previous sub-code $C_{i-1}$ is 001 and the previous state $S_{i-1}$ is p, the current state $S_i$ is k;
if the previous sub-code $C_{i-1}$ is 001 and the previous state $S_{i-1}$ is q, the current state $S_i$ is r;
if the previous sub-code $C_{i-1}$ is 001 and the previous state $S_{i-1}$ is r, the current state $S_i$ is s;
if the previous sub-code $C_{i-1}$ is 001 and the previous state $S_{i-1}$ is s, the current state $S_i$ is q;
if the previous sub-code $C_{i-1}$ is 010 and the previous state $S_{i-1}$ is a, the current state $S_i$ is b;
if the previous sub-code $C_{i-1}$ is 010 and the previous state $S_{i-1}$ is b, the current state $S_i$ is c;
if the previous sub-code $C_{i-1}$ is 010 and the previous state $S_{i-1}$ is c, the current state $S_i$ is a;
if the previous sub-code $C_{i-1}$ is 010 and the previous state $S_{i-1}$ is d, the current state $S_i$ is e;
if the previous sub-code $C_{i-1}$ is 010 and the previous state $S_{i-1}$ is e, the current state $S_i$ is h;
if the previous sub-code $C_{i-1}$ is 010 and the previous state $S_{i-1}$ is h, the current state $S_i$ is d;
if the previous sub-code $C_{i-1}$ is 010 and the previous state $S_{i-1}$ is k, the current state $S_i$ is m;
if the previous sub-code $C_{i-1}$ is 010 and the previous state $S_{i-1}$ is m, the current state $S_i$ is p;
if the previous sub-code $C_{i-1}$ is 010 and the previous state $S_{i-1}$ is p, the current state $S_i$ is k;
if the previous sub-code $C_{i-1}$ is 010 and the previous state $S_{i-1}$ is q, the current state $S_i$ is r;
if the previous sub-code $C_{i-1}$ is 010 and the previous state $S_{i-1}$ is r, the current state $S_i$ is s;
if the previous sub-code $C_{i-1}$ is 010 and the previous state $S_{i-1}$ is s, the current state $S_i$ is q;
if the previous sub-code $C_{i-1}$ is 011 and the previous state $S_{i-1}$ is a, the current state $S_i$ is q;
if the previous sub-code $C_{i-1}$ is 011 and the previous state $S_{i-1}$ is b, the current state $S_i$ is e;
if the previous sub-code $C_{i-1}$ is 011 and the previous state $S_{i-1}$ is c, the current state $S_i$ is p;
if the previous sub-code $C_{i-1}$ is 011 and the previous state $S_{i-1}$ is d, the current state $S_i$ is k;
if the previous sub-code $C_{i-1}$ is 011 and the previous state $S_{i-1}$ is e, the current state $S_i$ is b;
if the previous sub-code $C_{i-1}$ is 011 and the previous state $S_{i-1}$ is h, the current state $S_i$ is s;
if the previous sub-code $C_{i-1}$ is 011 and the previous state $S_{i-1}$ is k, the current state $S_i$ is d;
if the previous sub-code $C_{i-1}$ is 011 and the previous state $S_{i-1}$ is m, the current state $S_i$ is r;
if the previous sub-code $C_{i-1}$ is 011 and the previous state $S_{i-1}$ is p, the current state $S_i$ is c;
if the previous sub-code $C_{i-1}$ is 011 and the previous state $S_{i-1}$ is q, the current state $S_i$ is a;
if the previous sub-code $C_{i-1}$ is 011 and the previous state $S_{i-1}$ is r, the current state $S_i$ is m;
if the previous sub-code $C_{i-1}$ is 011 and the previous state $S_{i-1}$ is s, the current state $S_i$ is h;
if the previous sub-code $C_{i-1}$ is 100 and the previous state $S_{i-1}$ is a, the current state $S_i$ is q;
if the previous sub-code $C_{i-1}$ is 100 and the previous state $S_{i-1}$ is b, the current state $S_i$ is e;
if the previous sub-code $C_{i-1}$ is 100 and the previous state $S_{i-1}$ is c, the current state $S_i$ is p;
if the previous sub-code $C_{i-1}$ is 100 and the previous state $S_{i-1}$ is d, the current state $S_i$ is k;
if the previous sub-code $C_{i-1}$ is 100 and the previous state $S_{i-1}$ is e, the current state $S_i$ is b;
if the previous sub-code $C_{i-1}$ is 100 and the previous state $S_{i-1}$ is h, the current state $S_i$ is s;
if the previous sub-code $C_{i-1}$ is 100 and the previous state $S_{i-1}$ is k, the current state $S_i$ is d;
if the previous sub-code $C_{i-1}$ is 100 and the previous state $S_{i-1}$ is m, the current state $S_i$ is r;
if the previous sub-code $C_{i-1}$ is 100 and the previous state $S_{i-1}$ is p, the current state $S_i$ is c;
if the previous sub-code $C_{i-1}$ is 100 and the previous state $S_{i-1}$ is q, the current state $S_i$ is a;
if the previous sub-code $C_{i-1}$ is 100 and the previous state $S_{i-1}$ is r, the current state $S_i$ is m;
if the previous sub-code $C_{i-1}$ is 100 and the previous state $S_{i-1}$ is s, the current state $S_i$ is h;
if the previous sub-code $C_{i-1}$ is 101 and the previous state $S_{i-1}$ is a, the current state $S_i$ is m;
if the previous sub-code $C_{i-1}$ is 101 and the previous state $S_{i-1}$ is b, the current state $S_i$ is s;
if the previous sub-code $C_{i-1}$ is 101 and the previous state $S_{i-1}$ is c, the current state $S_i$ is d;
if the previous sub-code $C_{i-1}$ is 101 and the previous state $S_{i-1}$ is d, the current state $S_i$ is r;
if the previous sub-code $C_{i-1}$ is 101 and the previous state $S_{i-1}$ is e, the current state $S_i$ is p;
if the previous sub-code $C_{i-1}$ is 101 and the previous state $S_{i-1}$ is h, the current state $S_i$ is a;
if the previous sub-code $C_{i-1}$ is 101 and the previous state $S_{i-1}$ is k, the current state $S_i$ is b;

if the previous sub-code $C_{i-1}$ is 101 and the previous state $\mathcal{S}_{i-1}$ is m, the current state $\mathcal{S}_i$ is h;
if the previous sub-code $C_{i-1}$ is 101 and the previous state $\mathcal{S}_{i-1}$ is p, the current state $\mathcal{S}_i$ is q;
if the previous sub-code $C_{i-1}$ is 101 and the previous state $\mathcal{S}_{i-1}$ is q, the current state $\mathcal{S}_i$ is e;
if the previous sub-code $C_{i-1}$ is 101 and the previous state $\mathcal{S}_{i-1}$ is r, the current state $\mathcal{S}_i$ is c;
if the previous sub-code $C_{i-1}$ is 101 and the previous state $\mathcal{S}_{i-1}$ is s, the current state $\mathcal{S}_i$ is k;
if the previous sub-code $C_{i-1}$ is 110 and the previous state $\mathcal{S}_{i-1}$ is a, the current state $\mathcal{S}_i$ is m;
if the previous sub-code $C_{i-1}$ is 110 and the previous state $\mathcal{S}_{i-1}$ is b, the current state $\mathcal{S}_i$ is s;
if the previous sub-code $C_{i-1}$ is 110 and the previous state $\mathcal{S}_{i-1}$ is c, the current state $\mathcal{S}_i$ is d;
if the previous sub-code $C_{i-1}$ is 110 and the previous state $\mathcal{S}_{i-1}$ is d, the current state $\mathcal{S}_i$ is r;
if the previous sub-code $C_{i-1}$ is 110 and the previous state $\mathcal{S}_{i-1}$ is e, the current state $\mathcal{S}_i$ is p;
if the previous sub-code $C_{i-1}$ is 110 and the previous state $\mathcal{S}_{i-1}$ is h, the current state $\mathcal{S}_i$ is a;
if the previous sub-code $C_{i-1}$ is 110 and the previous state $\mathcal{S}_{i-1}$ is k, the current state $\mathcal{S}_i$ is b;
if the previous sub-code $C_{i-1}$ is 110 and the previous state $\mathcal{S}_{i-1}$ is m, the current state $\mathcal{S}_i$ is h;
if the previous sub-code $C_{i-1}$ is 110 and the previous state $\mathcal{S}_{i-1}$ is p, the current state $\mathcal{S}_i$ is q;
if the previous sub-code $C_{i-1}$ is 110 and the previous state $\mathcal{S}_{i-1}$ is q, the current state $\mathcal{S}_i$ is e;
if the previous sub-code $C_{i-1}$ is 110 and the previous state $\mathcal{S}_{i-1}$ is r, the current state $\mathcal{S}_i$ is c;
if the previous sub-code $C_{i-1}$ is 110 and the previous state $\mathcal{S}_{i-1}$ is s, the current state $\mathcal{S}_i$ is k;
if the previous sub-code $C_{i-1}$ is 111 and the previous state $\mathcal{S}_{i-1}$ is a, the current state $\mathcal{S}_i$ is h;
if the previous sub-code $C_{i-1}$ is 111 and the previous state $\mathcal{S}_{i-1}$ is b, the current state $\mathcal{S}_i$ is k;
if the previous sub-code $C_{i-1}$ is 111 and the previous state $\mathcal{S}_{i-1}$ is c, the current state $\mathcal{S}_i$ is r;
if the previous sub-code $C_{i-1}$ is 111 and the previous state $\mathcal{S}_{i-1}$ is d, the current state $\mathcal{S}_i$ is c;
if the previous sub-code $C_{i-1}$ is 111 and the previous state $\mathcal{S}_{i-1}$ is e, the current state $\mathcal{S}_i$ is q;
if the previous sub-code $C_{i-1}$ is 111 and the previous state $\mathcal{S}_{i-1}$ is h, the current state $\mathcal{S}_i$ is m;
if the previous sub-code $C_{i-1}$ is 111 and the previous state $\mathcal{S}_{i-1}$ is k, the current state $\mathcal{S}_i$ is s;
if the previous sub-code $C_{i-1}$ is 111 and the previous state $\mathcal{S}_{i-1}$ is m, the current state $\mathcal{S}_i$ is a;
if the previous sub-code $C_{i-1}$ is 111 and the previous state $\mathcal{S}_{i-1}$ is p, the current state $\mathcal{S}_i$ is e;
if the previous sub-code $C_{i-1}$ is 111 and the previous state $\mathcal{S}_{i-1}$ is q, the current state $\mathcal{S}_i$ is p;
if the previous sub-code $C_{i-1}$ is 111 and the previous state $\mathcal{S}_{i-1}$ is r, the current state $\mathcal{S}_i$ is d;
if the previous sub-code $C_{i-1}$ is 111 and the previous state $\mathcal{S}_{i-1}$ is s, the current state $\mathcal{S}_i$ is b.

5. The decoding method of point cloud attribute according to claim 1, further comprising:
selecting n decoded points as the reference points of a current point, where n is a natural number;
using weighted average of the reconstructed attribute values of the said n reference points as the attribute prediction value of the current points;
obtaining the reconstructed attribute value of the current point according to the attribute prediction value of the current point and its corresponding attribute residual value.

6. The decoding method of point cloud attribute according to claim 5, wherein using weighted average of the reconstructed attribute values of the said n reference points as the attribute prediction value of the current point comprises:
selecting n points which are previous to and closest to the current point in Hilbert order as the reference points of the current point;
using average of the reconstructed attribute values of the said n reference points as the attribute prediction value of the current point.

7. The decoding method of point cloud attribute according to claim 5, wherein using weighted average of the reconstructed attribute values of the said n reference points as the attribute prediction value of the current point comprises:
selecting n points closest in space distance to the current point as reference points of the current point among L points which are previous to and closest to the current point in Hilbert order, L being greater than or equal to n;
using distance-weighted average of the reconstructed attribute values of the said n reference points as the attribute prediction value of the current point.

8. The decoding method of point cloud attribute according to claim 5, wherein using weighted average of the reconstructed attribute values of the said n reference points as the attribute prediction value of the current point comprises:
selecting coplanar points and collinear points, in total n points, of the current point among the L points previous to and closest to the current point in Hilbert order as n reference points of the current point, wherein each coplanar points is located in a cube that shares a common surface with the cube in which the current point is located, and each collinear points is located in a cube that shares a common edge with the cube in which the current point located, L is greater than or equal to n;
assigning a weights $\omega_{pl}$ to coplanar points and assigning a weight $\omega_{po}$ to collinear points, where $\omega_{pl}$ and $\omega_{po}$ are real numbers greater than or equal to 0, and $\omega_{pl}$ is greater than $\omega_{po}$;
using weighted average of the reconstructed attribute values of the coplanar and collinear points as the attribute prediction value of the current point.

9. The decoding method of point cloud attribute according to claim 5, wherein using weighted average of the reconstructed attribute values of the said n reference points as the attribute prediction value of the current point comprises:
dividing the point cloud into M point set levels, $P_i$, i=0,1 ... M, where M is a natural number greater than 0;
identifying L points in a point set level different from the point set level to which the current point is belong, such that the range of Hilbert code $[H_1, H_2]$ of the L points achieves $H_1 \leq HCode \leq H_2$, where HCode is the Hilbert code of the current point;

selecting n points among the L points closest to the current point in space distance as reference points, using distance-weighted average of the reconstructed attribute values of the n reference points as the attribute prediction value of the current point.

10. An encoding method of point cloud attribute, comprising:

calculating Hilbert code values of a plurality of points according to three-dimensional geometric coordinates of the said points;

reordering the said points into Hilbert order based on their Hilbert code values;

predicting attribute values of the said points arranged in Hilbert order, and obtaining attribute residual values of the said points by subtracting the attribute prediction values from the actual attribute values of the points;

encoding the attribute residual values of the said points in Hilbert order into the bitstream.

11. The encoding method of point cloud attribute according to claim 10, wherein calculating Hilbert code value of a point according to its three-dimensional geometric coordinates of the point comprises:

generating Hilbert sub-code $C_i$ of the point according to the three-dimensional geometric coordinates ($X_1$, $X_2$, $X_3$) of the point by $$C_i = f_{S_i}(x_1^i, x_2^i, x_3^i),$$

in the order of $i = 1, \ldots n, \ldots, N$, i.e. the order from the highest bit to the lowest bit of the three-dimensional geometric coordinates, where $$X_1 = (x_1^1 x_1^2 \ldots x_1^n \ldots x_1^{N-1} x_1^N), X_2 = (x_2^1 x_2^2 \ldots x_2^n \ldots x_2^{N-1} x_2^N), X_3 = (x_3^1 x_3^2 \ldots x_3^n \ldots x_3^{N-1} x_3^N),$$

$x_j^i$ is a binary bit,

N is the bit-depth of each of the geometric coordinates, $$S_i = \begin{cases} \text{take any of the values in} & i = 1 \\ [a, b, c, d, e, h, k, m, p, q, r, s], & \\ g(S_{i-1}, C_{i-1}), & i \neq 1 \end{cases}$$

concatenating all the sub-codes $C_n$ to obtain the Hilbert code $HCode = C_1 C_2 \ldots C_N$ corresponding to the three-dimensional geometric coordinates ($X_1$, $X_2$, $X_3$).

\* \* \* \* \*